US008097156B2

(12) United States Patent
Tubby et al.

(10) Patent No.: US 8,097,156 B2
(45) Date of Patent: Jan. 17, 2012

(54) FLUID FILTRATION SYSTEM

(75) Inventors: Brian J. Tubby, Cheshire, CT (US); Andrew M. Candelora, East Haven, CT (US); Thomas D. Holler, Glastonbury, CT (US); Laurence W. Bassett, Killingworth, CT (US)

(73) Assignee: 3M Innovative Properties Company, St. Paul, MN (US)

( * ) Notice: Subject to any disclaimer, the term of this patent is extended or adjusted under 35 U.S.C. 154(b) by 1397 days.

(21) Appl. No.: 11/458,936

(22) Filed: Jul. 20, 2006

(65) Prior Publication Data

US 2007/0199876 A1    Aug. 30, 2007

Related U.S. Application Data

(60) Provisional application No. 60/701,432, filed on Jul. 20, 2005.

(51) Int. Cl.
*B01D 35/30* (2006.01)

(52) U.S. Cl. ........ 210/234; 210/235; 210/232; 210/418; 210/429; 210/437; 210/440; 210/443; 285/370

(58) Field of Classification Search ................ 210/232, 210/234, 235, 236, 240, 323.2, 323.1, 416.3, 210/418, 429, 432, 437, 438, 439, 440, 441, 210/443, 444, 448, 453, 456, 110, 137, 175, 210/97; 285/347, 370
See application file for complete search history.

(56) References Cited

U.S. PATENT DOCUMENTS

| | | | |
|---|---|---|---|
| 3,166,500 | A | 1/1965 | Noakes et al. |
| 3,272,340 | A | 9/1966 | Hungerford, Jr. |

(Continued)

FOREIGN PATENT DOCUMENTS

EP    A2-0 318 832    6/1989

(Continued)

OTHER PUBLICATIONS

Definition of "into", Merriam Webster Online Dictionary, Accessed Jul. 21, 2011, pp. 1-2.*

*Primary Examiner* — Tony G Soohoo
*Assistant Examiner* — David C Mellon
(74) *Attorney, Agent, or Firm* — Aleksander Medved

(57) ABSTRACT

The present disclosure relates to a new fluid filter system including, but not limited to, structure for enabling a filter cartridge to be installed and removed from a manifold with a straight line push/pull motion, an innovative latching mechanism and an innovative water manifold, the latching mechanism providing a unique mechanism interface between an innovative manifold and a filter cartridge, the latching mechanism providing a compact and simple mechanism between the innovative manifold and the filter cartridge that significantly reduces the installation and removal force previously found with fluid filtration cartridges by including a low force filter cartridge installation and removal mechanism for utilization by the end consumer and the manifold assembly includes an inlet and an outlet port, the manifold assembly having structure for maintaining a substantially constant volumetric cavity of the fluid filtration system that contains fluid during installation and operation of the filter therein and removal of the filter therefrom and that has an automatic shut-off system, as the inlet water pressure increases past a predetermined desired maximum system operating pressure, the inlet water will automatically be shut-off, i.e., will not flow into (or out of) the filter cartridge.

14 Claims, 55 Drawing Sheets

U.S. PATENT DOCUMENTS

| | | | |
|---|---|---|---|
| 3,954,624 | A | 5/1976 | Petrucci |
| 4,420,396 | A | 12/1983 | Yamamoto et al. |
| 4,515,692 | A | 5/1985 | Chandler et al. |
| 4,559,136 | A | 12/1985 | Dockery |
| 4,645,601 | A | 2/1987 | Regunathan et al. |
| 4,731,183 | A | 3/1988 | Schumacher, II |
| 4,735,716 | A | 4/1988 | Petrucci et al. |
| 4,806,240 | A | 2/1989 | Giordano et al. |
| 4,825,903 | A | 5/1989 | Ochs et al. |
| 4,857,189 | A | 8/1989 | Thomsen et al. |
| 4,857,191 | A | 8/1989 | Wolf |
| 4,871,455 | A | 10/1989 | Terhune et al. |
| 4,904,382 | A | 2/1990 | Thomsen |
| 4,956,086 | A | 9/1990 | Thomsen et al. |
| 5,035,797 | A | 7/1991 | Janik |
| 5,098,559 | A | 3/1992 | Mack et al. |
| RE34,031 | E | 8/1992 | Thomsen et al. |
| 5,180,015 | A | 1/1993 | Ringgenberg et al. |
| 5,186,829 | A | 2/1993 | Janik |
| 5,354,464 | A | 10/1994 | Slovak et al. |
| 5,486,288 | A | 1/1996 | Stanford et al. |
| 5,560,824 | A | 10/1996 | Sann et al. |
| 5,630,935 | A | 5/1997 | Treu |
| 5,700,371 | A | 12/1997 | Koslow |
| 5,709,795 | A | 1/1998 | Park et al. |
| 5,766,463 | A | 6/1998 | Janik et al. |
| 5,826,854 | A | 10/1998 | Janvrin et al. |
| 5,837,137 | A | 11/1998 | Janik |
| 6,120,685 | A | 9/2000 | Carlson et al. |
| RE37,216 | E | 6/2001 | Koslow |
| 6,251,273 | B1 * | 6/2001 | Jawurek et al. ............. 210/232 |
| 6,360,764 | B1 | 3/2002 | Fritze |
| 6,458,269 | B1 | 10/2002 | Bassett et al. |
| 6,517,615 | B2 | 2/2003 | Miller et al. |
| 6,555,000 | B2 | 4/2003 | Knight |
| 6,632,355 | B2 | 10/2003 | Fritze |
| 6,716,348 | B1 * | 4/2004 | Morgan ..................... 210/232 |
| 7,000,894 | B2 | 2/2006 | Olson et al. |
| 7,056,435 | B2 | 6/2006 | Jenkins et al. |
| 7,067,054 | B2 | 6/2006 | Fritze |
| 7,147,773 | B2 | 12/2006 | Mitchell et al. |
| 2003/0024860 | A1 | 2/2003 | Fritze |
| 2003/0042191 | A1 * | 3/2003 | Nam et al. ................ 210/234 |
| 2004/0211717 | A1 | 10/2004 | Mitchell et al. |
| 2005/0092183 | A1 | 5/2005 | Koslow et al. |
| 2005/0252841 | A1 | 11/2005 | Bassett et al. |
| 2006/0186031 | A1 * | 8/2006 | Fick et al. ................. 210/235 |
| 2007/0012611 | A1 | 1/2007 | An |
| 2007/0227959 | A1 | 10/2007 | Sinur et al. |
| 2008/0142425 | A1 * | 6/2008 | Hansen .................... 210/232 |
| 2011/0174705 | A1 * | 7/2011 | Branscomb ............... 210/153 |

FOREIGN PATENT DOCUMENTS

| | | |
|---|---|---|
| GB | A 2 12 383 | 10/1997 |
| JP | 2002-102846 | 4/2002 |
| WO | WO 98/08012 | 2/1998 |
| WO | WO 01/95993 | 12/2001 |
| WO | WO 2005/061073 | 7/2005 |
| WO | WO 2007/012079 | 1/2007 |

* cited by examiner

FLUID FILTRATION SYSTEM

RELATED APPLICATIONS

This application is a continuation-in-part of commonly owned U.S. Provisional Patent Application Ser. No. 60/701,432, filed Jul. 20, 2005, of Tubby, entitled "Fluid Filtration System," the disclosure of which is herein incorporated by reference to the extent not inconsistent with the present disclosure.

BACKGROUND

The present disclosure relates to a fluid filter system having a plurality of new and unique features including, but not limited to, enabling a filter cartridge to be installed and removed from a manifold with a straight line push/pull motion, an innovative latching mechanism and an innovative water manifold, more specifically to a fluid filter system having an innovative and unique latching mechanism that provides a unique interface and mechanism between an innovative manifold and a filter cartridge and most specifically to a fluid filter system having an innovative and unique latching mechanism that provides a compact and simple mechanism between an innovative manifold and the filter cartridge that significantly reduces the installation and removal force previously found with fluid filtration cartridges by including a low force filter cartridge installation and removal mechanism for utilization by the end consumer the manifold assembly having an inlet and an outlet port, the manifold assembly having structure for maintaining a substantially constant volumetric cavity of the fluid filtration system that contains fluid during installation and operation of the filter therein and removal of the filter therefrom and that has an automatic shut-off system, as the inlet water pressure increases past a predetermined desired maximum system operating pressure, the inlet water will automatically be shut-off, i.e., will not flow into (or out of) the filter cartridge.

Over the years, a number of water filtration systems and much of the current technology for interfaces between filter cartridges and manifolds are based around ¼ turn bayonet styles. This type of interface tends to result in high removal forces due to the high compression on the sealing components (typically o-rings or other rubber-like types of seals), and the compression sets taken by the rubber-like seals. New styles of interfaces have employed external button release mechanisms. These mechanisms are typically high in force and add extra expense from an increase in components to the overall fluid filtration system. Additionally, they can disadvantageously also increase the overall size of the system.

The following references are but a few of the high number of prior published references that are related to the general subject matter of the present disclosure and are provided as general background:

| | | | |
|---|---|---|---|
| 4,515,692 | May, 1985 | Chandler et al. | |
| 4,645,601 | February, 1987 | Regunathan et al. | |
| 4,731,183 | March, 1988 | Schumacher, II. | |
| 4,735,716 | April, 1988 | Petrucci et al. | |
| 4,806,240 | February, 1989 | Giordano et al. | |
| 4,857,189 | August, 1989 | Thomsen et al. | |
| 4,904,382 | February, 1990 | Thomsen. | |
| 4,956,086 | September, 1990 | Thomsen et al. | |
| 5,035,797 | July, 1991 | Janik. | |
| RE34031 | August, 1992 | Thomsen et al. | |
| 5,180,015 | January, 1993 | Ringgenberg et al. | |
| 5,186,829 | February, 1993 | Janik. | |
| 5,354,464 | October, 1994 | Slovak et al. | |
| 5,486,288 | January, 1996 | Stanford et al. | |
| 5,560,824 | October, 1996 | Sann et al. | |
| 5,766,463 | June, 1998 | Janik et al. | |
| 5,826,854 | October, 1998 | Janvrin et al. | 251/149. |
| 5,837,137 | November, 1998 | Janik. | |
| 2001/003,0148 | October, 2001 | Knight | 210/130 |

One prior art reference, U.S. Pat. No. 6,120,685 to Carlson at al., the disclosure of which is herein incorporated by reference to the extent not inconsistent with the present disclosure, is directed to a water filtering system for a refrigerator which includes a mounting head preferably arranged under a temperature control housing in a fresh food compartment. A replaceable filter cartridge is adapted to be selectively attached to the mounting head in order to complete a fluid circuit from a water supply source to at least one of a water dispenser and an icemaker. The filter cartridge and the mounting head have cooperating camming structure that axially draws a stem portion of the cartridge into a port of the mounting head upon rotation of the cartridge relative to the mounting head during installation of the cartridge. Camming structure is also provided to at least partially, axially withdraw the stem portion from the port upon rotation of the cartridge a predetermined amount in an opposing direction.

One more recent prior art reference, United States Patent Application Publication, U.S. 2003/0024259 A1 to Jenkins et al., is directed to a refrigerator water filter assembly that is provided in the ceiling of a refrigerator and is adapted to hinge downwardly from the ceiling for changing the filter cartridge, the disclosure of which is herein incorporated by reference to the extent not inconsistent with the present disclosure.

Other prior art includes: U.S. Pat. No. RE37,216 E to Koslow entitled WATER TREATMENT CARTRIDGE AND BASE, directed to a Water Treatment Unit that includes a base and a disposable, plug-in cartridge. The cartridge contains a pair of hollow cylindrical, porous, solid water treatment elements designed to treat water flowing radially through their walls. The electrical elements are mounted so as to act in parallel, thereby achieving the advantages of a long, thin-walled element in a compact configuration; U.S. Patent Application Publication No. 2004/0211717 A1 to Mitchell at al., entitled, REFRIGERATOR WITH TREATED WATER, directed to a refrigerator with a water treatment system including a head connecting a water supply to a water-using accessory. An end piece is provided for connecting a treatment cartridge to the head. The end piece comprises an inlet fitting having a cam that contacts a follower of a valve located in the head to open the valve when the end piece is mounted to the head and connects the treatment cartridge to the water treatment system; United States Patent Application Publication No. 2004/2 1193181, to Olson at al, entitled FLUID CARTRIDGES AND END PIECES THEREOF, directed to an end piece used in the treatment of water that is connected to a treatment cartridge housing and inserted into an appliance having bypass, inlet, and outlet valves. The end piece has an end piece wall from which an inlet fitting, outlet fitting, and protrusion extend. The inlet fittings, outlet fittings, protrusion and cartridge housing each have a longitudinal axis. The inlet and outlet fittings have a cam surface for actuating the inlet and outlet valves, respectively. Further, the cam surfaces of the inlet and outlet fittings are angled and vectored in relation to their respective longitudinal axis. The protrusion is shaped for actuating the bypass valve.

It should be understood that the above cited prior art references are only a few representative references a tremendous number of prior art references that are directed to the general subject matter of the present disclosure and that many of these references may be equally or more relevant than those cited above.

Concerning the unique inlet assembly component of the present disclosure, United States Patent Application Publication Number U.S. 2005/0092183 A1 to Koslow et al., the disclosure of which is herein incorporated by reference to the extent not inconsistent with the present disclosure, is directed to an apparatus comprising a pressure limiting valve for preventing transmission of elevated pressure to components downstream of the apparatus. Preferably, the pressure limiting valve is used in combination with a flow regulating device that maintains a substantially steady flow rate through the apparatus even when subject to a wide range of applied pressure. The disclosure alleges that the apparatus is preferably suitable for use with filter systems wherein the pressure limiting valve is placed upstream of filter components that have limited burst and fatigue life capabilities. It is further alleged that by isolating the downstream filter components from pressures that are greater than the target pressure ranges for a given application, the filter component can be designed to operate at much lower pressure, and can be produced at a smaller size, and at a reduced cost.

As can be gleaned from a review of the above prior art reference, the described Koslow valve has numerous shortcomings including but not limited to the following: requiring the use of three (3) dynamic (high wear) o-rings on a non-replaceable component, requires costly tight tolerancing and high surface finish on three (3) separate bore ID's, is a "closed" system and is not serviceable, in that the valve is welded together and thus, can not be taken apart in order to service the various sub components of the valve, is really only a pressure limiting device, is normally open and will only shut-off water flow when the pressure limit is reached, is a stand alone device (i.e. can be added to any water circuit), the main component of the Koslow system is complex requiring sophisticated tooling to produce due to the multiple O-ring glands and tooling shut-offs to produce the water pathways and it is believed that the Koslow valve is probably limited in flow rate due to the interrupted flow path required and the high pressure drop that the valve would produce.

In contrast, the unique inlet assembly component, of the present disclosure, does not have any dynamic o-rings, just one face seal o-ring on non-replaceable components, has only 1 dynamic o-ring, and that dynamic o-ring is attached to the replacement filter cartridge, only requires a tight tolerance and high surface finish on one (1) bore ID (much less costly than Koslow), is an "open" system and can be serviced (i.e. individual components replaced if needed), comprises all quick connect/disconnect parts so that individual components and/or subassemblies can be easily changed, is both a pressure limiting device and a shut-off valve, the main component is a simple component requiring only one (1) o-ring gland and non sophisticated tooling actions to produce its specific representative geometry and has a simple, direct flow path and, therefore, a low pressure drop, so it is able to produce high flow rates. The advantage of a device that provides low pressure drop/high low rates is important due to the industry desire for increased flow rate for water dispensers. Since water filtration systems are usually a large part of the pressure drop across the water circuit, higher flow rate can only be achieved when the pressure drop through the water circuit is reduced.

Thus, there is a need in the art for a fluid filter system including, but not limited to, a unique combination of sub-components that enable a filter cartridge to be installed and removed from a manifold with a straight line push/pull motion, an innovative latching mechanism that is reliable and provides for a relatively drip free connection with the manifold, a unique interface and mechanism between an innovative manifold and a filter cartridge, a compact and simple mechanism positioned between the manifold and the filter cartridge that significantly reduces the installation and removal force previously found with fluid filtration cartridges, a low force filter cartridge installation and removal mechanism for utilization by the end consumer and/or an automatic shut-off system, wherein, as the inlet water pressure increases past a predetermined desired maximum system operating pressure, the inlet water will automatically be shut-off, i.e., will not flow into (or out of) the filter cartridge.

SUMMARY

One aspect of the present disclosure includes a fluid filter system for enabling a filter cartridge to be installed and removed from a manifold with a straight line push/pull motion comprising: a manifold assembly having an inlet and an outlet port, the manifold assembly having structure for maintaining a substantially constant volumetric cavity of the fluid filtration system that contains fluid during installation and operation of the filter therein and removal of the filter therefrom; and a filter installation and removal mechanism including a latching mechanism, the mechanism being operatively positioned relative to the manifold for selectively attaching and selectively releasing the filter from engagement with the manifold assembly.

Another aspect of the present disclosure includes a fluid filter system for enabling a filter cartridge to be installed and removed from a manifold with a straight line push/pull motion comprising: means, upon the straight line push/pull motion of the filter cartridge into the manifold assembly, for installing and removing a filter cartridge from a manifold; means having four opposed extension members and complementary structure including projection members; and cartridge latching structure operatively positioned on the outer surface of the filter cartridge, capable of disengaging so that the filter cartridge can be removed from engagement with the manifold assembly by simply moving the filter cartridge into the manifold assembly without any rotational movement thereof.

Yet another aspect to the present disclosure is a manifold assembly for use with a filter filtration system, comprising: an inlet assembly for receiving a fluid into the manifold; an inlet return spring operably positioned in the manifold such that the inlet assembly is capable of traversing up and down with the movement of a filter cartridge neck or stem operably received in the manifold; a head/outlet assembly for transferring the fluid external to the manifold assembly; and an inlet return stop, operatively interconnecting the inlet assembly and the head/outlet assembly.

Still another aspect of the present disclosure includes a filter cartridge latching system assembly for use with a filter filtration system, the filter cartridge latching system assembly comprising: a mounting bracket assembly; alignment structure; a main bracket having at one end connecting structure for interfacing with a manifold assembly and at the other end structure for interfacing with the alignment structure; a latch assembly; at least one resilience structure for operating a latch return; and structure, operatively associated with the alignment structure and main bracket extension members for aligning a filter cartridge with an inlet assembly operatively positioned in the manifold assembly.

Another aspect of the present disclosure includes a proprietary key configuration for a fluid filter system for enabling a filter cartridge to be installed and removed from a manifold with a straight line push/pull motion comprising: a plurality of specific configuration of the filter cartridge entrance points into the alignment structure configured in an infinite number of different shapes to provide a filtration system unique to each customer/manufacturer to ensure that only matching shaped corresponding portions are allowed to be installed, thereby providing for quality control of replacement cartridges.

Yet another aspect of the present disclosure includes a method of installing a filter cartridge from a manifold in a fluid filtration system with a straight line push motion comprising the acts of: providing a filter cartridge having a stem and latching structure formed on the surface thereof for installation into a fluid filtration system; providing a filter cartridge latching system assembly having corresponding receiving latching structure formed therein for securely receiving the filter cartridge; aligning the cartridge latching structure and alignment members on the filter cartridge outer surface with the corresponding receiving latching structure of the cartridge latching system assembly; when properly aligned, push the filter cartridge toward the manifold; and continue pushing the cartridge toward the manifold until the filter cartridge latching structure is securely locked into the filter cartridge latching system assembly receiving latching structure.

Still another aspect of the present disclosure includes a method of removing a filter cartridge from a manifold in a fluid filtration system with a straight line push/pull motion comprising the acts of: providing a filter cartridge latching system assembly having receiving latching structure formed therein with a filter cartridge having a stem and corresponding latching structure formed on the surface thereof installed therein; pushing the filter cartridge toward the filter cartridge latching system assembly; continue pushing the cartridge toward the filter cartridge latching system assembly until the filter cartridge latching structure and the filter cartridge latching system assembly receiving latching structure have disengaged; pull the filter cartridge away from the filter cartridge latching system assembly until the stem clears the filter cartridge latching system assembly a compact and simple mechanism operatively positioned between the manifold and the filter cartridge that significantly reduces the installation and removal force previously found with fluid filtration cartridges.

In view of the foregoing needs and problems experienced by the prior art, one object of the present disclosure is to provide a water filtration system having a unique combination of subcomponents that enable a filter cartridge to be installed and removed from a manifold with a straight line push/pull motion.

It is another object of the present disclosure to provide an innovative latching mechanism that is reliable and provides for a relatively drip free connection with the manifold.

A further object of the present disclosure is to provide a unique interface and mechanism between an innovative manifold and a filter cartridge.

Still another object of the present disclosure is to provide a compact and simple mechanism positioned between the manifold and the filter cartridge that significantly reduces the installation and removal force previously found with fluid filtration cartridges.

Yet another object of the present disclosure is to provide a low force filter cartridge installation and removal mechanism for utilization by the end consumer.

A further object of the present disclosure is to provide an automatic shut-off system, wherein, as the inlet water pressure increases past a predetermined desired maximum system operating pressure, the inlet water will automatically be shut-off, i.e., will not flow into (or out of) the filter cartridge.

Other objects and advantages of the disclosure will be apparent from the following description, the accompanying drawings and the appended claims, it being understood that not all possible embodiments of the present disclosure will necessarily have all of the foregoing objects and that there are objects that will become apparent that are not mentioned above.

DETAILED DESCRIPTION OF REPRESENTATIVE EMBODIMENTS

The present disclosure relates to liquid, such as, for example, water, filtration systems that may be employed, in one representative application, but not limited to, appliances such as, for example, a refrigerator or similar device capable of utilizing a water filtration functionality during the normal operation thereof. The liquid filtration systems of the present disclosure include several new and unique features.

Figure 1:
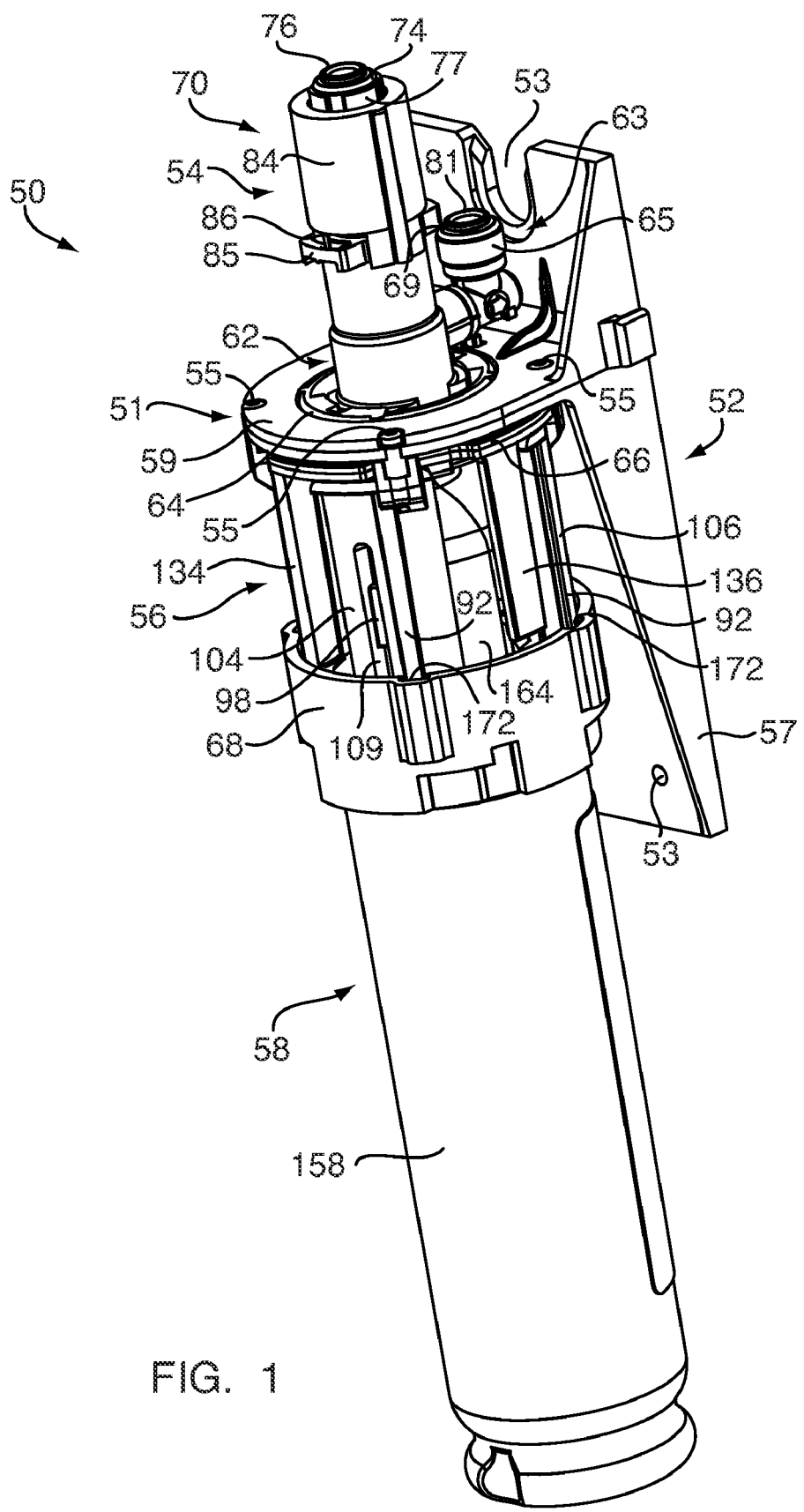
FIG. 1 is a representative perspective view of the fluid filtration system of the present disclosure.
Figure 2:
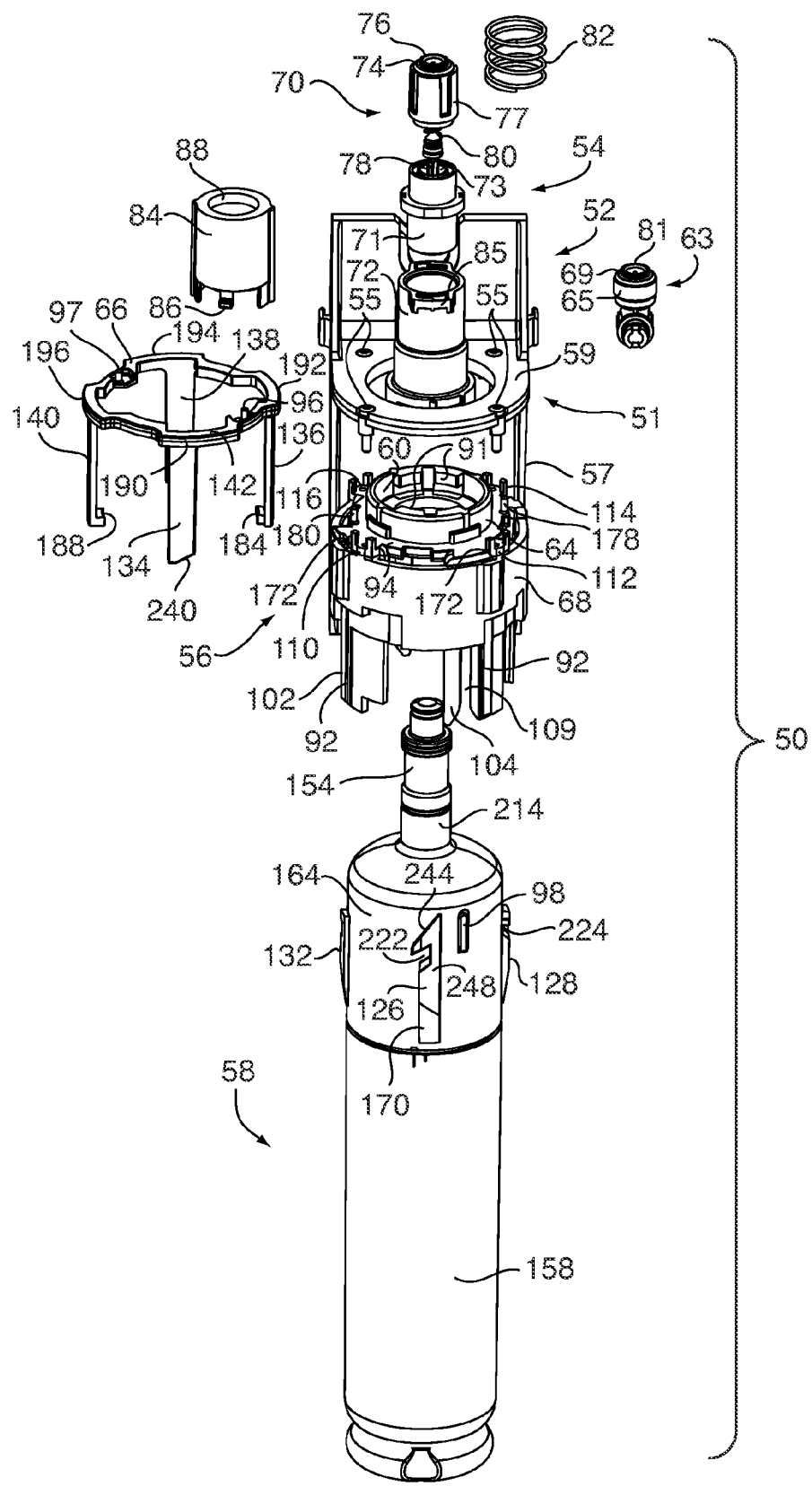
FIG. 2 is an exploded perspective view of the representative fluid filtration system of FIG. 1.

In one representative embodiment, illustrated in FIG. 1, a perspective view, and FIG. 2, an exploded view, a liquid filtration system 50, according to the present disclosure, comprises a mounting bracket assembly 51, a manifold assembly 54, and a filter cartridge latching system assembly 56 operatively assembled to a mounting bracket 52 to form the mounting bracket assembly 51 for operatively connecting and disconnecting a representative replaceable filter cartridge 58 to the manifold assembly 54, as will be explained in greater detail below.

In the representative assembled liquid filtration system 50 illustrated in detail, the mounting bracket assembly 51 comprises the mounting bracket 52 which comprises structure 53 to operatively attach and detach the mounting bracket 52 to another structure (not shown), such as, including, but not limited to, a refrigerator or similar device capable of utilizing a water filtration functionality during the normal operation thereof. The mounting bracket assembly 51 further comprises fastening structure 55, and an attachment portion 59 for operatively connecting the manifold assembly 54 and filter cartridge latching system assembly 56, as will be explained in more detail below.

Figure 16:
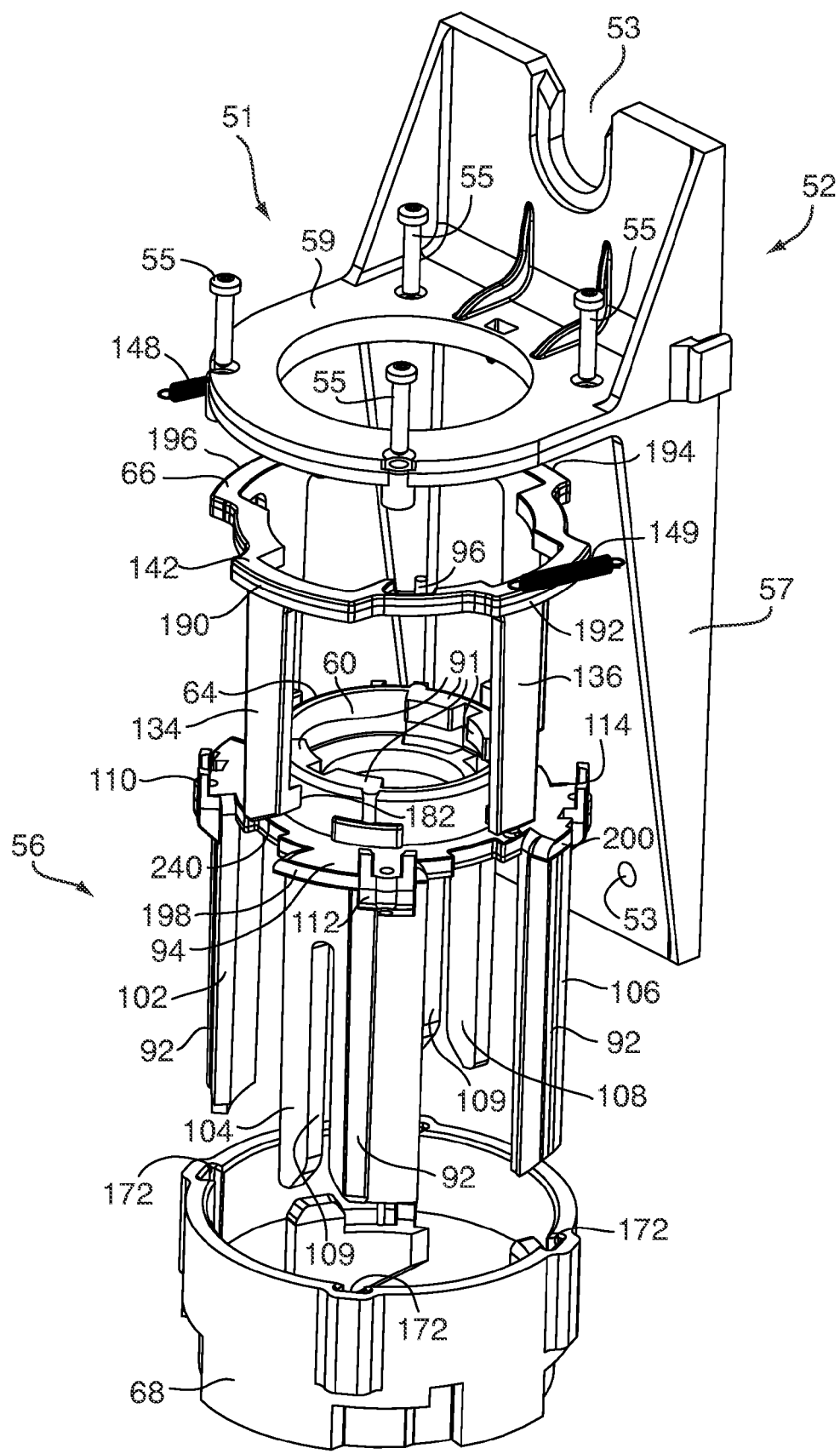
FIG. 16 is an exploded perspective view of the bracket assembly component of FIG. 15.
Figure 19:
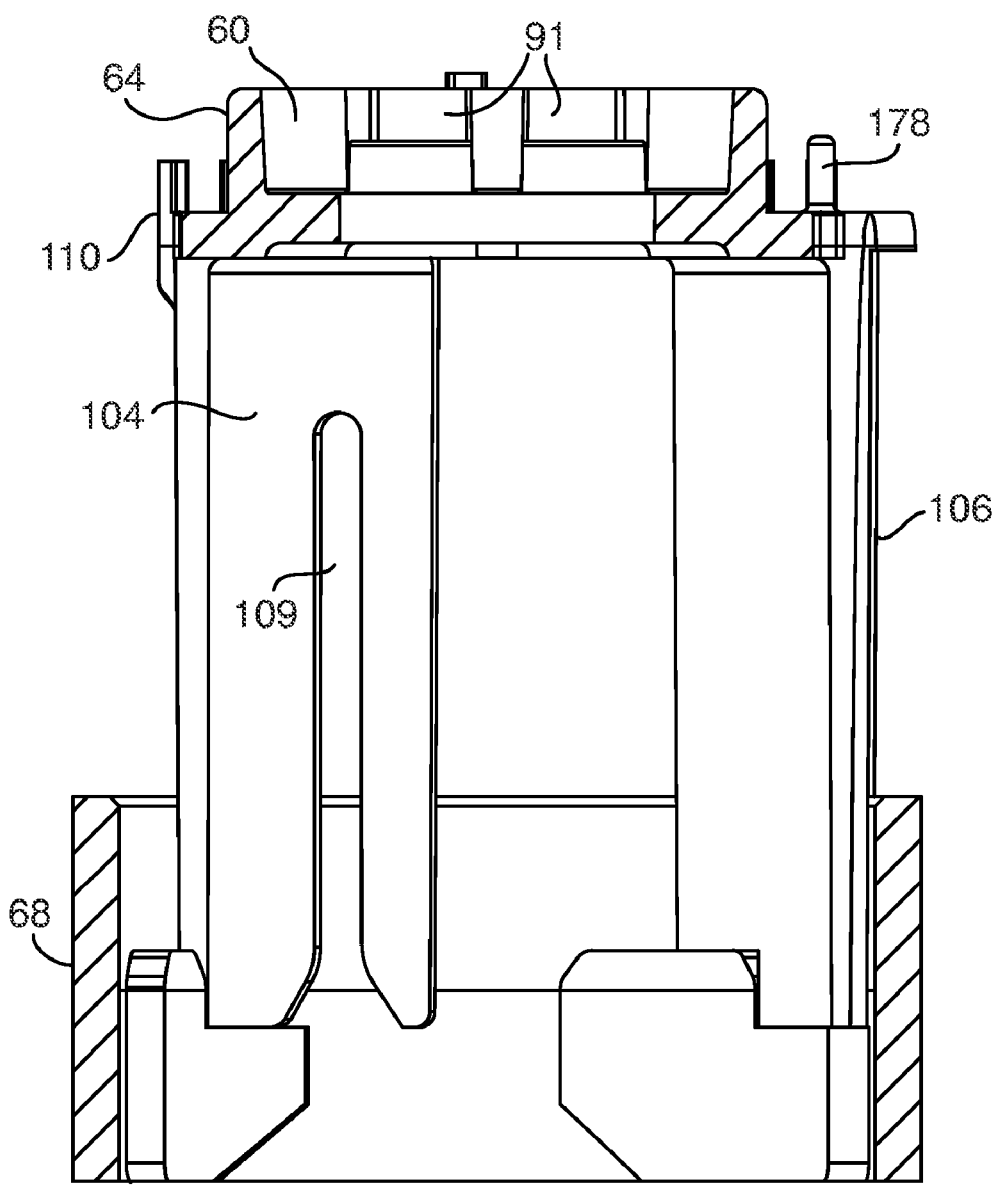
FIG. 19 is a cross sectional view of the assembled main bracket and the alignment collar of the representative fluid filtration system of the present disclosure.

In the representative assembled liquid filtration system 50 illustrated in detail, the manifold assembly 54 is operatively connected to the mounting bracket assembly 51. The filter cartridge latching system assembly 56 is operatively connected to both the mounting bracket 52 and the manifold assembly 54 and comprises, among other features, a main bracket 64 having a plurality of main bracket extension members 102, 104, 106, 108 (as best illustrated in FIGS. 16 and 19), presently preferably, projecting perpendicular thereto, a latch 66 having a plurality of opposed extension members 134, 136, 138, 140, (FIG. 12) presently preferably, projecting perpendicular thereto and a cartridge alignment collar 68, operatively connected to the main bracket 64, the details of which will also be discussed below.

At this point, it seems prudent to describe the structural makeup of the components thereof including the mounting bracket assembly 51, manifold assembly 54, filter cartridge latching system assembly 56 that comprise the portion that is fixed in the position of use of the presently preferred liquid filtration system 50 which receives, secures and selectively releases the replaceable filter cartridge 58 from engagement therewith and the interrelationships thereof.

The Manifold Assembly

As best illustrated in FIGS. 3-11, the manifold assembly 54 component of the liquid filtration system 50, according to the present disclosure, presently preferably, comprises three sections; those being an inlet assembly 70, a filter inlet connector 77 and a head/outlet assembly 62. The inter-relationship of these three sub-components controls the flow of fluid, presently preferably, water into and out of the filter cartridge 58. In the illustrated representative embodiment, the inlet assembly 70 is a sprung element. By the term, "sprung element," we mean that, as the filter cartridge 58 is installed into and removed from the manifold assembly 54, the inlet assembly 70 will traverse up and down with the movement of the filter cartridge neck or stem 154. (See FIGS. 43-48)

Figure 3:
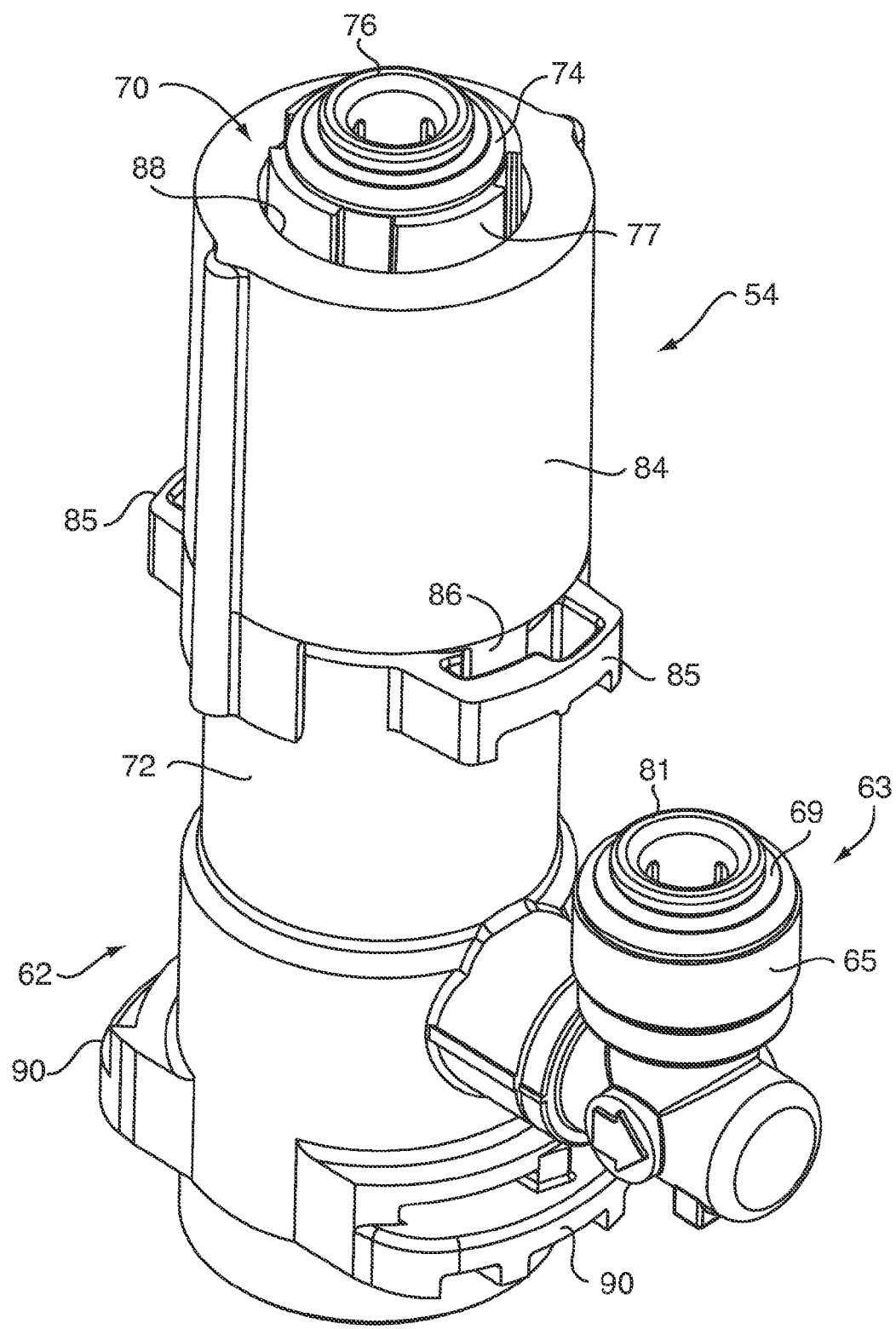
FIG. 3 is a perspective view of a representative head/manifold assembly of the fluid filtration system of the present disclosure.
Figure 4:
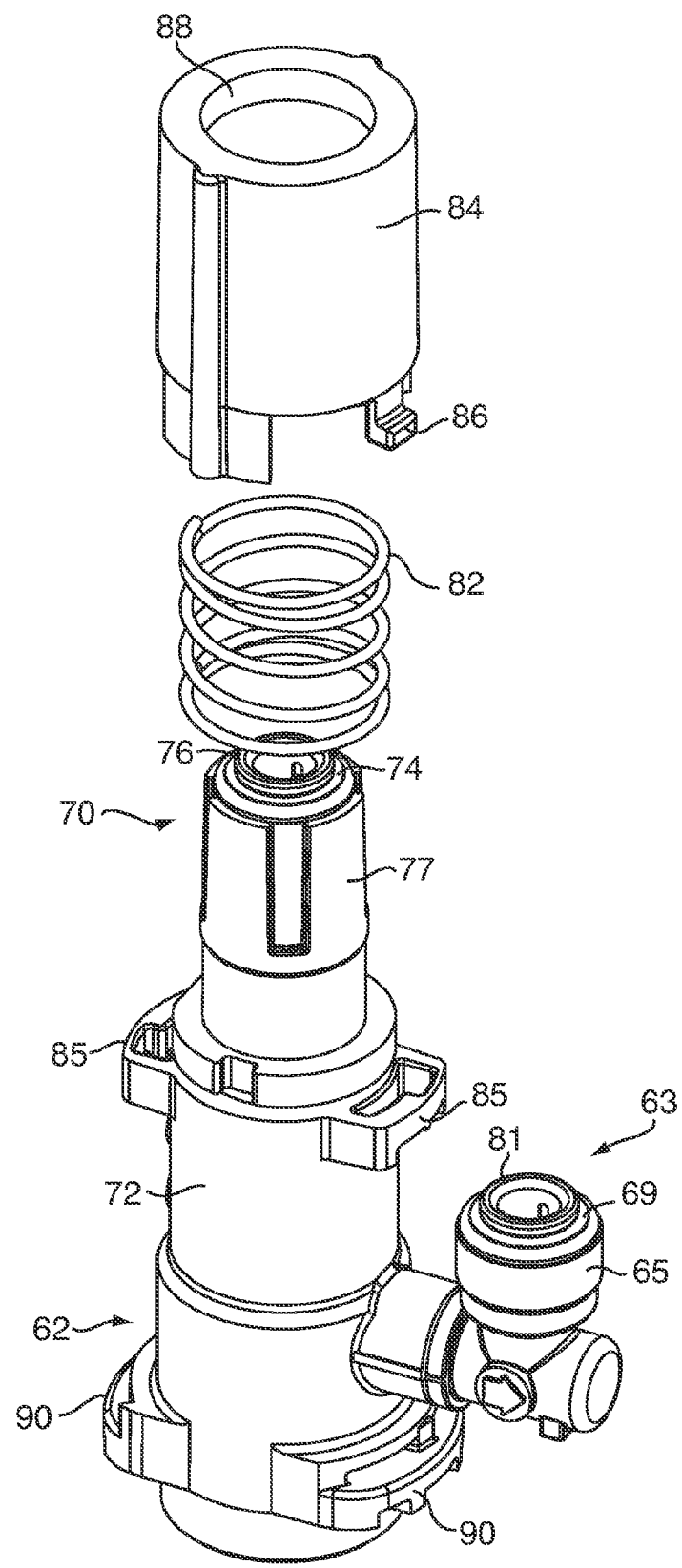
FIG. 4 is an exploded perspective view of the representative head/manifold assembly of FIG. 3.

As illustrated in FIGS. 3 and 4, the manifold assembly 54 comprises the representative head/outlet assembly 62; the representative inlet assembly 70, a representative inlet return or compression spring 82 and a representative inlet return stop 84.

Figure 5:
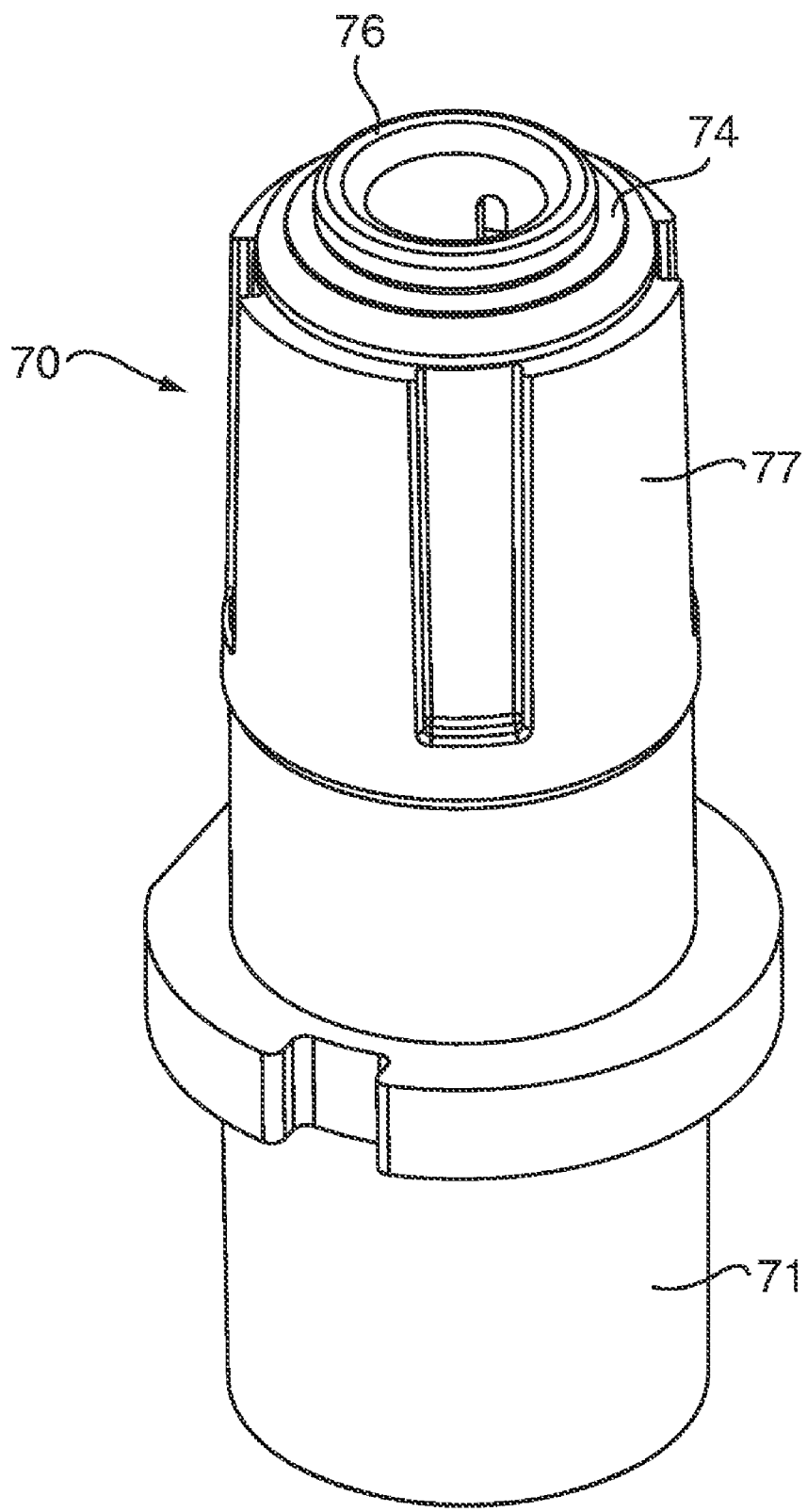
FIG. 5 is a perspective view of a representative inlet assembly component of the fluid filtration system of the present disclosure.
Figure 6:
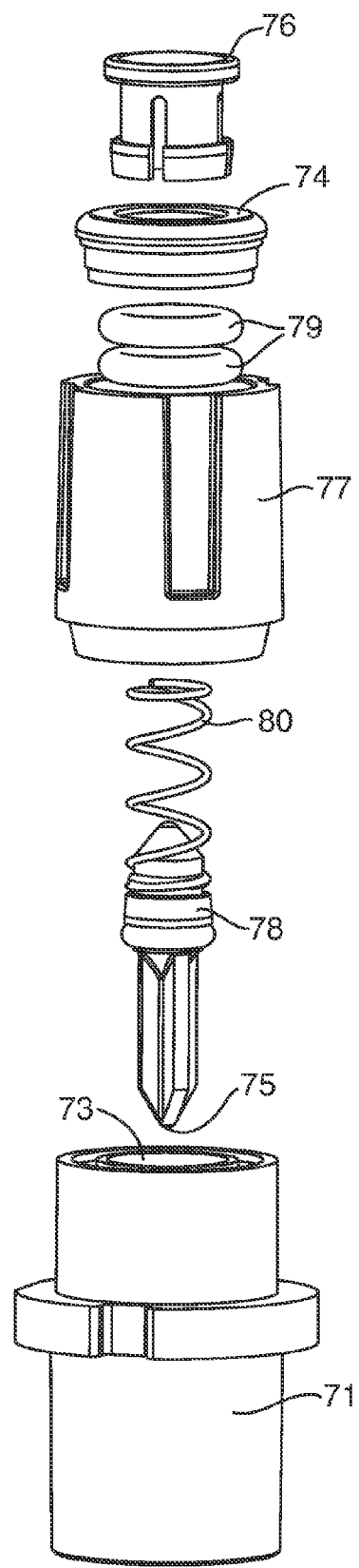
FIG. 6 is an exploded perspective view of the representative inlet assembly component of FIG. 5.
Figure 7:
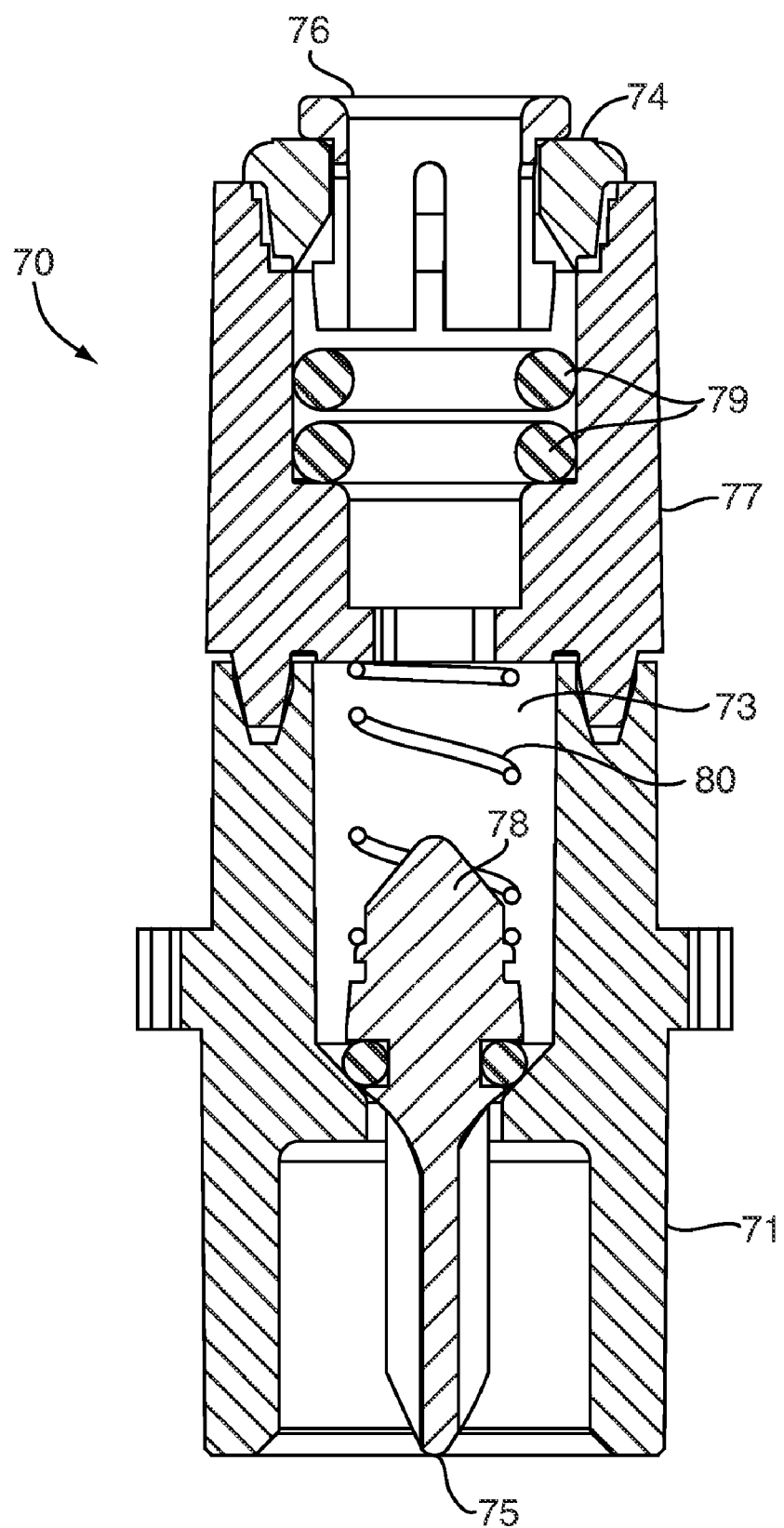
FIG. 7 is a partial cross sectional view of the representative inlet assembly component of FIG. 5.
Figure 8:
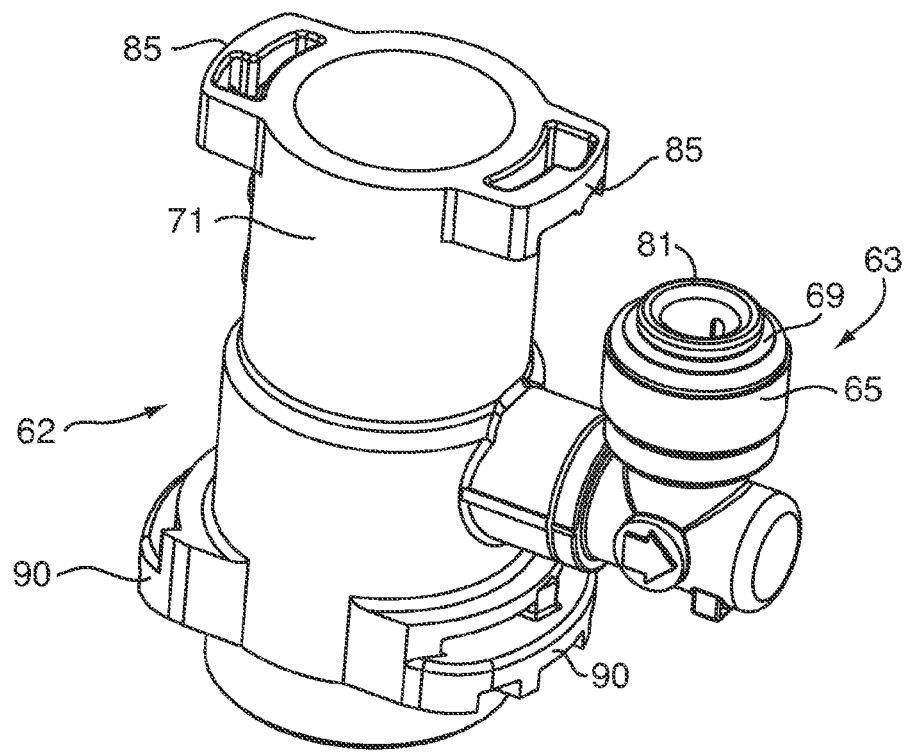
FIG. 8 is a perspective view of a representative head/outlet assembly component of the fluid filtration system of the present disclosure.
Figure 9:
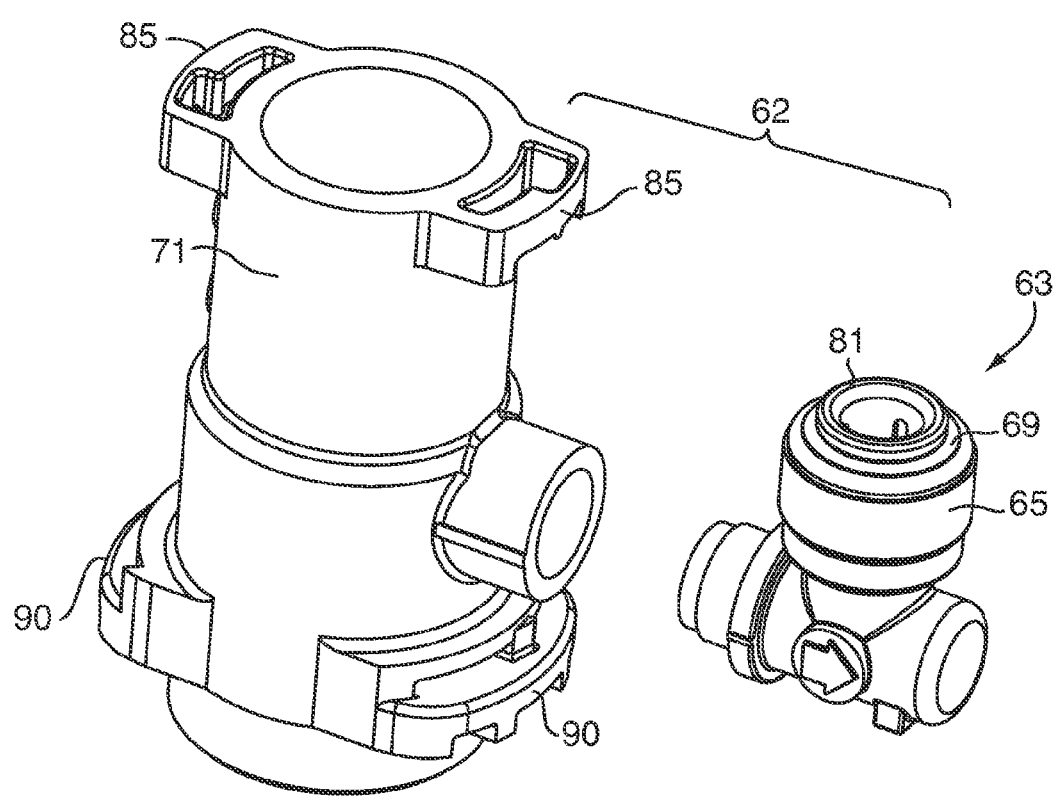
FIG. 9 is a partial exploded perspective view of the head/outlet assembly component of the fluid filtration system of FIG. 8.
Figure 10:
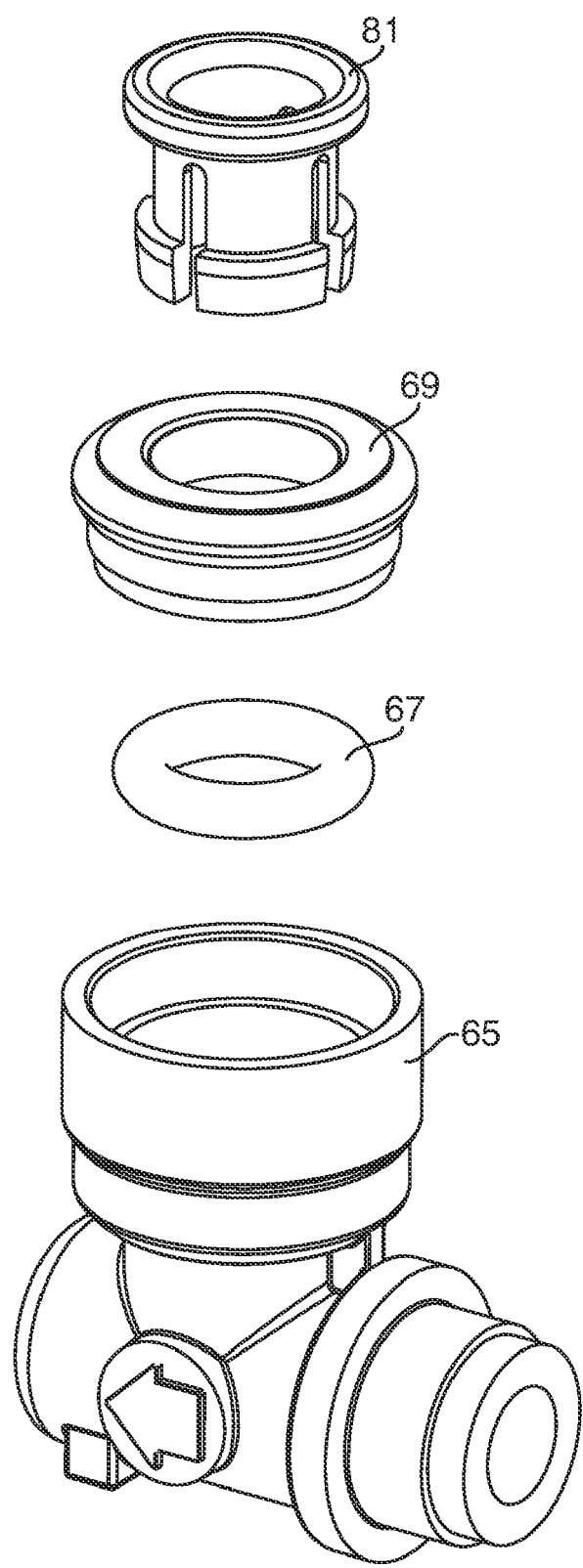
FIG. 10 is an exploded perspective view of the outlet assembly component of FIG. 11.
Figure 11:
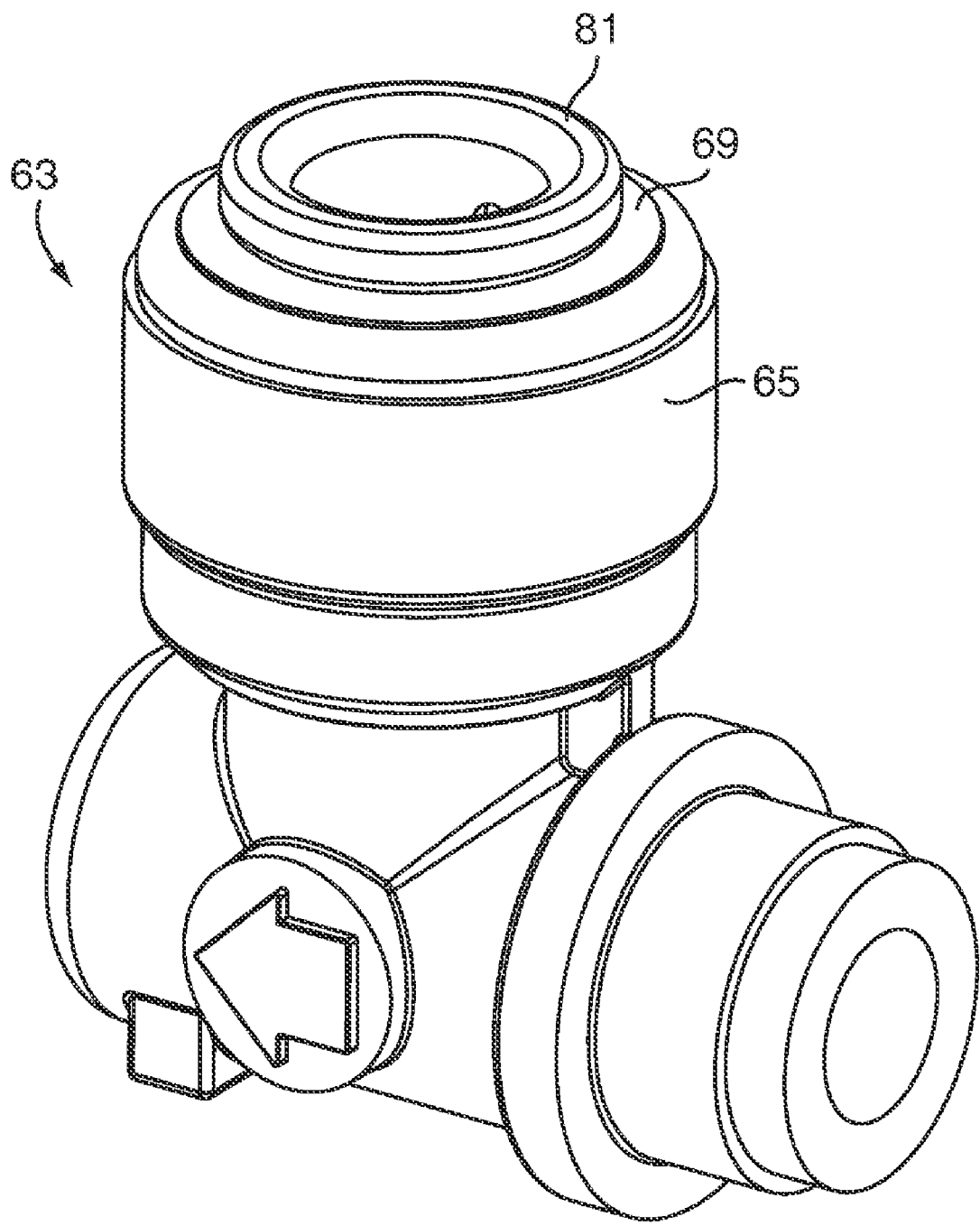
FIG. 11 is a perspective view of the outlet assembly component of the fluid filtration system of the present disclosure.

As illustrated in FIGS. 5-7, one presently preferred embodiment of the inlet assembly 70, according to the present disclosure, comprises a representative manifold interface section or inlet 71, the representative inlet connector 77, a representative poppet valve 78, a representative poppet valve spring 80, a representative collet 74 a representative collet retainer 76, and representative sealing structure or o-rings 79.

As illustrated in FIGS. 8-11, the representative head/outlet assembly 62 comprises a representative outlet assembly 63, a representative outlet connector 65, representative sealing structure or o-ring 67, a representative collet 69 and a representative collet retainer 81.

As illustrated specifically in FIGS. 3-7, the manifold assembly 54, which includes connecting structure 90 for operatively connecting the manifold assembly 54 to the filter cartridge latching system assembly 56 operatively connected to the head/outlet assembly 62, and structure 85 for receiving other connecting structure 86 to be described below. Inlet assembly 70 comprises the manifold interface section or inlet 71, for interfacing with a filter interconnect structure (Head) 72 (see FIG. 3), and comprises inlet connector 77 for receiving sealing structure, such as, for example, an o-ring 79, operatively positioned therein, the inlet poppet valve 78 having a spring 80 operatively positioned thereon for biasing the poppet valve 78 toward the filter cartridge 58, when a filter cartridge is positioned in the liquid filtration system 50 is operatively positioned in interface section 71.

As best illustrated in FIG. 4, the inlet return spring 82 is provided and operatively interfaces with the inlet assembly 70, as will be described in more detail below. Inlet return stop 84 having connecting structure 86 and aperture 88 at respective ends thereof complete the manifold assembly 54 by operatively surrounding the inlet assembly 70 and being operatively connected via connecting structure 86 with complementary connecting structure 85 on filter interconnect structure (Head) 72, as best illustrated in FIGS. 1 and 2.

Figure 52:
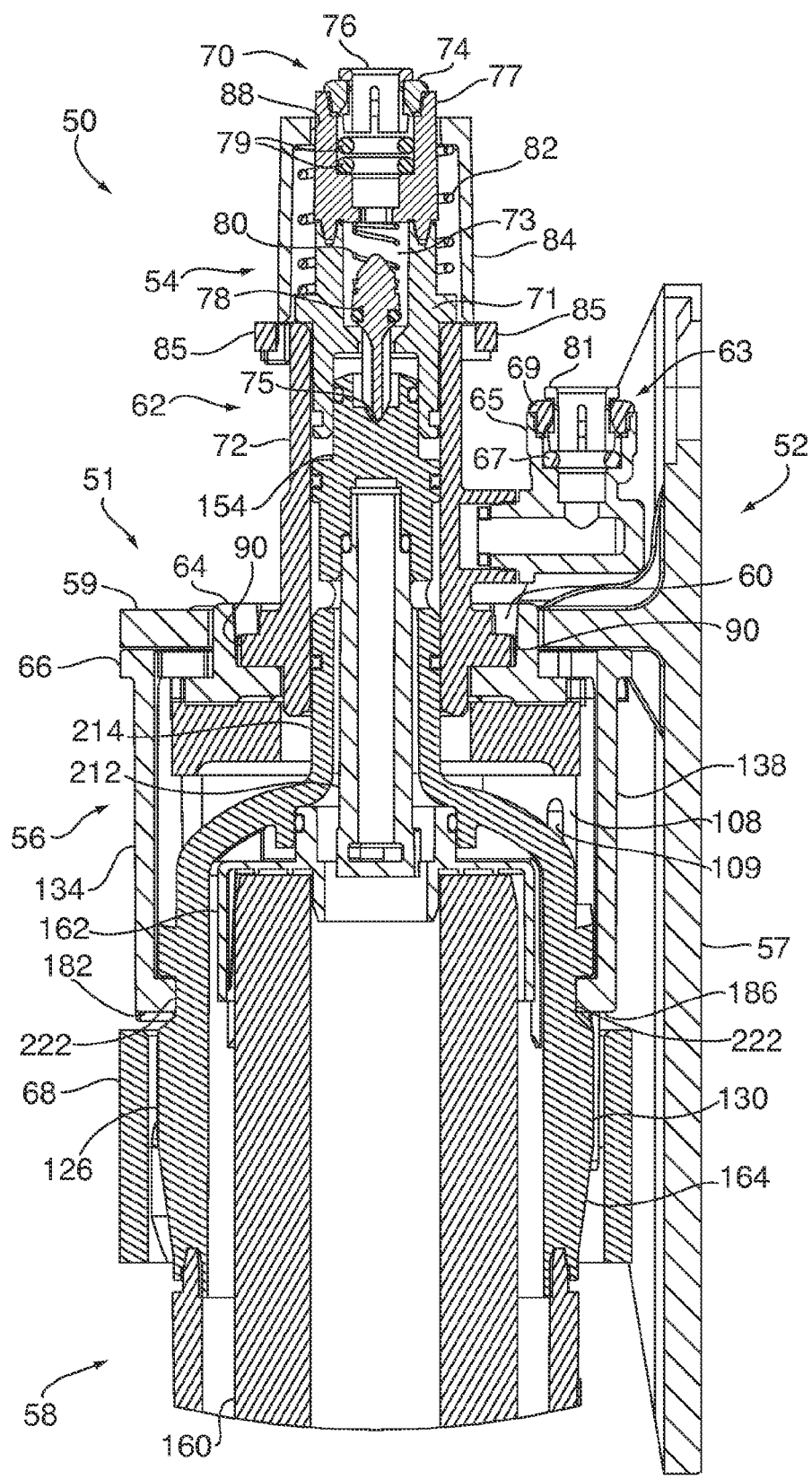
FIGS. 52-54 are cross sectional views that illustrate the high pressure automatic shut off feature of the present disclosure.
Figure 53:
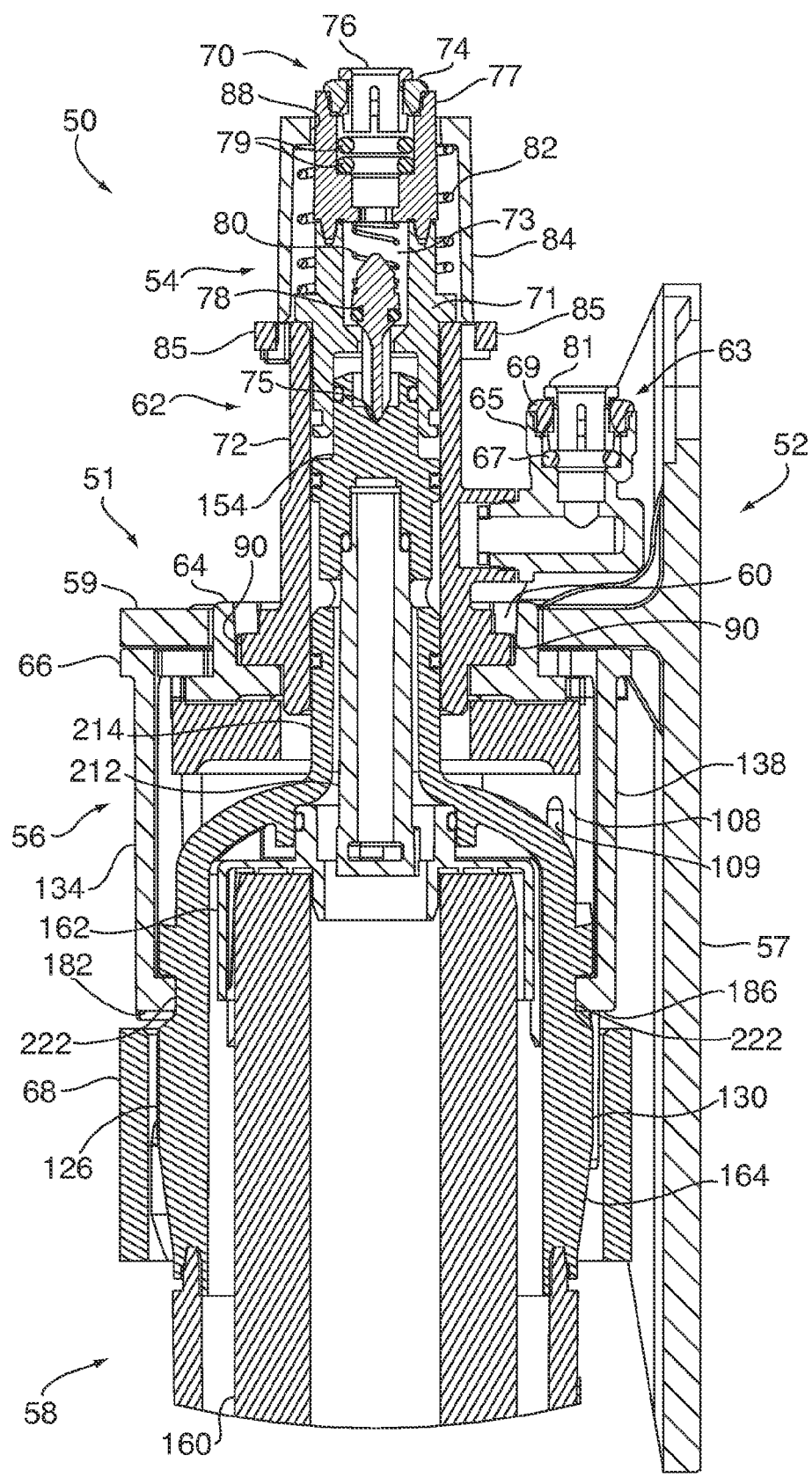
Figure 54:
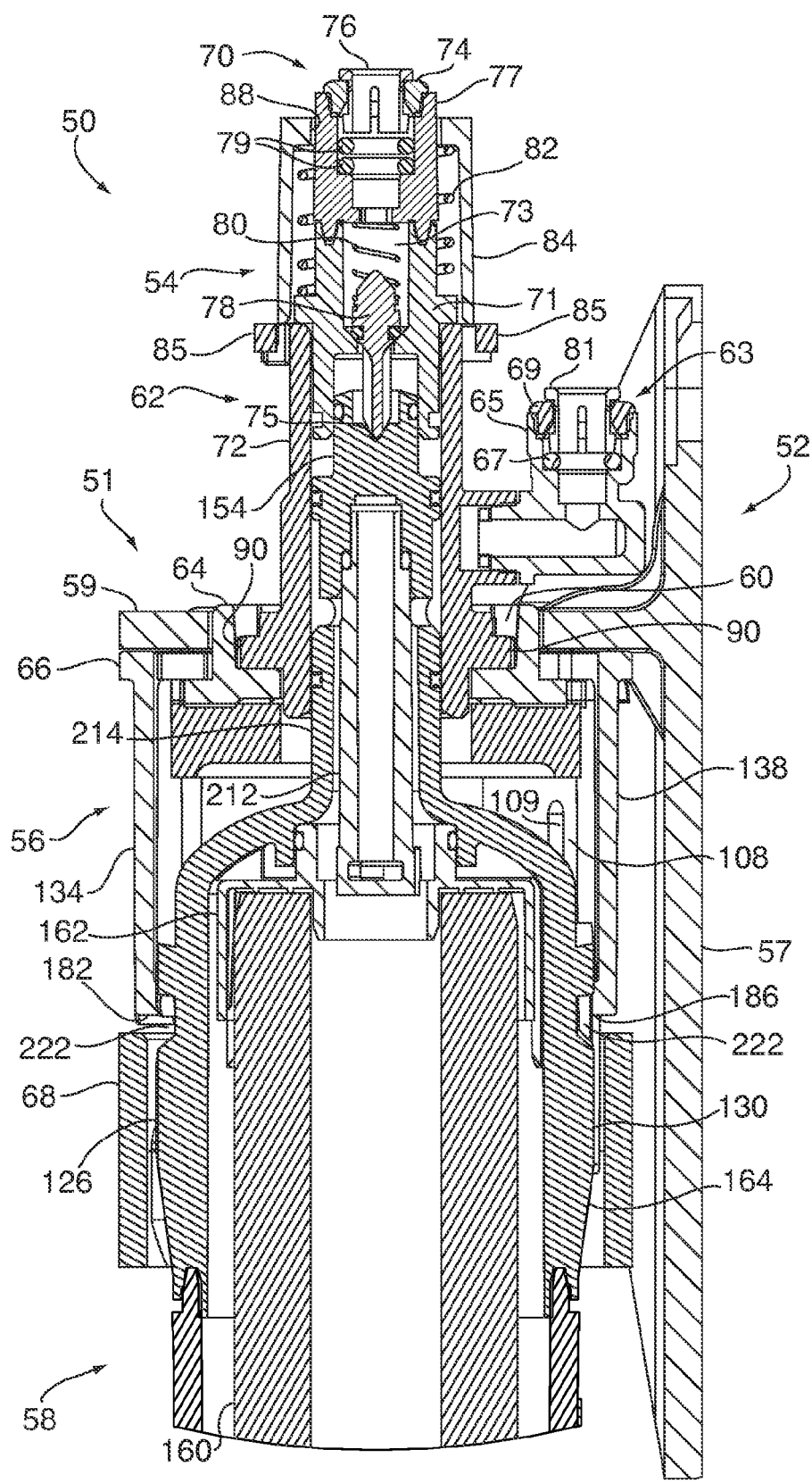

As best illustrated in FIGS. 52-54, since the inlet assembly 70 is a sprung element, the inlet assembly 70 will also traverse up and down due to fluid pressure when the cartridge is installed in the manifold assembly 54. Specifically, the poppet valve 78 is always engaged with a filter cartridge poppet interface 75 when the filter cartridge is installed and the poppet valve 78 is biased in the open position. However, as the fluid pressure of the liquid filtration system 50 is increased, the inlet assembly 70 will start to move up and away from the filter cartridge 58. As the liquid pressure increase is continued, the inlet assembly 70 will move far enough away from the filter cartridge 58 that the poppet valve 78 will close, thus shutting off the inlet liquid pressure.

To have a fluid filtration system with a mechanism that allows the filter to translate in and out (click-in/click-out), it has been found that at least one of the ports that control water flow (inlet or outlet port) into or out of the system must be allowed to "float".

In a static condition (i.e. the fluid filtration system is full of fluid or water, but the outlet port is closed, so that no water can move through the fluid filtration system), water is trapped in every volumetric cavity that can contain water (this is basically between every pressurized O-ring).

So, in order to translate the filter cartridge forward, these volumetric cavities need to be able to translate with the filter (this basically requires that a column of water be moved without changing its volume).

If the inlet of the present disclosure was not allowed to move/translate/float, the column of water that is trapped between the filter O-rings would not be able to translate and would have to be compressed. If these columns of water were required to compress in order to effectuate filter translation, as the filter cartridge is pushed forward during un-install, the force to compress the water that is trapped between the filter O-rings would be extremely high due to hydraulic pressure required to compress water.

Therefore, the benefits derived from the "floating" inlet have been found to be quite desirable to the successful operation of the present disclosure. If the inlet were not allowed to move up and down (float) independently from the head, the straight line push/pull motion of the present disclosure is not believed to be practical at the present time in the environment of intended use. While we have illustrated the inlet as the "floating" component, it should be understood that the outlet or other valve sub assembly that enables water to be displaced without compressing the water could also be utilized as the "floating" component.

This phenomenon of the inlet assembly 70 floating according to the amount of fluid pressure in the system transforms the system of the present disclosure into an automatic liquid shut-off system. As the liquid pressure increases past a selected, predetermined desired maximum operating system pressure, the poppet valve 78 will be closed thereby closing a poppet valve inlet 73 and automatically shutting-off liquid flow to the filter cartridge 58 by the movement of the inlet assembly 70 away from the filter cartridge 58. Once the liquid pressure decreases to a level that is within the selected, operating pressure of the system, the poppet valve inlet 73 will open thereby allowing the fluid to flow into and through the filter cartridge 58 exiting the liquid filtration system 50 via the head/outlet assembly 62.

Because the liquid filtration system 50 of the present disclosure is capable of automatically controlling the operating pressure limits, some unique system safety features directly result therefrom. For example, if the liquid filtration system 50 were to experience a water spike (i.e. water hammer) or high pressure, the downstream components of the inlet assembly (i.e. head, bracket, filter cartridge, outlet assembly, etc) would not be subjected to this water spike or high pressure. Due to this unique and innovative safety feature, the downstream components of the manifold assembly 54 and filter cartridge 58 do not need to be constructed to withstand such high pressure events. Not being required to construct the down stream components to withstand such a high pressure would enable the liquid filtration system manufacturer to realize a significant cost savings in the types of material that need to be used and the strength of those materials used. Fluid filter systems, manufactured in accordance with the present disclosure, could now be built with lower price commodity materials and relatively thin wall sections, as compared to the materials and wall thickness now common in such systems. Utilization of lower price commodity materials and relatively thin wall sections would dramatically reduce the cost of each component from a material cost and a manufacturing cost perspective.

Further, materials that are freeze tolerant (have high percent elongation and high elastic material range) can now be used due to the operation of the pressure limiting valve that prevents high pressures that would normally yield these materials from entering the cartridge. Such materials include, but not limited to, polyethelynes, unreinforced polypropylenes or any other material that would operatively perform the same function in the intended environment, Thus, it is possible to produce a plurality of representative fluid filter systems in accordance with the present disclosure, as described above, which can be customized to whatever pressures limits to which the manufacture desires that the overall fluid filter system should be controlled. As should be understood, shut-off pressures are controlled by the compression spring 82 and by changing the characteristics of this compression spring 82 the opening pressure and the shutoff pressure can be varied, in accordance with known principles.

The Mounting Bracket Assembly

Figure 13:
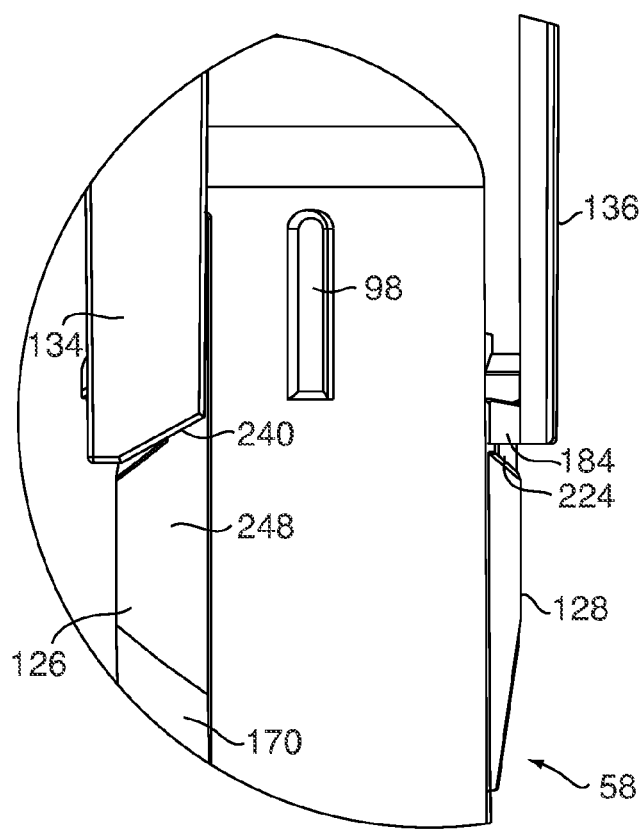
Figure 14:
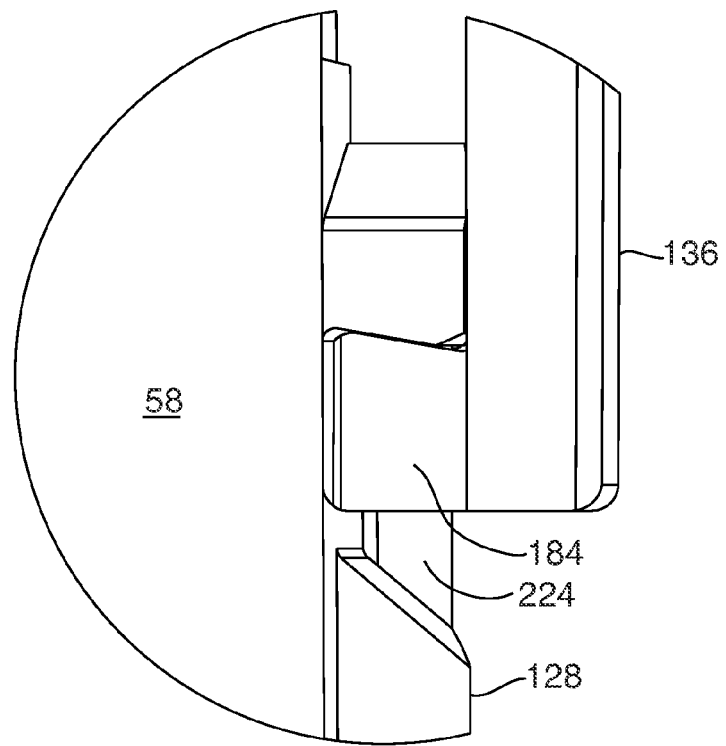
Figure 15:
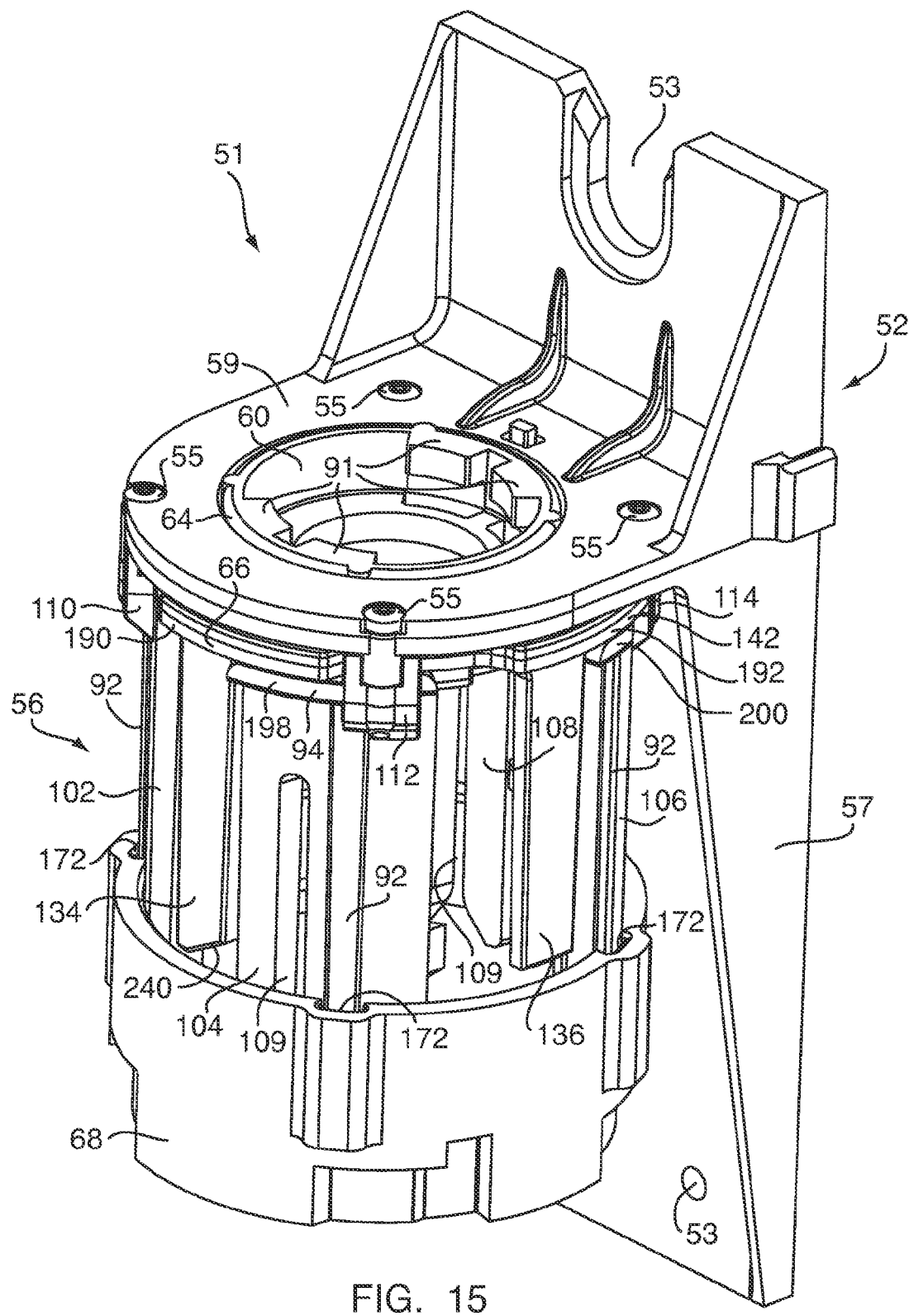
FIG. 15 is a perspective view of the bracket assembly component of the fluid filtration system of the present disclosure.

As illustrated in FIGS. 2 and 12-19, the mounting bracket assembly 51 component of the liquid filtration system 50 of the present disclosure, presently preferably, comprises the representative mounting bracket 52 and the filter cartridge latching system assembly 56. FIG. 15 is a perspective view and FIG. 16 is an exploded view of one representative mounting bracket assembly 51, in accordance with the present disclosure. As specifically illustrated in the exploded view, the mounting bracket assembly 51 comprises the mounting bracket 52 and the filter cartridge latching system assembly 56. As illustrated, the mounting bracket 52 comprises, presently preferably, a one piece molded part, having a base portion 57 and the attachment portion 59, presently preferably, formed perpendicular to the base portion 57. The base portion 57 comprises representative structure 53 for securing the liquid filtration system 50 to other structure, such as, for example, a refrigerator, as is known in the art. The attachment portion 59 comprises connecting structure 91 for receiving and operatively connecting the filter cartridge latching system assembly 56 and the manifold assembly 54.

As illustrated, the base portion 57 comprises structure, for receiving fastening structure 55, such as, for example, mounting bracket screws, which interface and interconnect the mounting bracket 52 with the filter cartridge latching system assembly 56.

As illustrated in FIGS. 15-16, and particularly the exploded view of FIG. 16, the filter cartridge latching system assembly 56 comprises the main bracket 64, the latch 66, the alignment collar 68 and resilient means or assembly biasing structure, such as, for example, latch return springs, 148, 149. As will be explained in greater detail, the filter cartridge latching system assembly 56 comprises structure, presently preferably slots, 172, operatively formed in the combination alignment collar 68/main bracket extension members 102, 104, 106, 108, for aligning the filter cartridge 58 with the inlet assembly 70 housed in the manifold assembly 54. The main bracket extension members 104, 108 also include structure or slots 109 for assisting the alignment of the filter cartridge 58 with collar 68 during the insertion of the filter cartridge 58 into the filter cartridge latching system assembly 56. Further, the main bracket 64 comprises a bore 60 for allowing the interface of the filter cartridge stem 154 with the inlet assembly 70 along with structure 110, 112, 114, 116, operatively positioned therein, for interfacing with the connection structure or mounting bracket screws 55 to operatively secure the main bracket 64 to the mounting bracket 52. Further, connecting structure 91, for operatively connecting the manifold assembly 54 to the mounting bracket assembly 51, operatively positioned at the top of the main bracket 64 and proximate to the bore 60, as described above.

Figure 23:
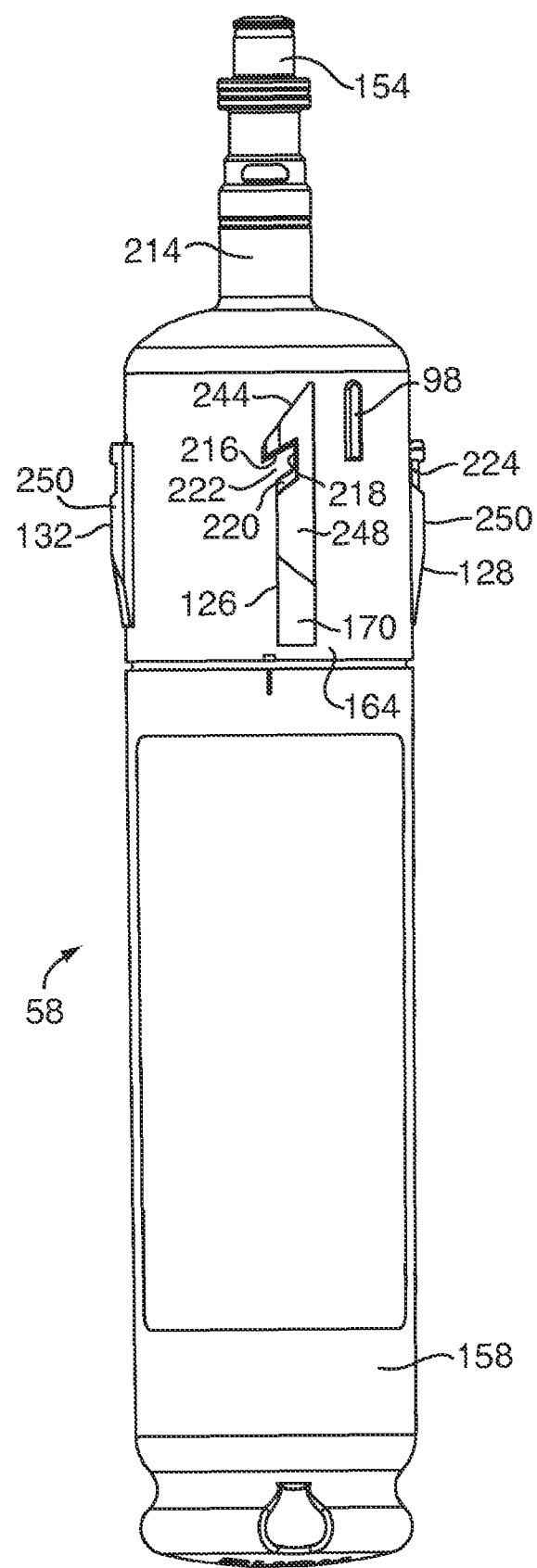
FIG. 23 is a perspective view of the representative filter cartridge assembly component illustrating the single outlet port of the representative filtration system of the present disclosure.

In the presently preferred representative embodiment, the inside surface of the alignment collar 68 and the outer surfaces of the main bracket extension members 102, 104, 106, 108 are adapted to operatively interface such that cartridge latching structure 126, 128, 130, 132, as best illustrated in FIG. 23 presently preferably, formed as protrusions from the outer surface of the filter cartridge 58 must be aligned before the filter cartridge 58 can be properly inserted into the inlet assembly 70.

Figure 20:
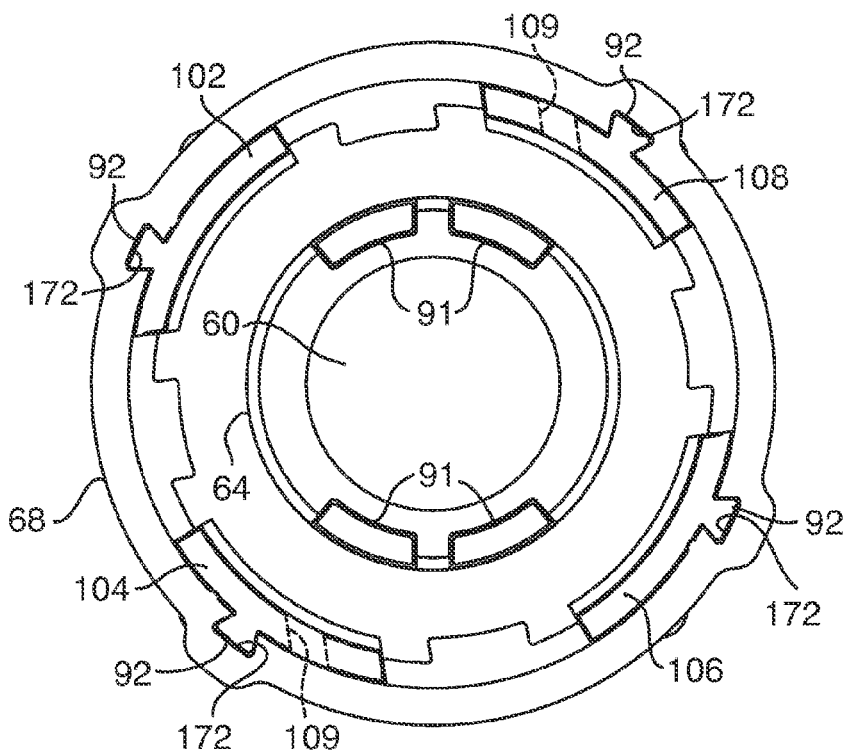
FIG. 20 is an end cross sectional view of the assembled main bracket and the alignment collar of the representative fluid filtration system of the present disclosure.

As illustrated in FIGS. 16, 19 and 24-25, one representative embodiment that has proven effective in the utilization of the present disclosure in the intended environment comprises two sets of opposing main bracket extension members 102, 104, 106, 108, presently preferably, one of the two sets of extension members 104, 108 have slots 109 formed therein for receiving corresponding alignment members 98, 100 formed on the face of the outer surface of filter cartridge 58 proximate the cartridge latching structure 126, 130. While it is presently preferred that the corresponding cartridge alignment members 98, 100 formed on the face of the outer surface of filter cartridge 58 and protrude from the surface thereof in order to operatively interface with the corresponding alignment members in the form of slots 172 (FIG. 20) on the alignment collar 68 and slots 109 formed in the main bracket extension members 104, 108, it should be understood that any corresponding structure that is effective to accomplish the desired interface of the filter cartridge and the latching mechanism presently know to those skilled in the art and those presently unknown but that subsequently become known to those skilled in the art is intended to be encompassed by the present disclosure and claims. Specifically, such modifications as positioning slots on the surface of the filter cartridge and corresponding protrusions on the alignment collar and main bracket would be representative examples of one type of an infinite number of modifications envisioned above.

In the practice of the system of the present disclosure, one representative embodiment comprises the permanent attachment of the main bracket 64 to the alignment collar 68 by press fitting, or other attachment methods, such as, for example ultra sonic welding, snap fitting etc. and any other method presently known to those skilled in the art and those methods that are presently unknown, but would be understood to perform this function once they become known to those skilled in the art.

Figure 12:
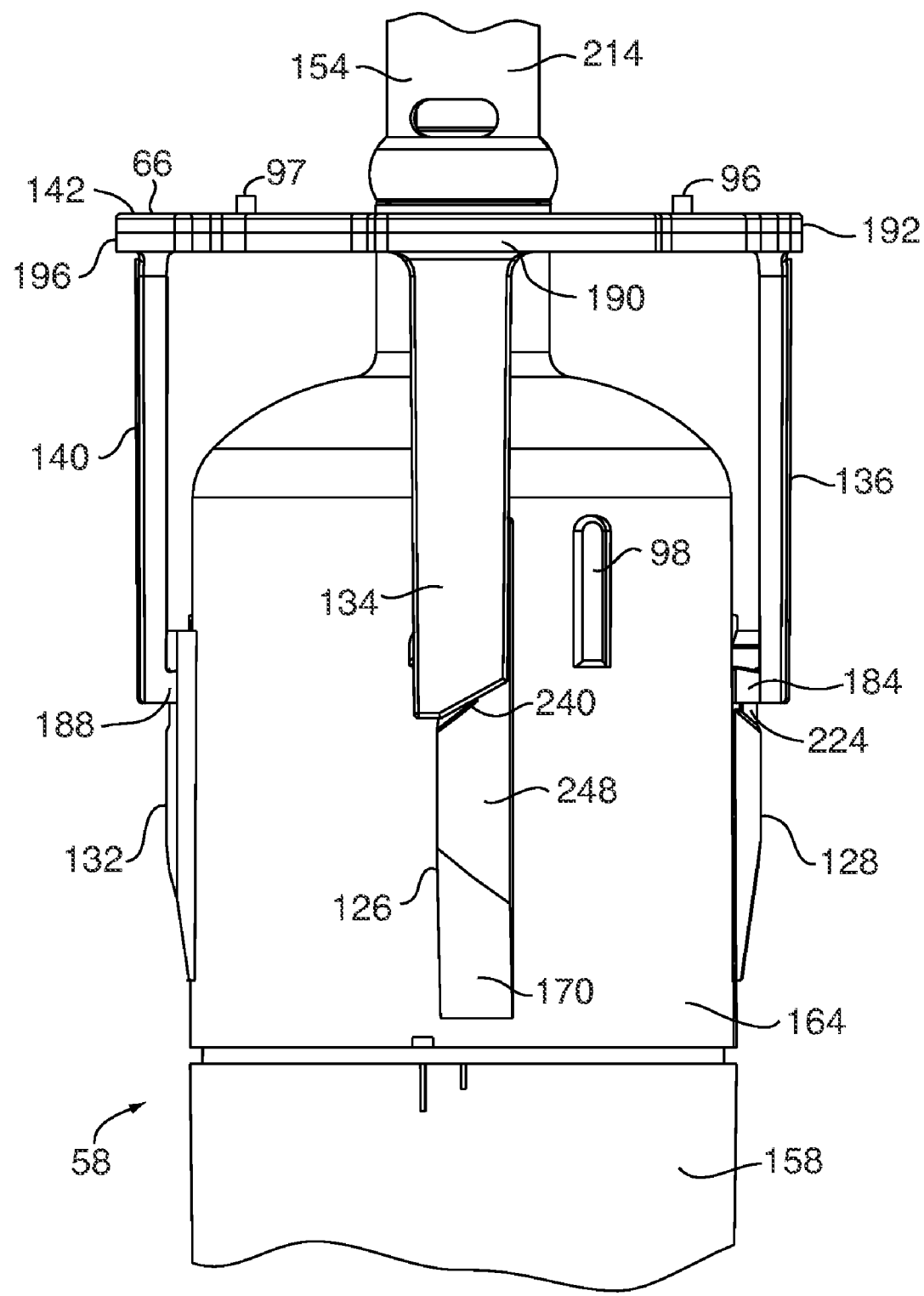
FIGS. 12-14 are various views that illustrate the overlapped connecting members of the latch member and the filter cartridge of the representative filtration system of the present disclosure.
Figure 42:
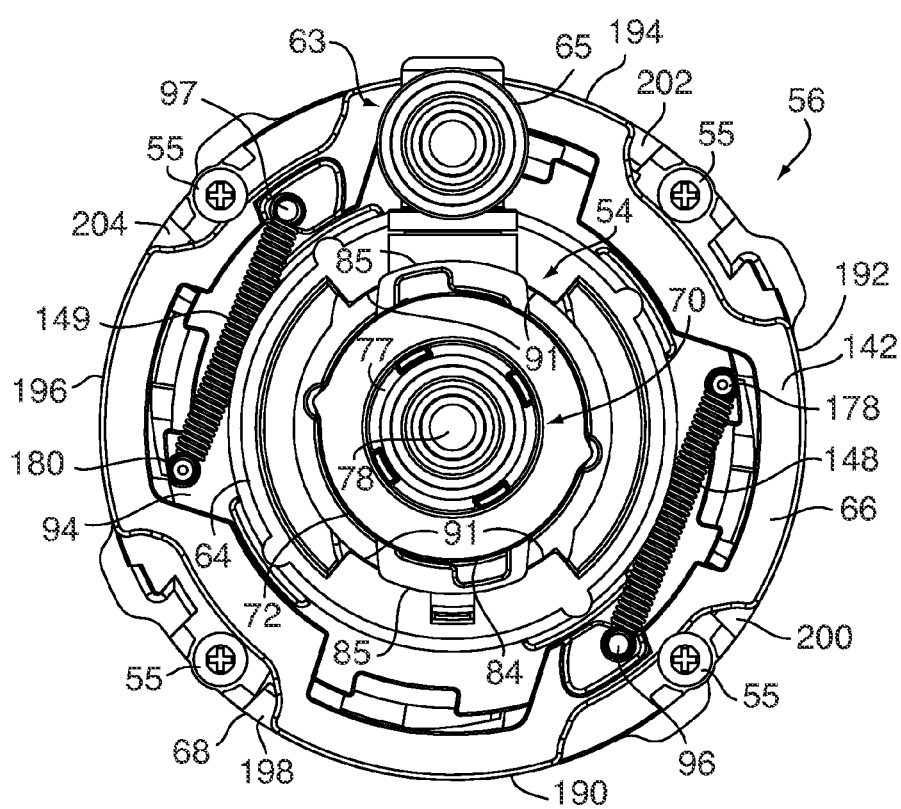
Figure 43:
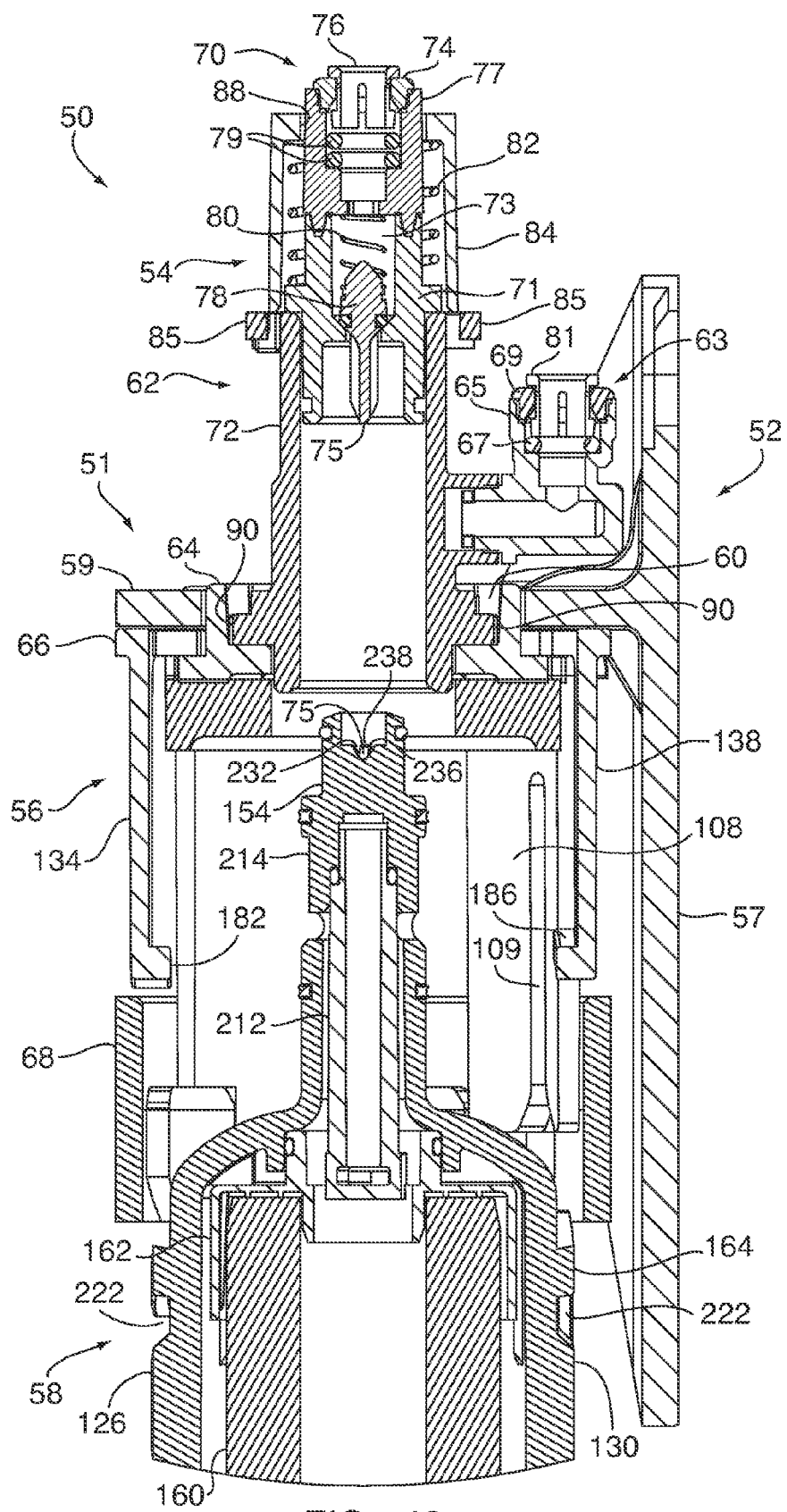
FIGS. 43-48 are cross sectional views of the filter cartridge manifold illustrating the installation of the filter cartridge assembly sub component of FIG. 23 into the manifold assembly of FIG. 3.
Figure 44:
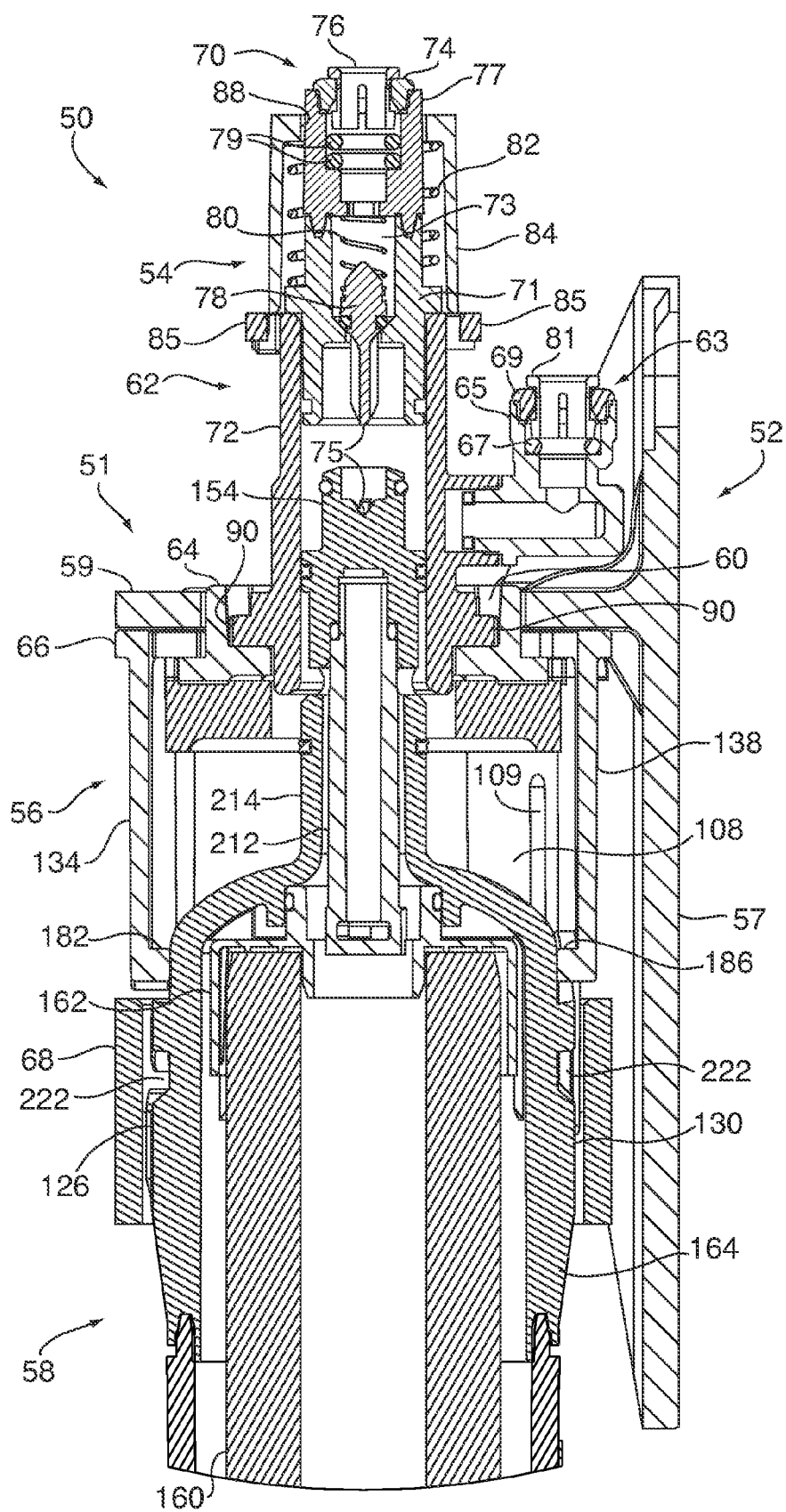

As best illustrated in FIGS. 12 and 16, the latch 66 comprises a rim 142 having two sets of, presently preferably, opposed extension members 134, 136, 138, 140 projecting perpendicular thereto. As illustrated, the latch 66 is operatively positioned over the main bracket 64 such that the top surface of the main bracket rim 94 and lower surface of the latch assembly rim 142 are in sliding/bearing like contact. Projecting from the upper surface of the latch rim 142 are two protrusions 96, 97 for securing the latch biasing structure 148, 149, presently preferably, latch return springs to corresponding protrusions 178, 180 extending vertically from the top surface of the main bracket rim 94, as illustrated in FIGS. 42-44.

As best illustrated in FIGS. 12-16, the two sets of, presently preferably, opposed extension members 134, 136, 138, 140 have projection members 182, 184, 186, 188 extending, presently preferably, perpendicularly from the inner surface thereof toward the center of the bore 60 formed in the latch assembly rim 142. The latch rim 142, presently preferably, comprises two sets of corresponding structure 190, 192, 194, 196 for interfacing with corresponding structure 198, 200, 202, 204 of the main bracket rim 94. The interface between the upper surface of the main bracket rim 94 and the lower surface of the latch rim 142 provides a bearing like surface for the limited rotation of the latch 66 relative to the main bracket 64, thereby facilitating the engagement and disengagement of the filter cartridge 58 from the system of the present disclosure, as will be discussed in detail below.

The projection members 182, 184, 186, 188 of the two sets of, presently preferably, opposed extension members 134, 136, 138, 140 of the latch 66 are adapted to interface with corresponding cartridge latching structure 126, 128, 130, 132, presently preferably, in the form of notches 222, 224 (see FIGS. 24-25) in order to secure the filter cartridge 58 in proper, nonreleasable, position in the manifold assembly 54.

As best illustrated in FIGS. 12-14, the inventors of the present disclosure have discovered that having the thickness of the innermost surface of the ends of at least two of the latch member projection members 184, 188 greater than the thickness of opposed extension members 136, 140 at the interface between the two latch member projection members 184, 188 with corresponding structure on the cartridge latching structure 128, 132 on filter cartridge 58 outer surface provides a more than adequate means for preventing the inadvertent disengagement of the filter cartridge stem 154 from the inlet assembly 70.

In fact, during testing of representative embodiments of the present disclosure, the interlocking components of the two latch member projection members 184, 188 with the corresponding cartridge latching structure 128, 132 on the outer surface of the filter cartridge 58, inadvertent disengagement of the filter cartridge 58 from the system manifold assembly 54 did not occur, even during extreme conditions because the mating surfaces of the latch 66 and the filter cartridge latching structure 128, 132 have matching reverse angles that interlock/move together when a force, such as pressure, is applied to the filter cartridge from the stem or neck 154 toward the bottom thereof in the direction of disengagement of the filter cartridge from the manifold, as illustrated in FIGS. 56-59.

Filter Cartridge Latching System Assembly

The representative filter cartridge latching system assembly 56 of the present disclosure is unique and innovative to the application of fluid manifold/filter cartridge interface connections.

Figure 17:
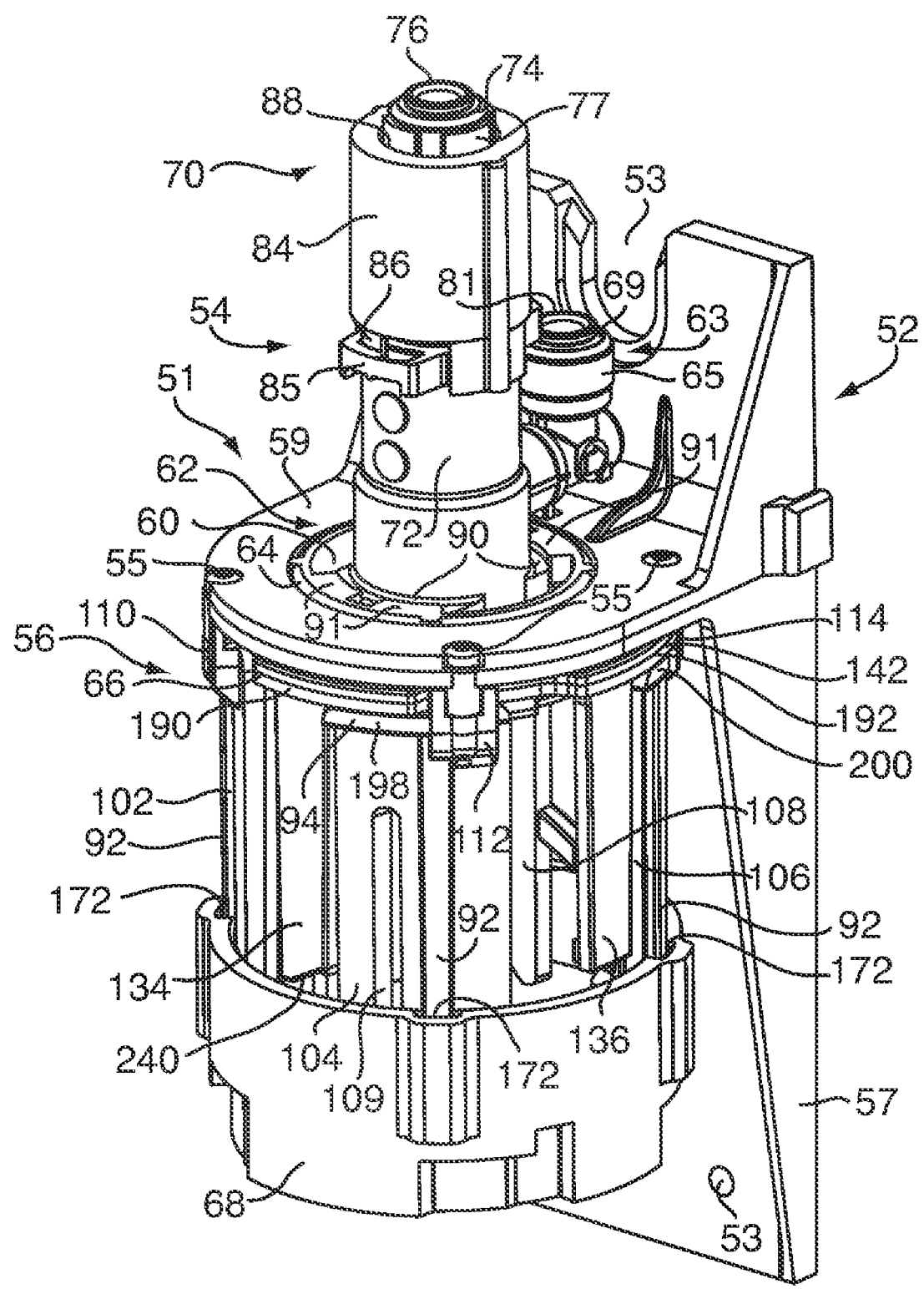
FIG. 17 is a perspective view of a representative manifold bracket assembly component fluid filtration system of the present disclosure.
Figure 18:
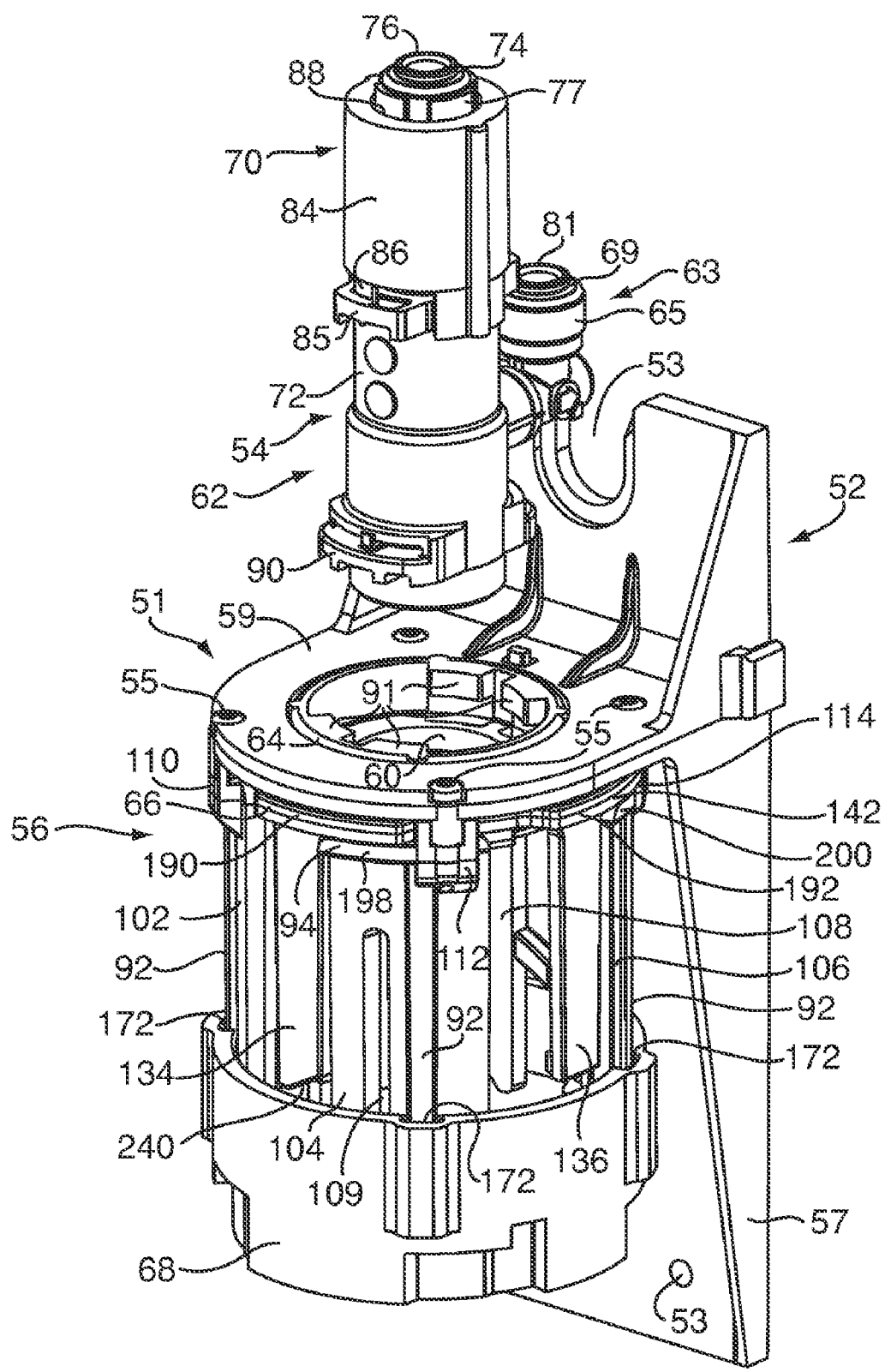
FIG. 18 is an exploded perspective view of the representative manifold bracket assembly component of FIG. 17.

As illustrated in FIG. 16, the relationship between the mounting bracket 52 and the filter cartridge latching system assembly 56 is as illustrated by an exploded view thereof. FIG. 17 shows the mounting bracket 52 and the filter cartridge latching system assembly 56 as an assembled unit resulting from the operative connection thereof.

The operation of the presently preferred, representative filter cartridge latching system assembly 56 of the present disclosure can be best described as functioning some what like a retractable ball point pen. In the retractable ball point pen system, when the pen actuator is depressed, the ball point cartridge will translate out from inside the pen barrel and latch itself in an extended position so that the ball point is exposed. When the pen actuator is depressed again, the ball point will unlatch itself and be retracted back inside the barrel of the pen body.

The operation of the latching mechanism of the present disclosure operates basically the opposite of the retractable ball point pen description above. Specifically, as the filter cartridge 58 is inserted into the filter cartridge latching system assembly 56 and becomes latched using a series of cam features and springs. This latching/camming motion is derived from a linear translation of the filter cartridge 58 into the manifold assembly 54 and filter cartridge latching system assembly 56. The same linear translations/motions are used to un-install (or unlatch) the filter cartridge 58 from the filter cartridge latching system assembly 56 as were used to install (or latch) the filter cartridge 58 into the operating position.

One clear advantage that results from utilization of the presently preferred representative filter cartridge latching system assembly 56 of the present disclosure is that the user only has to impose one direction of motion onto the filter cartridge 58 to have the filter cartridge 58 operatively lock into the manifold assembly 54 such that liquid flows into the filter cartridge 58. In other prior known systems currently on the market, the user has to make at least two separate motions in order to have the filter cartridge operatively lock into the manifold assembly 54 such that liquid flow into the filter cartridge. In the prior known systems, both a translational and a rotational (i.e. ¼ turn devices) or two separate translations (push buttons) have been required in order to result in the completion of the same operation.

The presently preferred, representative fluid filter system 50 of the present disclosure eliminates the high breakout torque phenomenon associated with the prior ¼ turn devices. As is known, the high breakout torque phenomena is the result of the high compression rates applied to the sealing O-rings and the rotation of these highly compressed O-rings needed to disengage the filter cartridge from the manifold assembly 54. In the presently preferred, representative system of the present disclosure, no rotation of the highly compressed O-rings is required. The system of the present disclosure is effective to prevent rotational movement of the highly compressed O-rings and allows only translation movement of the highly compressed O-rings which dramatically reduces the seal breaking force needed to unlatch and remove the filter cartridge from an operative connection with the manifold assembly 54.

The unique and innovative filter cartridge latching system assembly 56 of the present disclosure will now be described in detail. As stated above, the filter cartridge latching system assembly 56 is the mechanism that is operatively connected to the manifold assembly 54 and to the mounting bracket 52. As illustrated in FIGS. 12-17, the filter cartridge latching system assembly 56 comprises three basic components, the main bracket 64, the latch 66, the alignment collar 68 and at least one resilience structure, such as, for example, a spring structure, such as, latch return springs 148, 149, as will be described below. In general, the main bracket 64 is, presently preferably, an injected molded piece having at one end connecting structure 91 for interfacing with the manifold assembly 54 and at the other end structure 92 on the outer surfaces of the main bracket extensions 102,104,106,108 for interfacing with the alignment collar 68. The main bracket 64 further comprises a main bracket rim 94 having at least two protrusions 178,180 formed thereon and projecting away from the surface of the main bracket rim 94 and four main bracket extension members 102, 104, 106, 108 projecting in the opposite direction from the other side of the main bracket rim 94.

During the assembly of the filter cartridge latching system assembly 56, the main bracket 64 is operatively connected to the alignment collar 68 such that the structure 92 on the outer surfaces of the main bracket extensions 102,104,106,108 interface with the slots 172 on alignment collar 68. Structure 110, 112, 114, 116 is formed at operative locations on the main bracket rim 94 for connecting the main bracket 64 to the mounting bracket 52 through the use of fastening structure 55, such as for example screws or any other known fastener that is capable of performing the function required in an acceptable manner or any yet to be discovered fastener capable of performing the required function. Further, four projection members 182, 184, 186, 188 extend from the inner surface of the four opposed extension members 134, 136, 138, 140 for operatively cooperating with the corresponding cartridge latching structure 126, 128, 130, 132 for latching and unlatching on the filter cartridge 58 such that the stem or neck 154 of the filter cartridge 58 is readily installed and subsequently readily removed from engagement with the manifold assembly 54.

The main bracket rim 94 and the four opposed extension members 134, 136, 138, 140 of the latch rim 142 are adapted such that the latch rim 142 and the main bracket rim 94 interface with each other in a manner that enables rotational movement of two projection members 96,97 of the latch rim 142 of the latch 66 back and forth within a defined space, as illustrated in FIGS. 42-44. In order to control the rotation of the four opposed extension members 134, 136, 138, 140, at least one, and, presently preferably two, representative resilience means or latch return springs 148, 149, such as, for example, a coil spring, a leaf spring, an extension spring, or any other presently known or unknown resilient structure capable of operatively performing the required function, is operatively connected thereto such as, for example, with one end of the illustrated coil spring being connected to a protrusion 178, 180 from the rim 94 of the main bracket 64 and the other end being connected to a protrusion 96, 97 from the latch rim 142.

Figure 21:
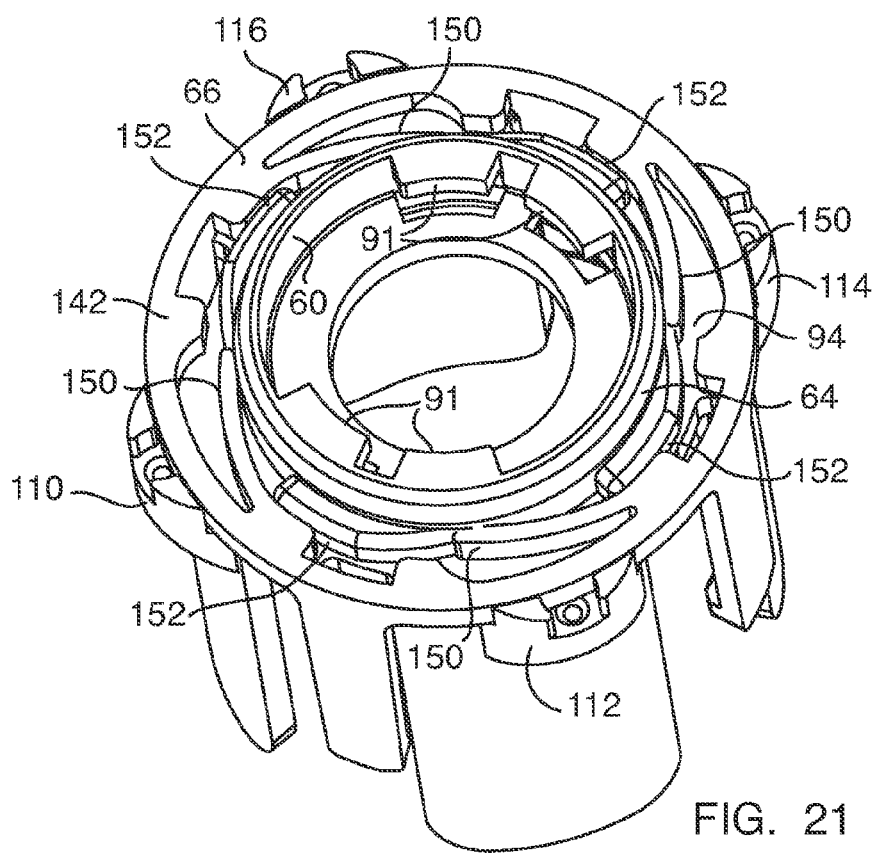
FIG. 21 is a perspective view of a representative alternative rotational biasing system of the representative filtration system of the present disclosure.

An alternative representative embodiment that could be used, as another representative embodiment, is illustrated in FIG. 21 and comprises four leaf spring elements 150 formed integral with the latch assembly rim 142 and four bracket cam surfaces 152 operatively positioned on the main bracket rim 94. It is this rotational movement that enables each of the four projection members 182, 184, 186, 188, to interact with the cartridge latching structure 126, 128, 130, 132, formed on the surface of the filter cartridge 58. It should be understood that other types of resilient structures could also effectively function to accomplish this rotation and that the claims of the present application are intended to encompass all such structures.

As mentioned above, structure for interacting with the four opposed extension members 134, 136, 138, 140 is illustrated in FIGS. 1-2 and 19-22. As illustrated, the representative structure, presently preferably, comprises projections above the surface of the filter cartridge external surface or cartridge latching structure 126, 128, 130, 132. While specific shaped structures are illustrated, it should be understood that any other shape that is capable of achieving the results of the specific structure shown are intended to be within the scope of the claims of the present application. It is believed that there are numerous combinations of material and structures that could be used to accomplish the same results as that accomplished by the specific representative embodiments illustrated and such are considered to be within the scope of the innovation of the present disclosure.

As will be explained in more detail during the operation of the systems of the present disclosure, it is important that whatever structure and/or material is selected for the four opposed extension members 134, 136, 138, 140 and the corresponding cartridge latching structure 126, 128, 130, 132, formed on the filter cartridge 58 be capable of certain actions that allow the filter cartridge to be engaged with and disengaged from the manifold assembly 54 without imparting rotational forces to the filter cartridge. In the specific representative embodiment illustrated, the four opposed extension members 134, 136, 138, 140 presently preferably are capable of movement away from and toward the surface of the filter cartridge 58 during installation and removal of the filter cartridge 58 from the manifold assembly 54. Further, the four opposed extension members 134, 136, 138, 140 are presently preferably capable of rotating between the openings in main bracket 64 to facilitate the engagement of the projection members 182, 184, 186, 188 formed on the inner surface of the four opposed extension members 134, 136, 138, 140 with cartridge latching structure 126, 128, 130, 132 formed on the outer surface of the filter cartridge 58. Even further, the four opposed extension members 134, 136, 138, 140 must be operatively connected to structure 190, 192, 194, 196 for interfacing with corresponding structure 198, 200, 202, 204 of the main bracket rim 94 that enables the opposed extension members 134, 136, 138, 140 to rotate away from the protrusion 178, 180 of the main bracket 64 and then be forced back away from the main bracket protrusion 178, 180 into engagement with the cartridge latching structure 126, 128, 130, 132 on the outer surface of the filter cartridge 58.

By the same token, upon the straight line push/pull motion of the filter cartridge 58 into the manifold assembly 54, the complementary structure of the projection members 182, 184, 186, 188 of the four opposed extension members 134, 136, 138, 140 and the cartridge latching structure 126, 128, 130, 132 on the outer surface of the filter cartridge 58 must be capable of disengaging so that the filter cartridge 58 can be removed from engagement with the manifold assembly 54 by simply moving the filter cartridge 58 into the manifold assembly 54 without any rotational movement thereof. Once this has occurred, the filter cartridge 58 is readily removed from engagement with the manifold assembly 54 and a new cartridge 58 can then be moved into engagement with the manifold assembly 54.

Specifically, among the innovative features of the present disclosure, it has been determined desirable to load the latch return springs 148,149 to give positive engagement. Further, it has also been determined desirable to enable the system to allow for latch over-ride and forced engagement during installation of the filter cartridge 58. In the specific representative embodiment illustrated, it has been determined desirable to spring the latch using dual latch return springs 148, 149, although it is recognized that more or less springs could be effectively utilized. Finally, it has also been determined desirable to use four opposed extension members 134, 136, 138, 140 to engage with filter cartridge 58, although it is recognized that the utilization of more or less extension members may be sufficient to effectively accomplish the interconnection function, as would be understood by those skilled in the art.

At this point, we will now describe a representative filter cartridge assembly 58 component of the liquid filtration system 50, as contemplated in the present disclosure.

The Filter Cartridge Assembly

Figure 22:
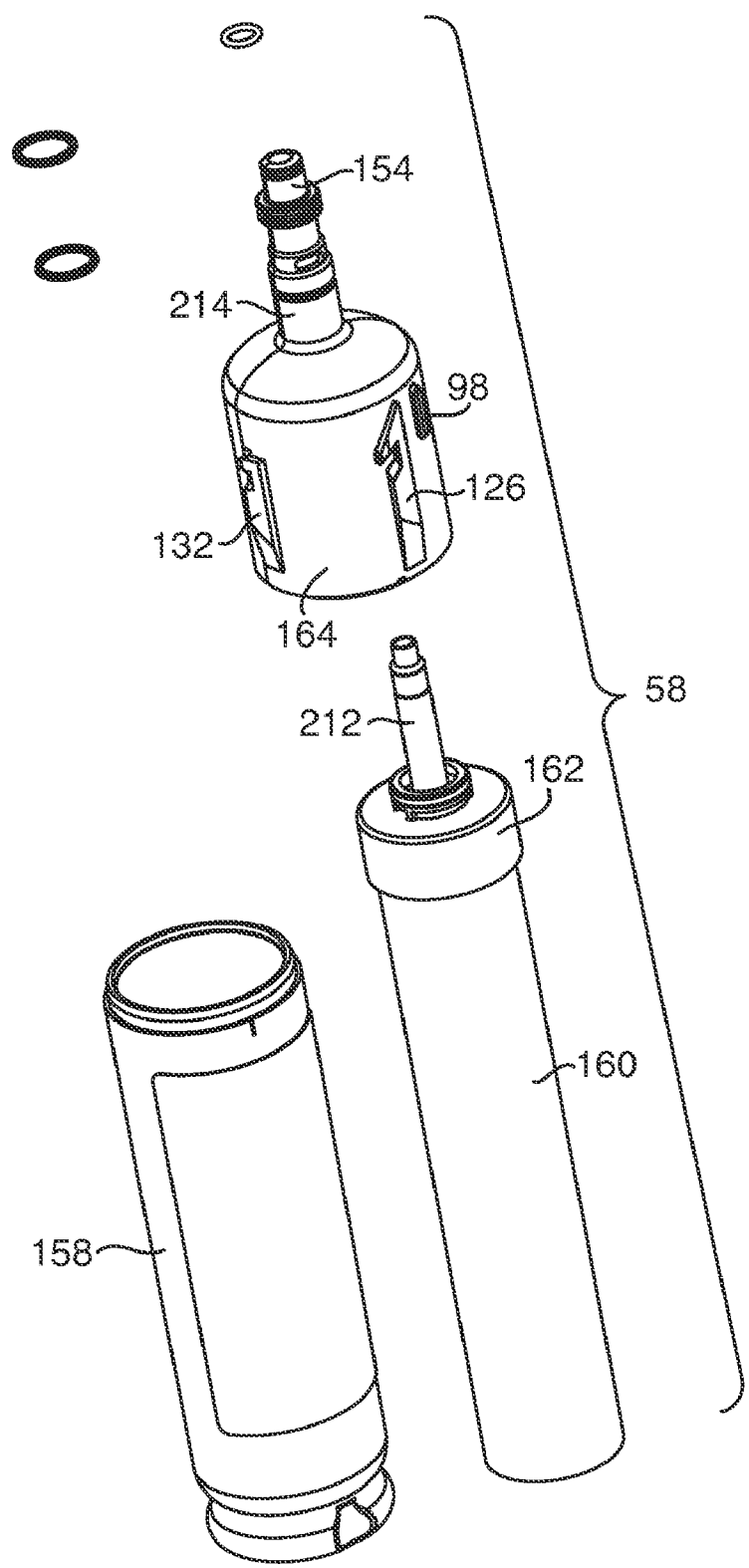
FIG. 22 is an exploded perspective view of the representative filter cartridge assembly component of the representative filtration system of the present disclosure.

As illustrated in FIG. 22, an exploded view of the filter cartridge assembly 58, one representative embodiment of the filter cartridge assembly component of the present disclosure comprises a closure member 158, filtration media 160, a top end cap 162, a shell 164 including the stem 154 member. FIG. 23 is a perspective view of a representative embodiment of an assembled filter cartridge assembly 58 according to the present disclosure.

As illustrated, the upper portion or shell portion 164 of the filter cartridge 58 comprises representative cartridge latching structure 126, 128, 130, 132 projecting outwardly from the outer surface of the shell 164. As described above, these representative cartridge latching structure 126, 128, 130, 132 and alignment members 98, 100 are adapted to interface with the corresponding four main bracket extension members 102, 104, 106, 108 on the main bracket 64, and have structure or slots 109 for interacting with the alignment members 98, 100 on the filter cartridge surface. It should be understood that while the structure illustrated for the representative cartridge latching structure 126, 128, 130, 132 and alignment members 98, 100 are protrusions, depressions or more or less thick protrusions capable of performing the intended function while interacting with the corresponding components is to be considered a part of the present disclosure.

As illustrated in the representative exploded view of FIG. 22, the representative top end cap 162 is operatively connected to the representative filtration media 160 in any conventional manner known to those skilled in the art. As specifically illustrated, the top end cap 162 has a representative inner stem portion 212 having various representative sealing structure, such as O-rings, operatively positioned thereon. The representative shell 164 comprises in addition to the above mentioned representative cartridge latching structure 126, 128, 130, 132 and alignment members 98, 100, an outer stem portion 214 having a plurality of representative sealing means, such as, for example, O-rings operatively positioned thereon for facilitating the movement of liquid from the inlet assembly 70 through the filtration media 160 and out through the head/outlet assembly 62 (see FIGS. 8-11), as is known to those skilled in the art. It should be understood that while, a specific representative embodiment of the system of the present disclosure is illustrated, many other workable embodiments are possible and such is intended to be included within the scope of the present disclosure and claims. Since so many filtration cartridge assembly variations are possible, we believe it unnecessary to give a complete description of each and every possible filtration cartridge assembly embodiment.

However, one feature of the filter cartridge assembly 58 embodiment illustrated resides in the representative cartridge latching structure 126, 128, 130, 132 and alignment members 98, 100 illustrated as protrusions from the outer surface of the filter cartridge assembly, and, in particular, as illustrated, the shell 164, it being understood that corresponding structure could be positioned on the outer surface of the filter cartridge assembly 58 or at any other location thereon so long as the corresponding structure positioned on the main bracket and the latch assembly are capable of successfully interfacing therewith.

Figure 24:
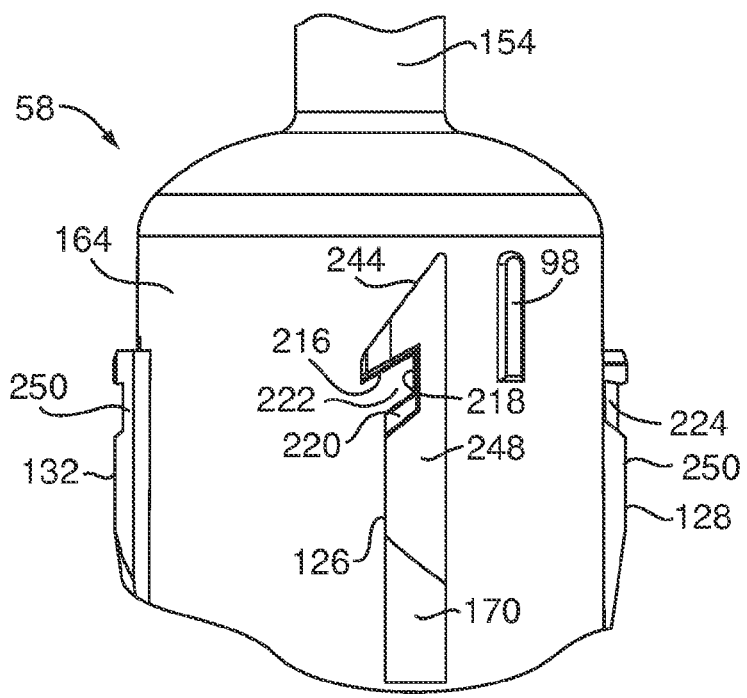
FIG. 24 is a partial perspective view of one of the two sets of corresponding latching members on the outer surface of the representative filter cartridge assembly component of FIG. 23.
Figure 25:
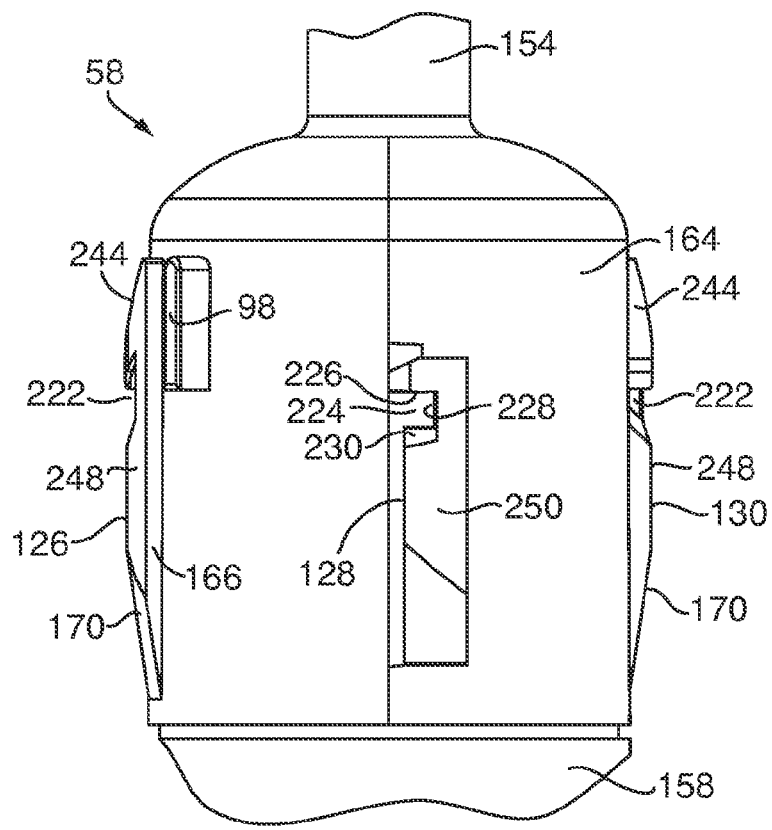
FIG. 25 is a partial perspective view of other of the two sets of corresponding latching members on the outer surface of the representative filter cartridge assembly component of FIG. 23.

As best illustrated in FIGS. 23-25, the filter cartridge corresponding cartridge latching structure 126, 128, 130, 132 is illustrated in detail. As illustrated, filter cartridge corresponding latching structure 126, 130 or similar structure corresponds to the latch extension members 134, 138. Filter cartridge corresponding latching structure 128, 132 correspond with the other opposing latch extension members 136, 140. Features of the cartridge latching structures 126, 130 include three diagonal surfaces 216, 218, 220, with the notch 222 formed between two 216, 220 of the diagonal surfaces. The reduced width of the corresponding cartridge latching structure 126, 130 performs an important function that will be described below. As illustrated, the portion of the first complementary element most distal from the stem includes a tapered portion 170. The second complementary alignment members 98, 100 comprises a complementary shaped element for interacting with the structure or slots 109 formed in the main bracket extension members 104, 108.

The corresponding filter cartridge latching structures 128, 132, comprises the notch 224 formed from three relatively straight surfaces 226, 228, 230. As with the corresponding portion four extension members projecting from the latch 66, the outer surface of the upper portion 226 is thicker than the point at which the cartridge latching structure 128, 132 interfaces with the filter cartridge surface. This cartridge latching structure 128, 132 in combination with the corresponding projection members 184, 188, as illustrated in FIGS. 12-14, on the extension members provides for a positive engagement of the filter cartridge latching system assembly 56 thereby securely positioning and retaining the filter cartridge in the correct operative position.

The fluid filtration system 50 of the present discourse currently contemplates and features a proprietary key configuration in that the specific configuration of the filter cartridge entrance points into the alignment collar are shaped as illustrated in the various Figures but can be configured in an infinite number of different shapes to provide a filtration system unique to each customer/manufacturer to ensure that only matching propriety shaped corresponding portions are allowed to be installed, thereby providing for quality control of replacement cartridges.

Each unique filter cartridge corresponding latching structure 126, 128, 130, 132 and corresponding alignment members 98, 100 or key configurations allow only the contracted user (or owner—if the customer has purchased the right to use a specific key configuration) the ability to replace the customer authorized filter cartridge into the main bracket assembly and no one else's, because any other shaped configuration will not fit, due to the unique key configuration. One representative and illustrated key configuration is defined by an alignment member (i.e. key) positioned on the outer surface of the filter cartridge and a corresponding slot (i.e. keyway) formed in the main bracket. If the alignment member and the slot do not line up during installation of the filter cartridge, the latching system assembly 56 will not actuate and will not lock the filter cartridge into operative position within the latching system assembly 56 and the filter cartridge having a non conforming key configuration will be prevented from being operatively connected to the manifold 54.

While not all possible key configurations have been disclosed herein, it is believed that the same conceptual theory holds true for infinite variations of key and corresponding keyway configurations formed on the filter cartridge and the latching system assembly and the alignment collar. The present disclosure contemplates that an infinite number of different keys and corresponding keyway configurations can be developed by changing any one or any combination of the size, shape and/or location of these keys and keyways and the present disclosure is intended to encompass all such possible different configurations.

Cartridge Poppet Interface

Figure 26:
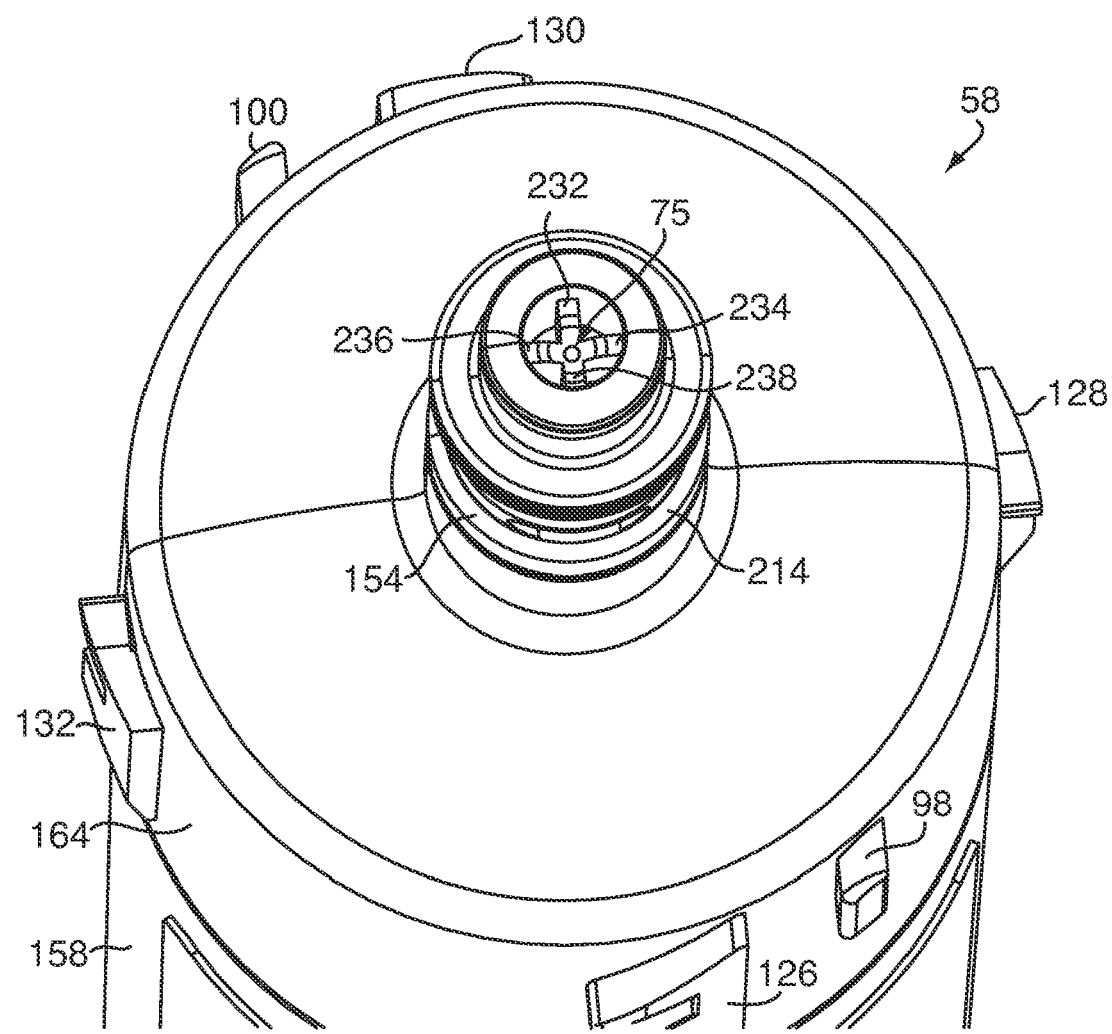
FIG. 26 is a partial perspective view of the filter cartridge component illustrating representative cartridge poppet interface component of the representative filtration system of the present disclosure.
Figure 27:
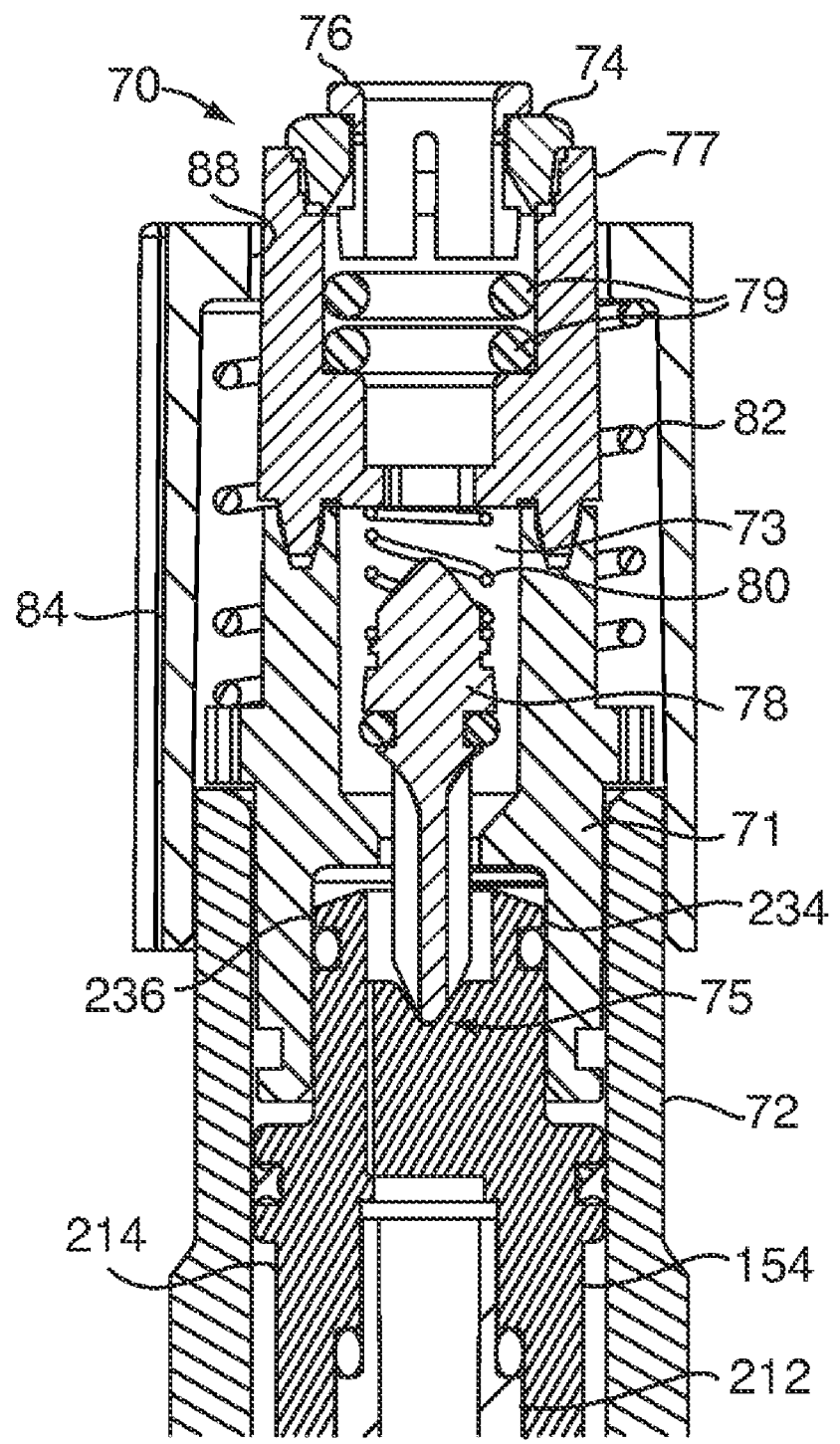
FIG. 27 is a partial cross sectional view of the filter cartridge component illustrating the representative cartridge poppet interface component of the representative filtration system of the present disclosure.

As illustrated in FIGS. 26-27, other features of the present disclosure that contribute significantly to the overall efficient and reliable operation of the fluid filtration system 50 of the present disclosure, include, but are not limited to, four (4) tapered ribs 232, 234, 236, 238 forming the cartridge poppet interface 75 on the inside diameter of the cartridge inner stem portion 212. It has been determined that these four (4) tapered ribs 232, 234, 236, 238 enhance the performance of at least three functions, opening the poppet valve 78 to allow fluid to flow when appropriate, maintaining the poppet valve 78 in a position centered about the centerline of the filter cartridge 58 and assisting with the stabilization of the poppet valve 78 during operation. Poppet valve 78 stabilization is accomplished because the tapered ribs 232, 234, 236, 238 on the inside diameter of the cartridge inner stem portion 212 of the filter cartridge act as a positive guide for the poppet valve 78. The ribs 232, 234, 236, 238 enable the poppet valve 78 to be centered and force the poppet valve to move purely translational, i.e., no excessive side to side movement is experienced. Prevention of excessive side to side movement ensures full fluid flow and prevents premature closing of the poppet valve 78. In short, the poppet valve 78 is captured by the tapered ribs 232, 234, 236, 238 in the filter cartridge so that poppet valve movement is restricted to up and down movement only relative to the cartridge, as illustrated in FIGS. 26-27.

Cartridge Outlet Port Hole

It has also been determined that fluid drip that occurs during cartridge change out is reduced when only one outlet port is present in the filter cartridge stem. However, it should be understood that while fluid drip is reduced by using only one outlet port, the cartridge component of the preset liquid filtration system 50 would function acceptably with respect to fluid drip when the stem 154 (see FIG. 27) has been manufactured with two outlet port holes.

Now that we have described the various components of the liquid filtration system 50 of the present disclosure and how an end user would place the liquid filtration system 50 in operation in the environment of use, we will know describe the operation of the liquid filtration system 50 of the present disclosure.

Placing the System in Operation

In an effort to clearly show the cooperative components of the system of the present disclosure, applicants provided color figures depicting the installation and removal of the filter cartridge from the latching system assembly 56 and from the manifold 54 in the provisional application. Specifically, originally provided color FIGS. 26-44 and currently submitted FIGS. 28-40 illustrate the interaction of the cartridge latching structure 126, 128, 130, 132 and alignment members 98, 100 with the filter cartridge latching system assembly 56, originally provided color FIGS. 42-44 illustrate the spring biasing and rotation of the main bracket 64 relative to the latch 66 and originally provided color FIGS. 45-58 illustrate the relative position of the filter cartridge stem 154 relative to the manifold during installation and replacement of the filter cartridge. We turn now to a description of the interaction of the external components of the fluid filtration system of the present disclosure as a filter cartridge is first installed and then disengaged from the manifold and removed in order to be replaced.

Filter Cartridge Installation

Figure 31:
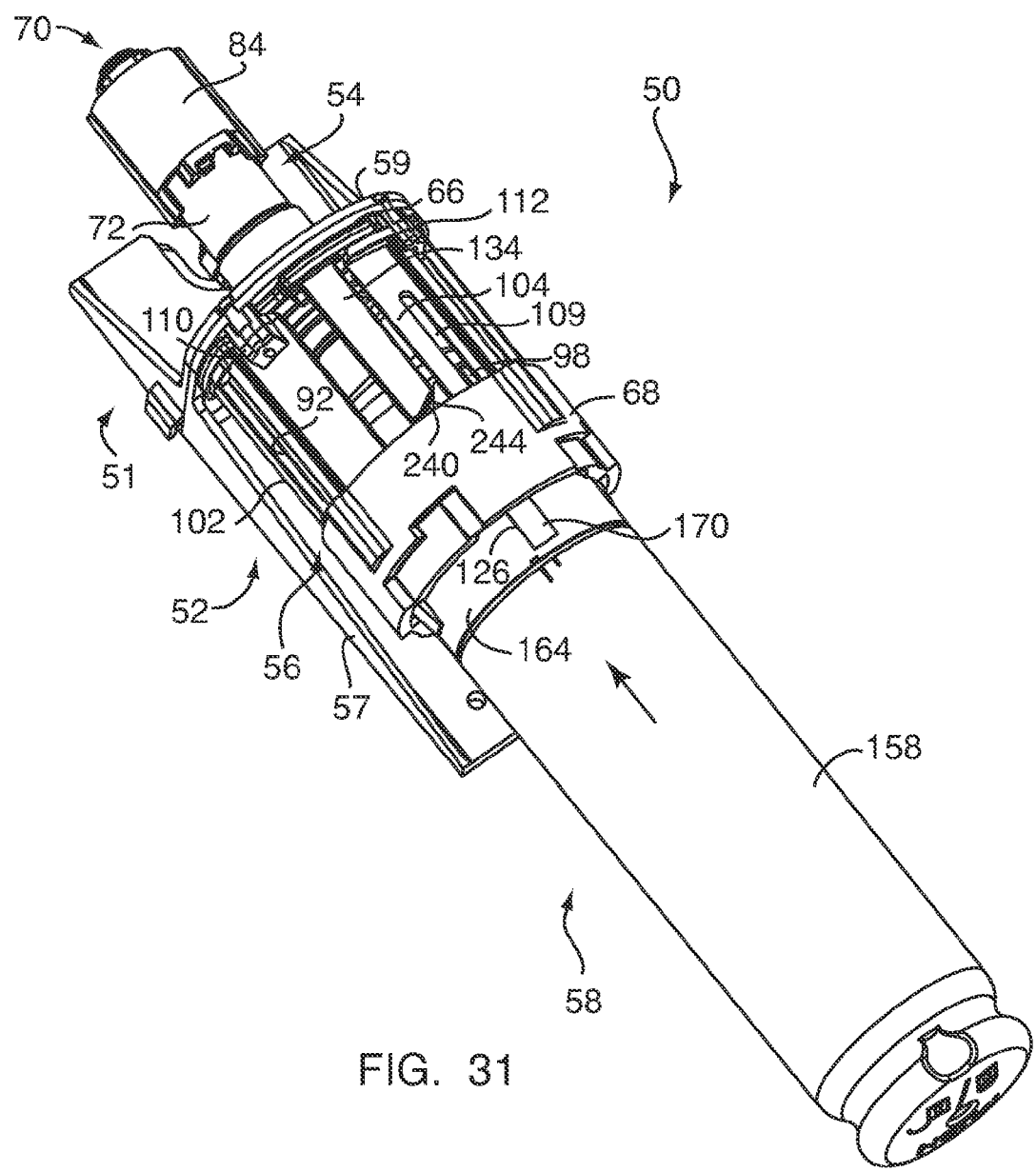
Figure 32:
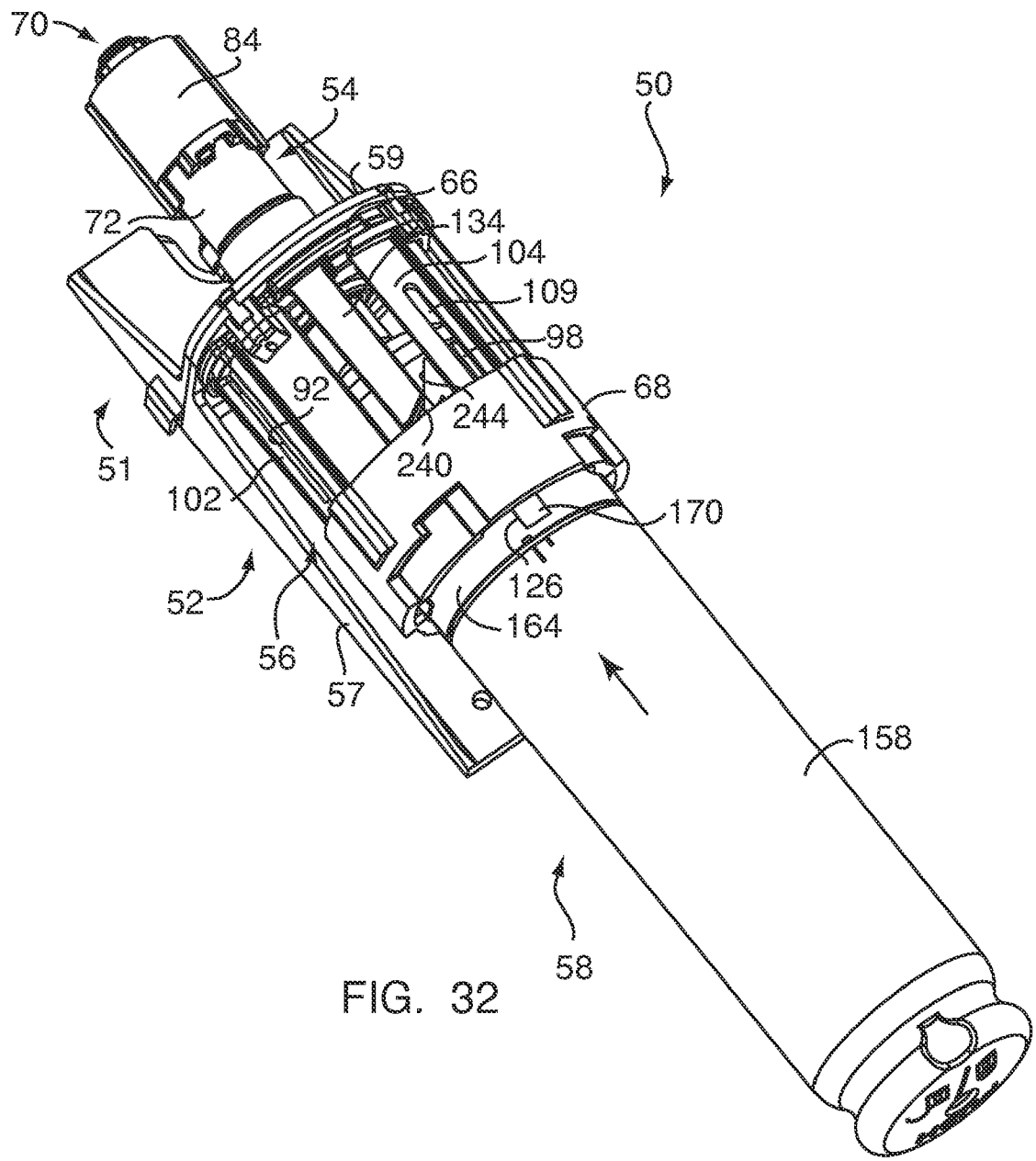
Figure 33:
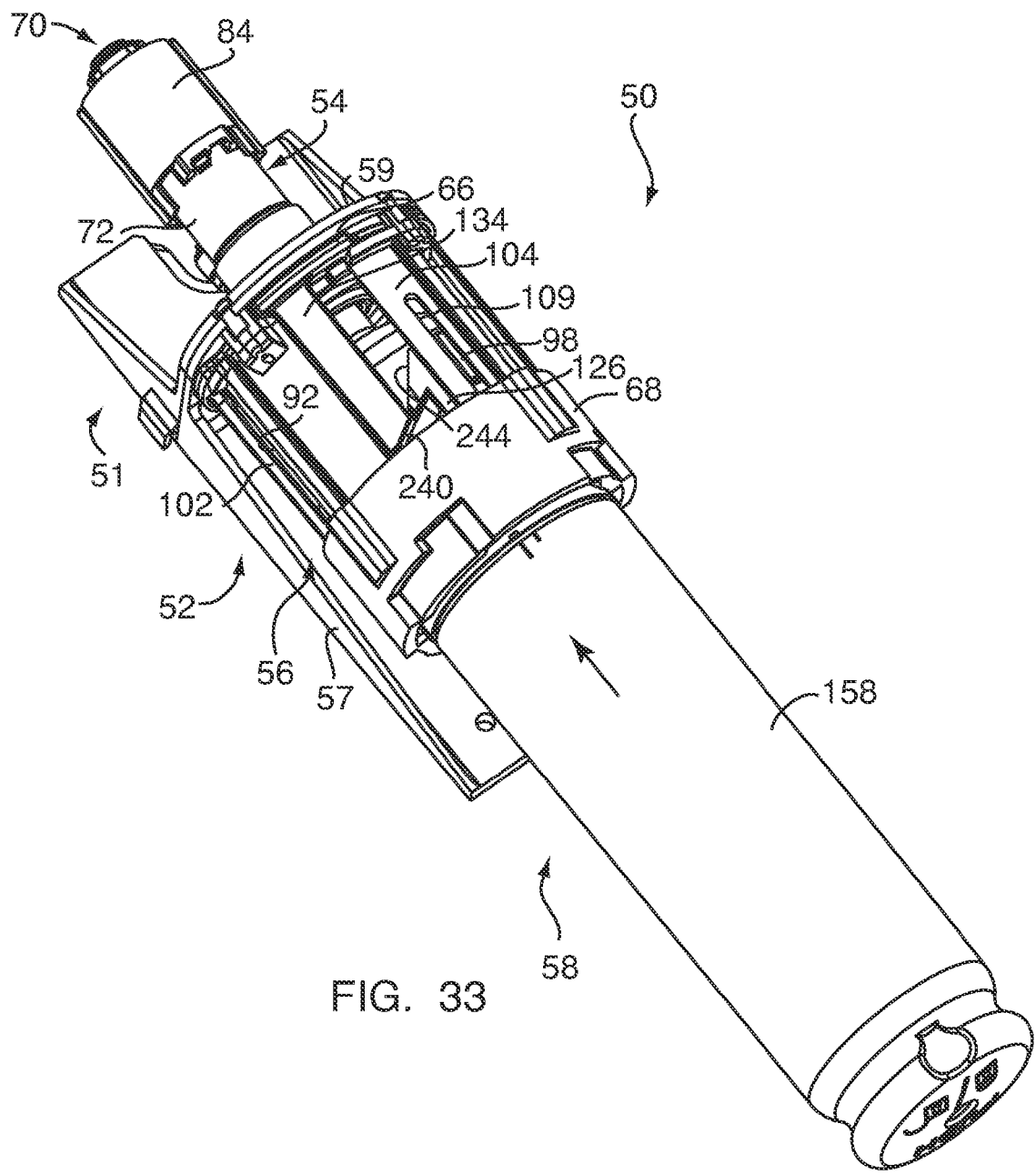

As illustrated in FIG. 19, main bracket extensions 104,108 have corresponding structure in the form of slots 109 which when aligned with the proper alignment member 98, 100 on the filter cartridge outer surface, allows the filter cartridge to align the cartridge latching structure 126, 128, 130, 132 with the proper opposed extension members 134, 136, 138, 140 of the latch 66. Once properly aligned by an operator, the filter cartridge is moved in the direction of the arrow in FIGS. 28 and 29 so that the stem 154 of the filter cartridge moves toward the manifold. FIG. 31 illustrates the cartridge latching structure 126, 128, 130, 132 and alignment members 98, 100 on the filter cartridge outer surface being aligned with the corresponding structure 172, 173 in the cartridge alignment collar 68 and with corresponding structure 109. As the filter cartridge is move further toward the manifold, a cam surface 240, 242 on the opposed extension members 134, 138, of the latch 66 comes into contact with a cam surface 244, 246 of the cartridge latching structure 126,130, as illustrated in FIG. 32. It is presently preferred that there be two sets of two corresponding structure positioned on the filter cartridge latching system assembly 56 and the filter cartridge 58. The two sets are presently preferred located at about 180 degrees relative to the other member of the set, it being understood that the number and the relative positions thereof can vary, as long as the function of operatively connecting the filter system and the manifold together is accomplished.

Figure 30:
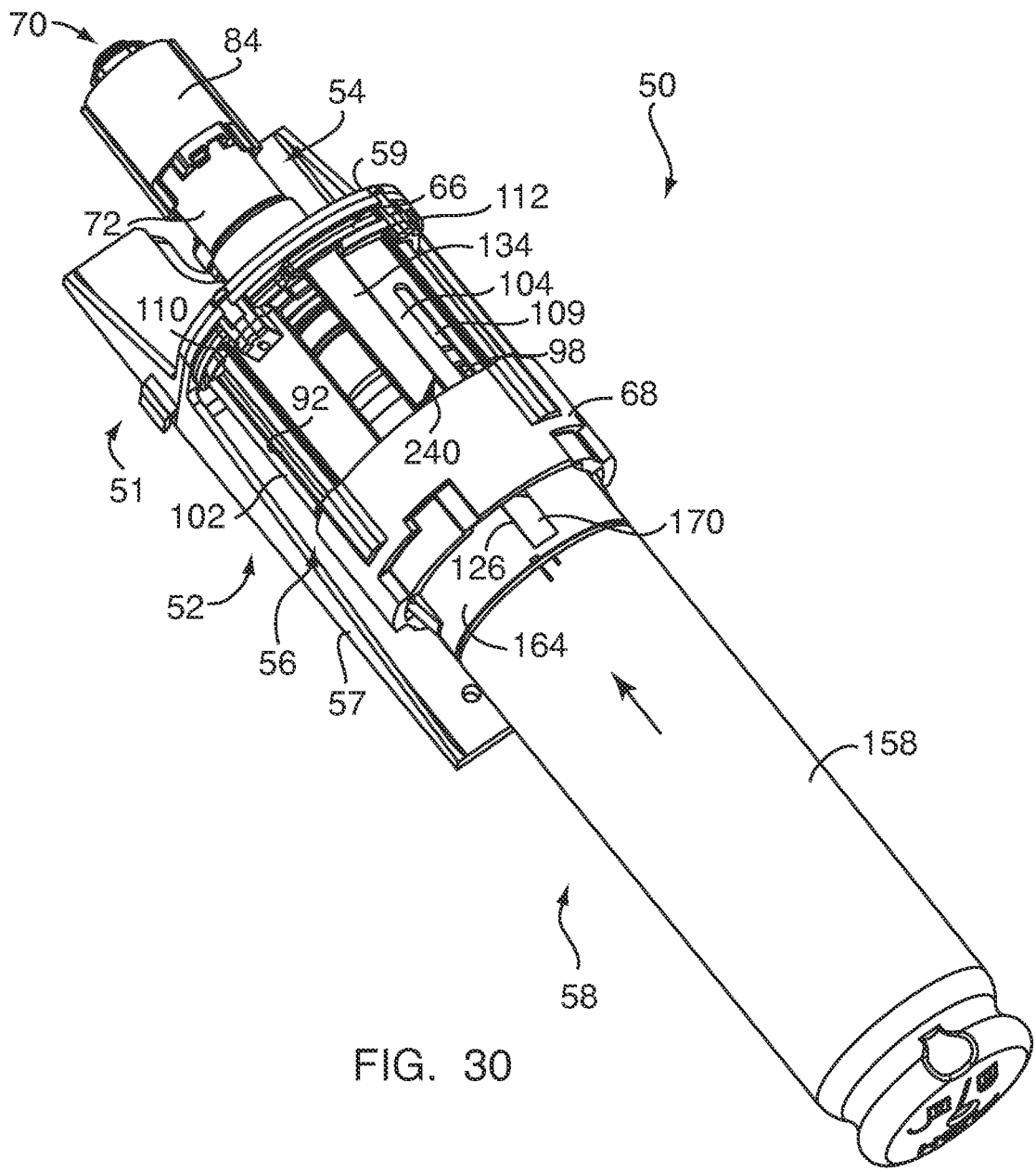

As the cam surface 240, 242 of the latch 66 contacts the angled cam surface 244, 246 on the corresponding member of the filter cartridge, the latch 66 begins to rotate away from the corresponding member of the main bracket 64, the tension therefore being provided by latch return springs 148, 149 operatively connected to both the latch 66 and the main bracket 64. FIGS. 30-32 illustrate the continued movement of the filter cartridge toward the manifold and the continued separation of the opposed latch 66 opposed extension members 134, 138 from the corresponding main bracket extension members.

Figure 34:
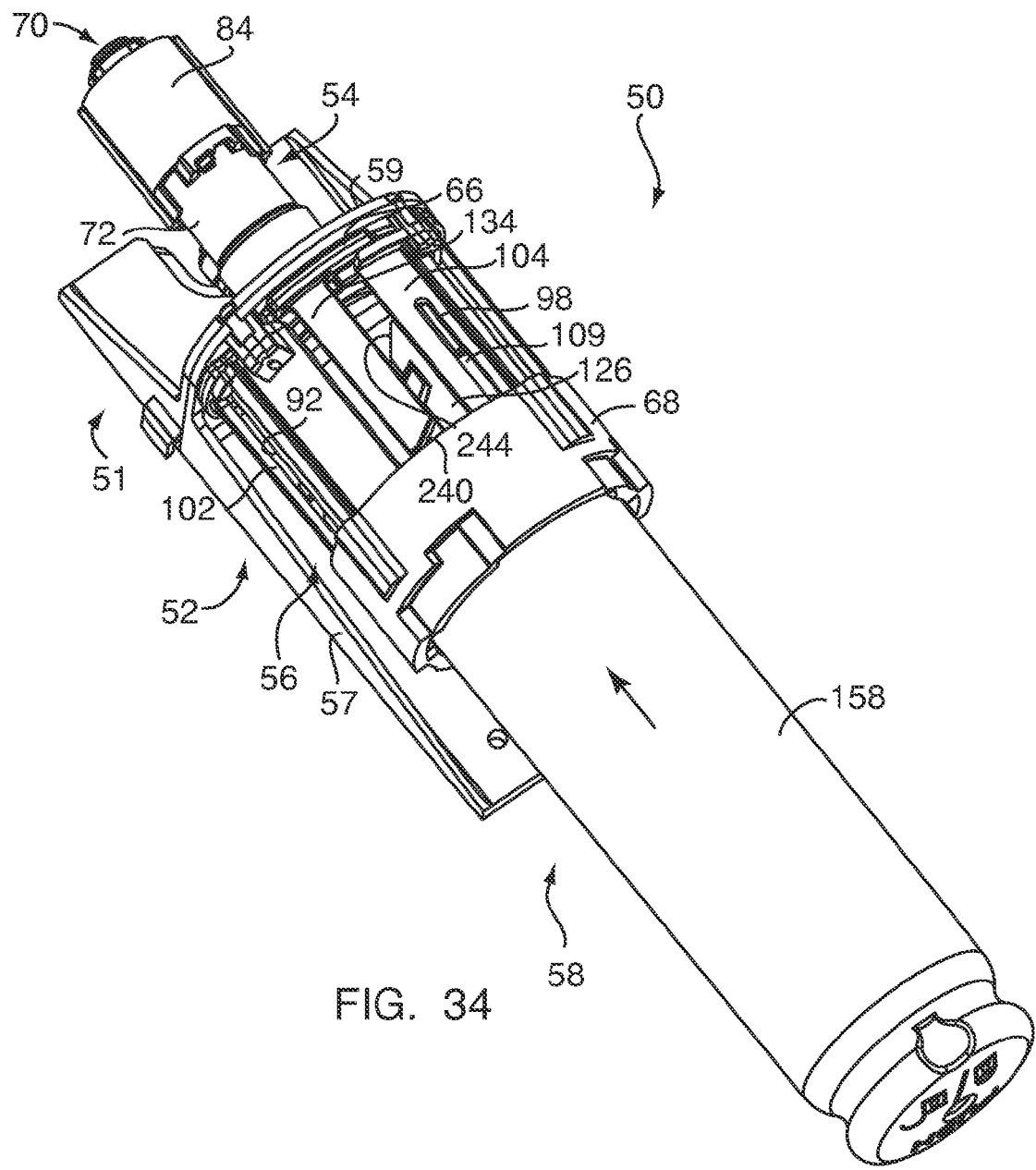
Figure 35:
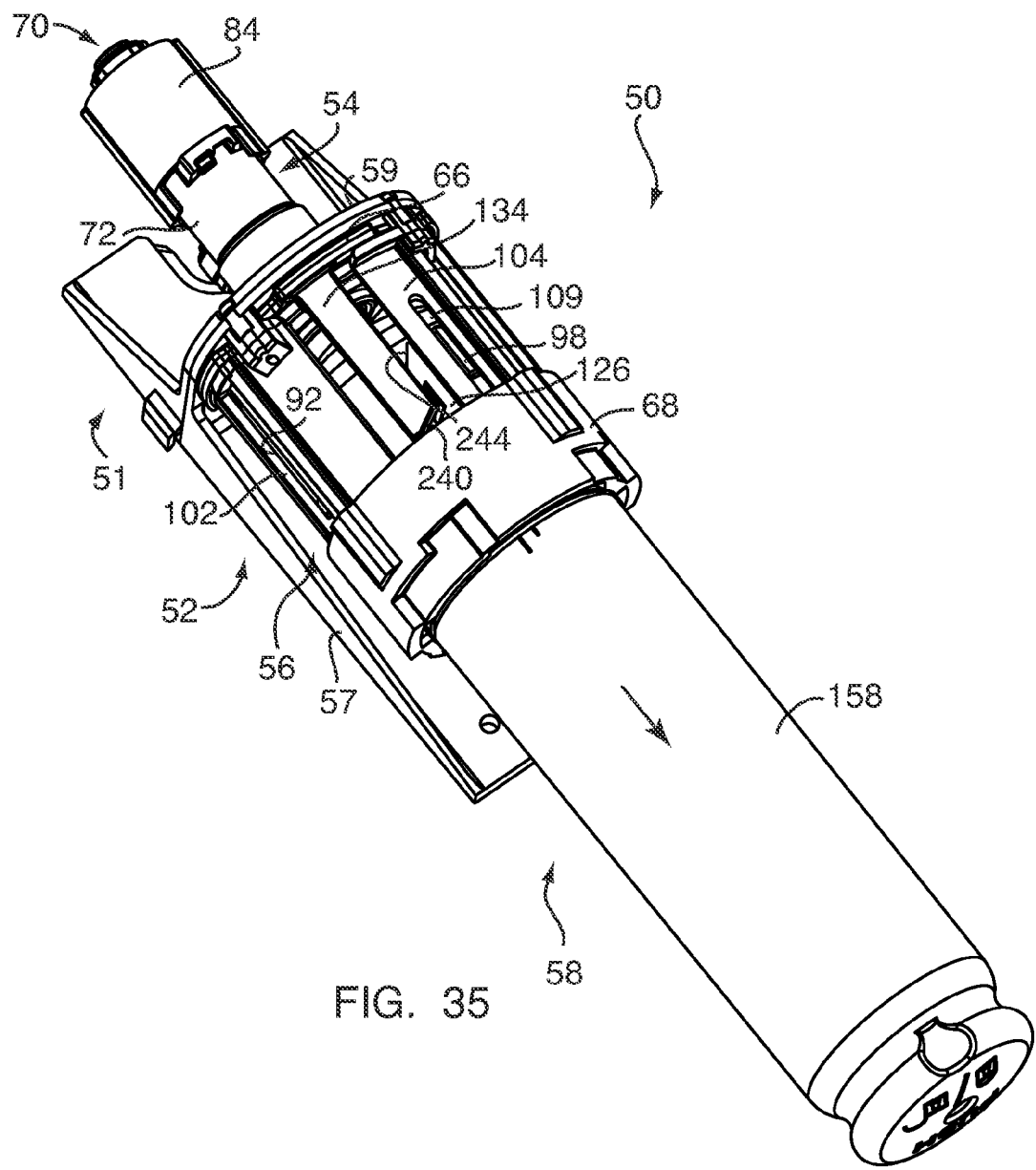
Figure 36:
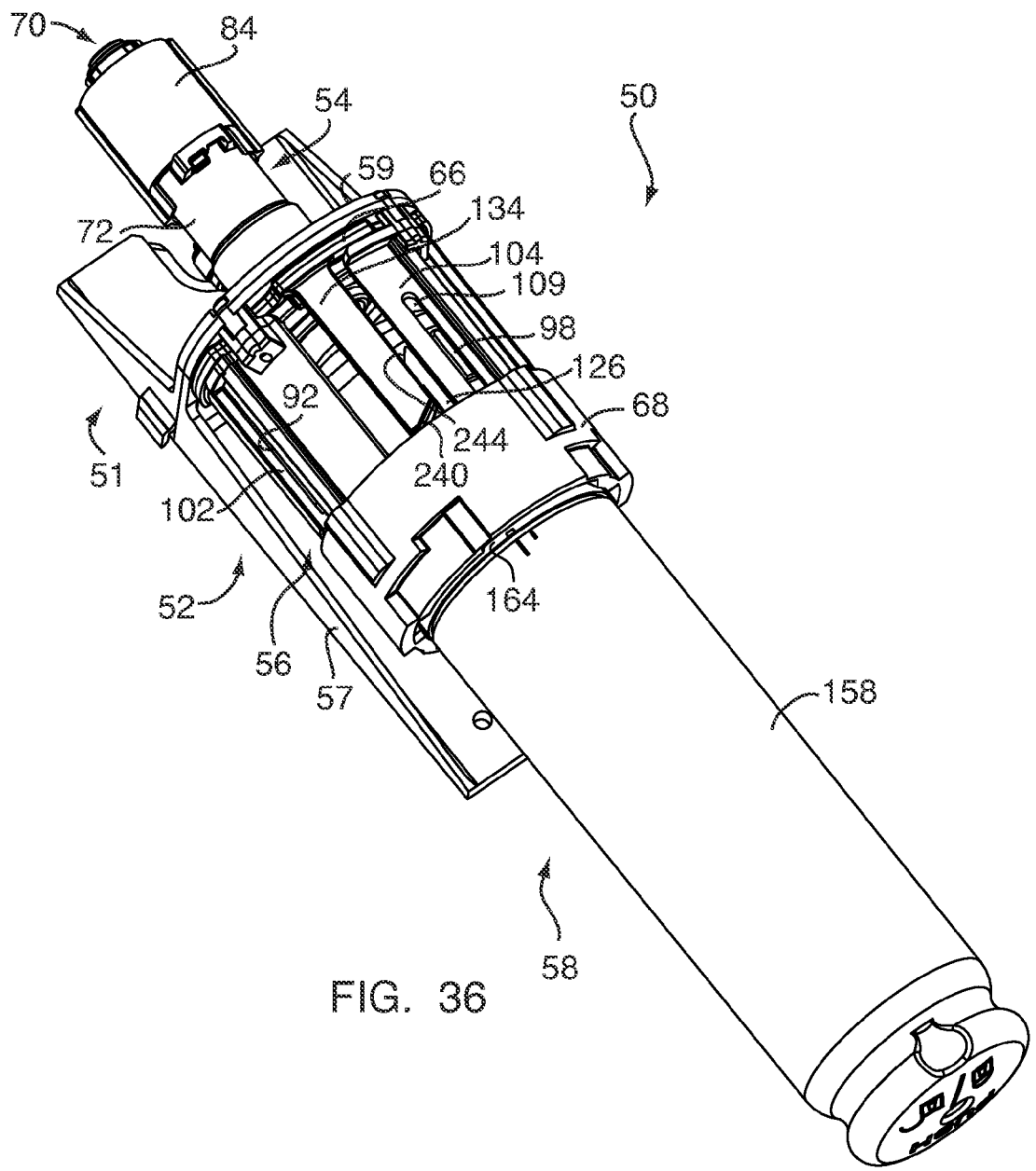
FIGS. 36-40 illustrate the removal of the filter cartridge assembly sub component of FIG. 20 from the manifold sub assembly of FIG. 14.

As illustrated in originally provided color FIG. 34, the cam surface 240, 242 of the latch 66 that is closest to the corresponding main bracket extension members, from which the latching member has rotated away from, rotates back slightly in order to catch in the notch 222 of cartridge latching structure 126, 130. As the filter cartridge continues to be moved toward the manifold, as illustrated in FIGS. 34-36, bias provided by the latch return springs 148, 149 and the inlet return spring 82 forces the projection member into the notch 222 of cartridge latching structure 126, 130 until the filter cartridge is locked into position, as illustrated in FIG. 36.

Filter Cartridge Removal

Figure 37:
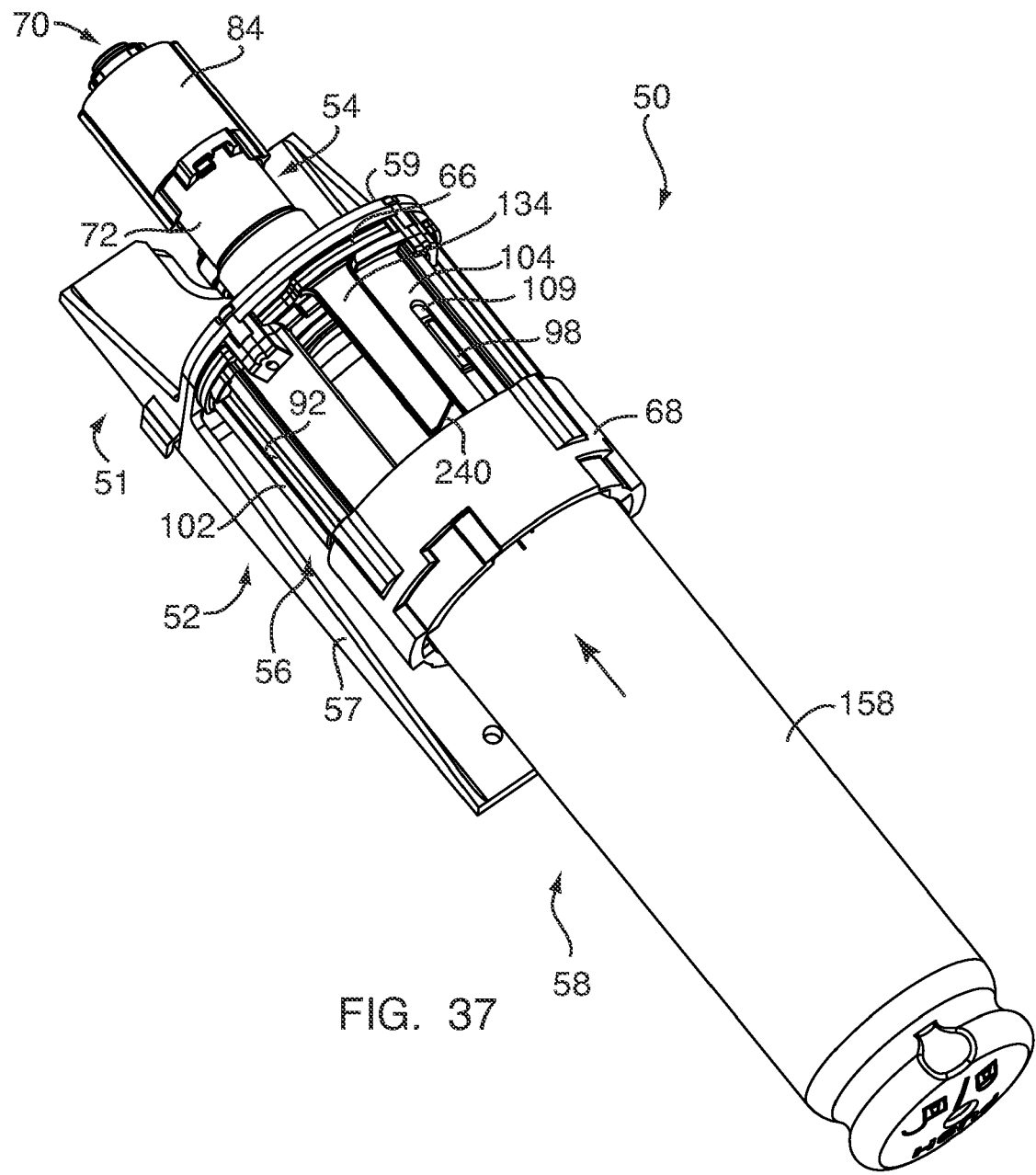
Figure 38:
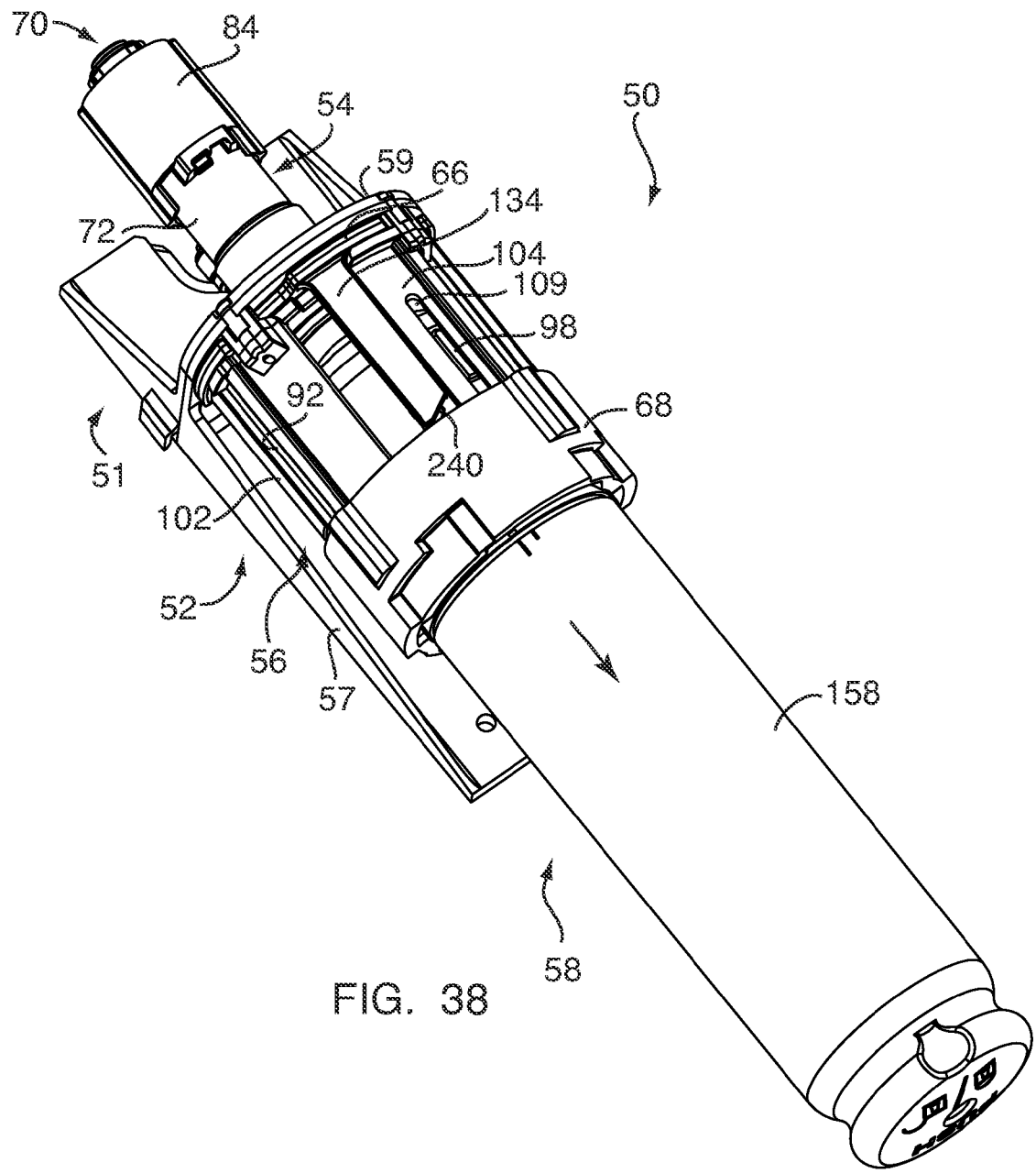

Cartridge removal is illustrated in FIGS. 37-40. As illustrated in FIG. 37, with a cartridge installed, the cartridge is pushed forward, at which point, the projection members 182, 184, 186, 188 of the two sets of, presently preferably, opposed extension members 134, 136, 138, 140 of the latch 66 ride up on cam surfaces 248, 250, a portion that was not cut out by the notches 222, 224, on each of the corresponding cartridge latching structure 126, 128, 130, 132, on the surface of the filter cartridge, and due to their resilience, the opposed extension members 134, 136, 138, 140 move away from the filter cartridge or bend outwardly away from the corresponding notches 222, 224 of the cartridge latching structure 126, 128, 130, 132 to positively disengage. The opposed extension members 134, 136, 138, 140 then rotates back toward the main bracket extension members 102, 104, 106, 108, due to the spring bias, over top of the cartridge cams 248, 250 to unlock the cartridge from the filter cartridge latching system assembly 56 as illustrated in FIGS. 37-38.

Figure 39:
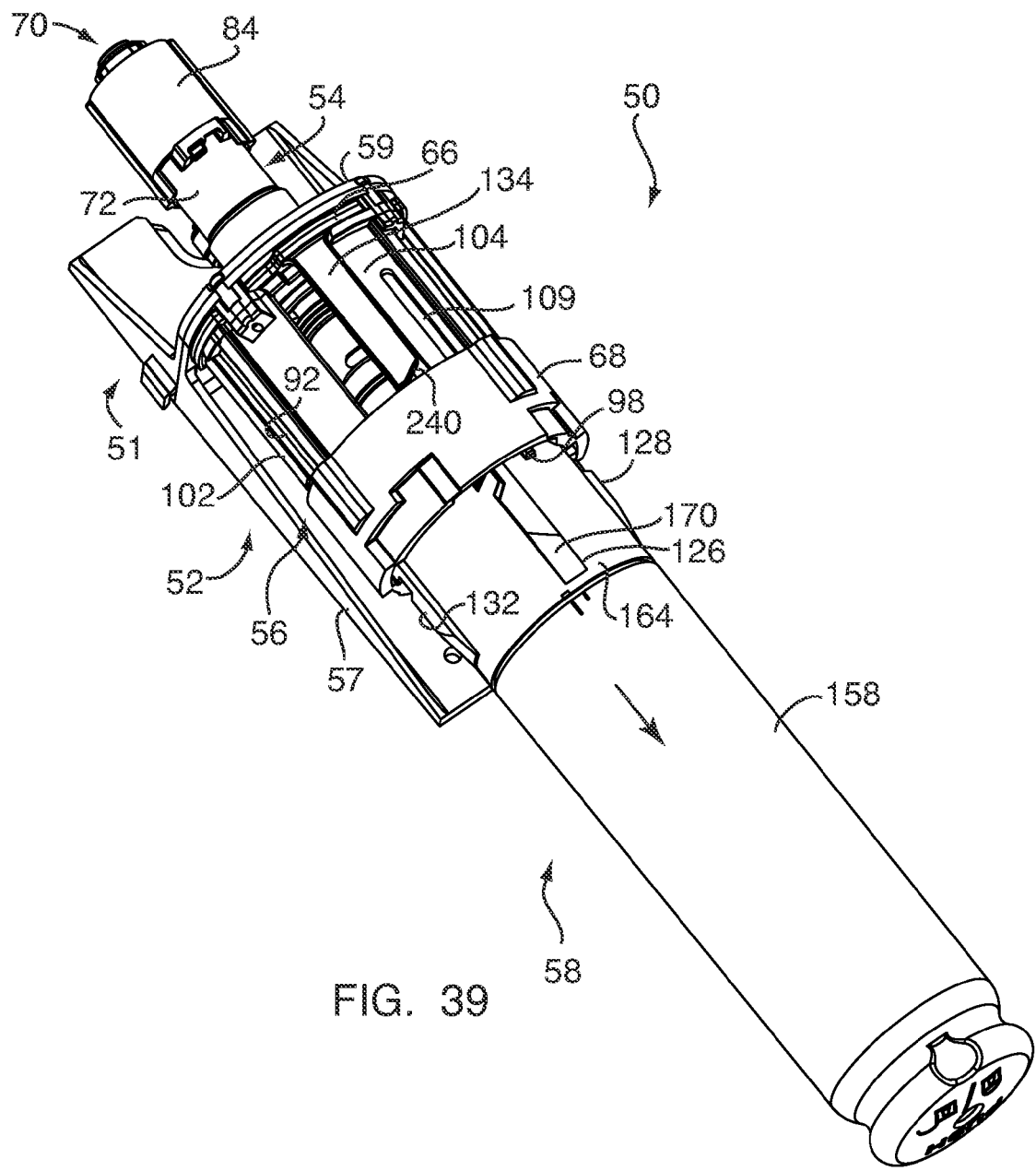
Figure 40:
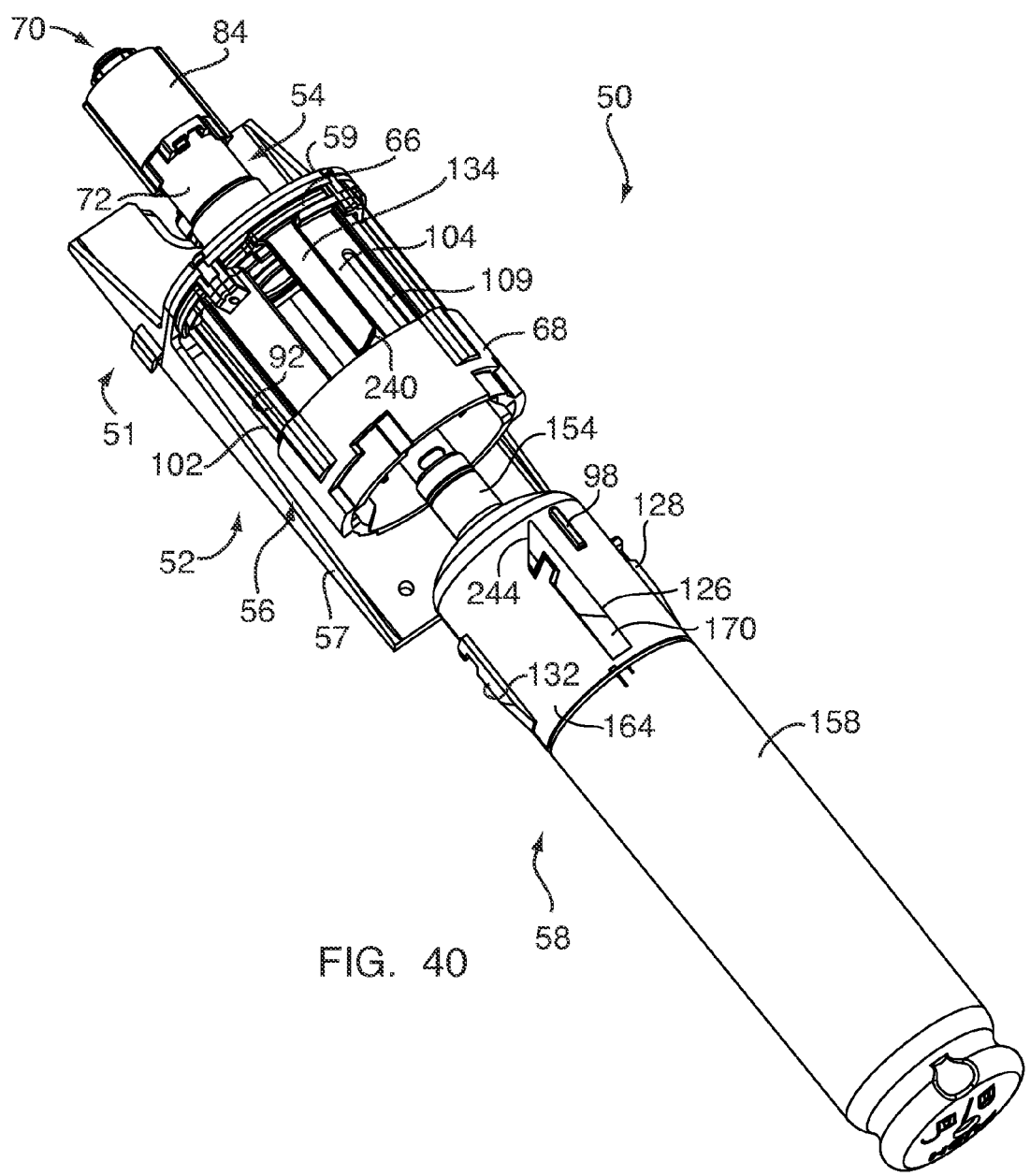

Once this is accomplished, the filter cartridge is now unlocked and can be pulled out of the manifold, as illustrated in FIGS. 39-40. The inlet return spring provides an ejection assist to help push the filter cartridge out of the manifold. To replace the removed filter cartridge with a new filter cartridge or to reinstall the original filter cartridge, the filter cartridge installation procedure described above is followed.

Latch Springs

Figure 41:
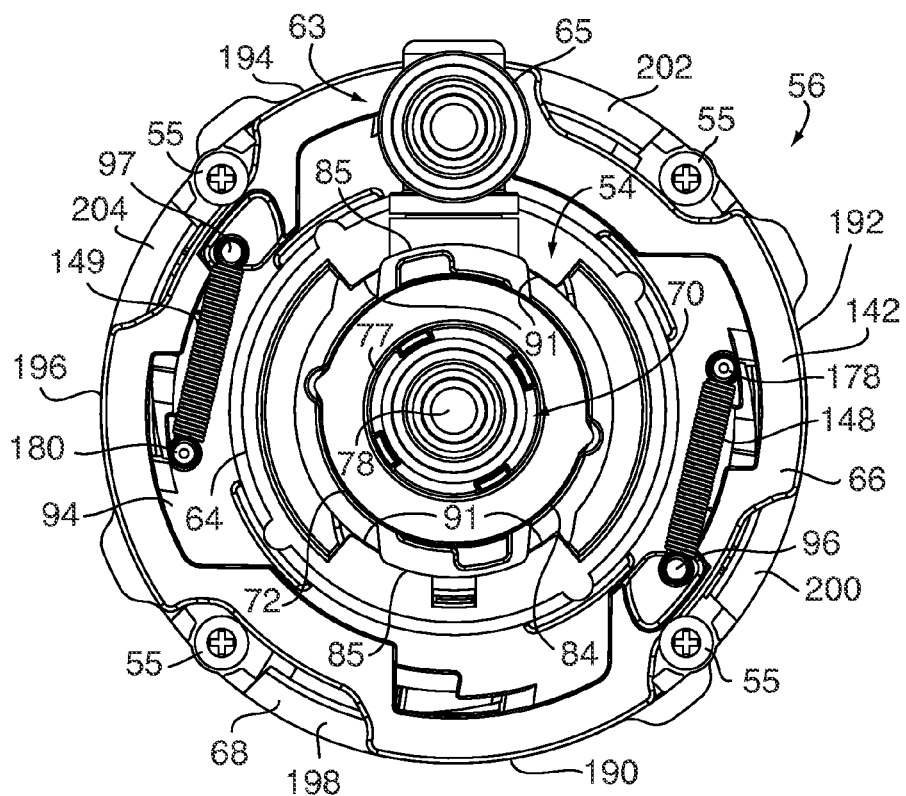
FIGS. 41-42 illustrate the spring biased rotational interface between the rims of the main bracket and the latching member of the representative filtration system of the present disclosure.

FIGS. 41-42 illustrates the rotational movement between the cam surfaces interface that enables rotational movement of the latch 66 relative to the main bracket 64. Specifically, originally provided color FIG. 40 illustrates the relative position of the latch 66 with the main bracket 64 when there is no cartridge either installed or being installed in the system. As the filter cartridge 58 is initially being inserted into the cartridge alignment collar 68, the latch 66 rotates relative to the main bracket 64. FIG. 41 illustrates the approximately maximum rotational movement of the latch 66 relative to the main bracket 64 during installation of the filter cartridge into the manifold assembly 54.

The above has been a description on the interaction of the external component parts of the system of the present disclosure during installation of and removal of a filter cartridge. We turn now to a description of the interaction of the internal components of the system of the present disclosure as a filter cartridge is first installed and then disengaged from the manifold and removed in order to be replaced.

Filter Cartridge Installation

FIGS. 43-48 illustrate the interaction of the cartridge stem 154 with the inlet assembly of the manifold during filter cartridge installation. As illustrated in FIG. 43, as the filter cartridge is pushed toward the inlet assembly, the poppet valve 78 is closed.

Figure 45:
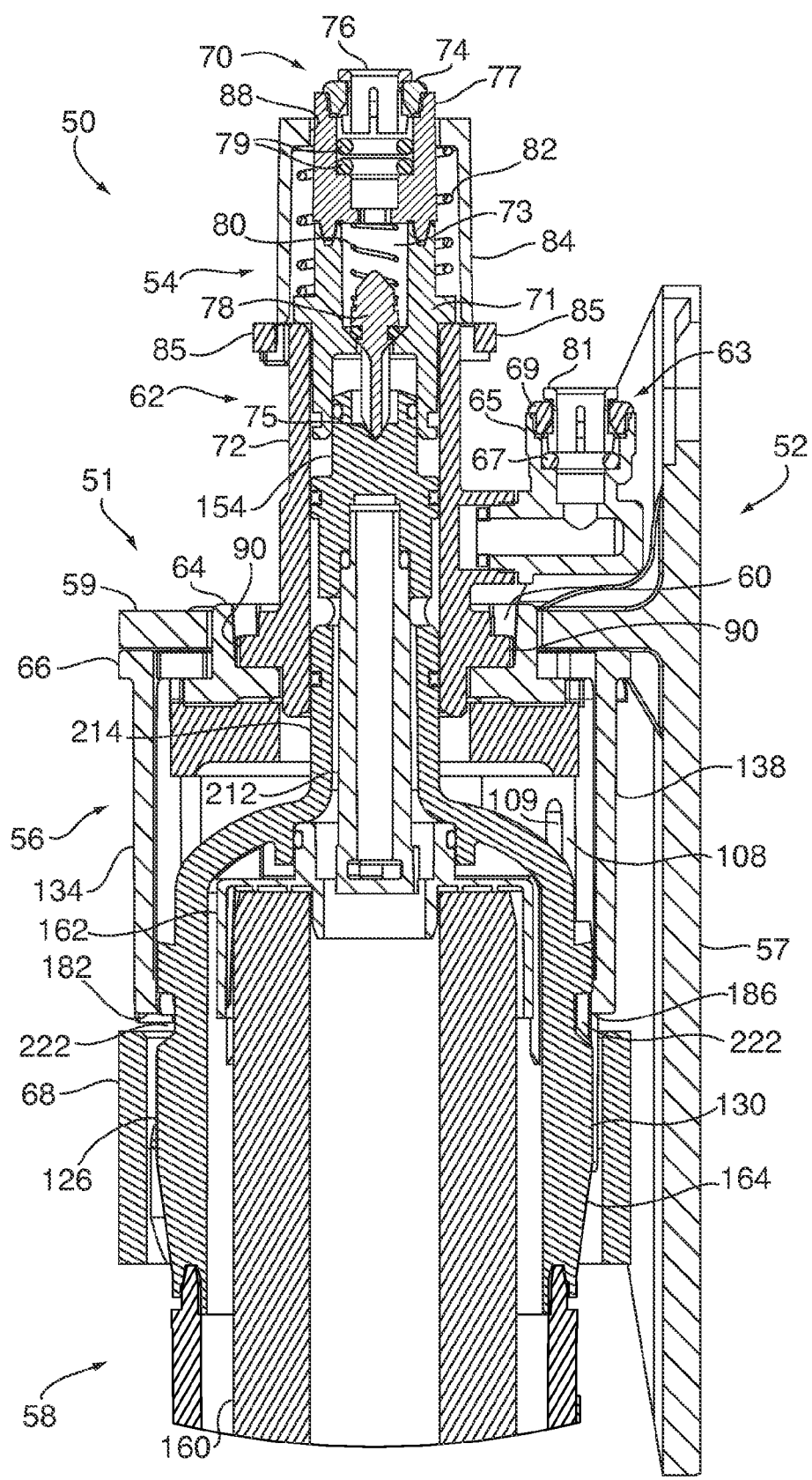
Figure 46:
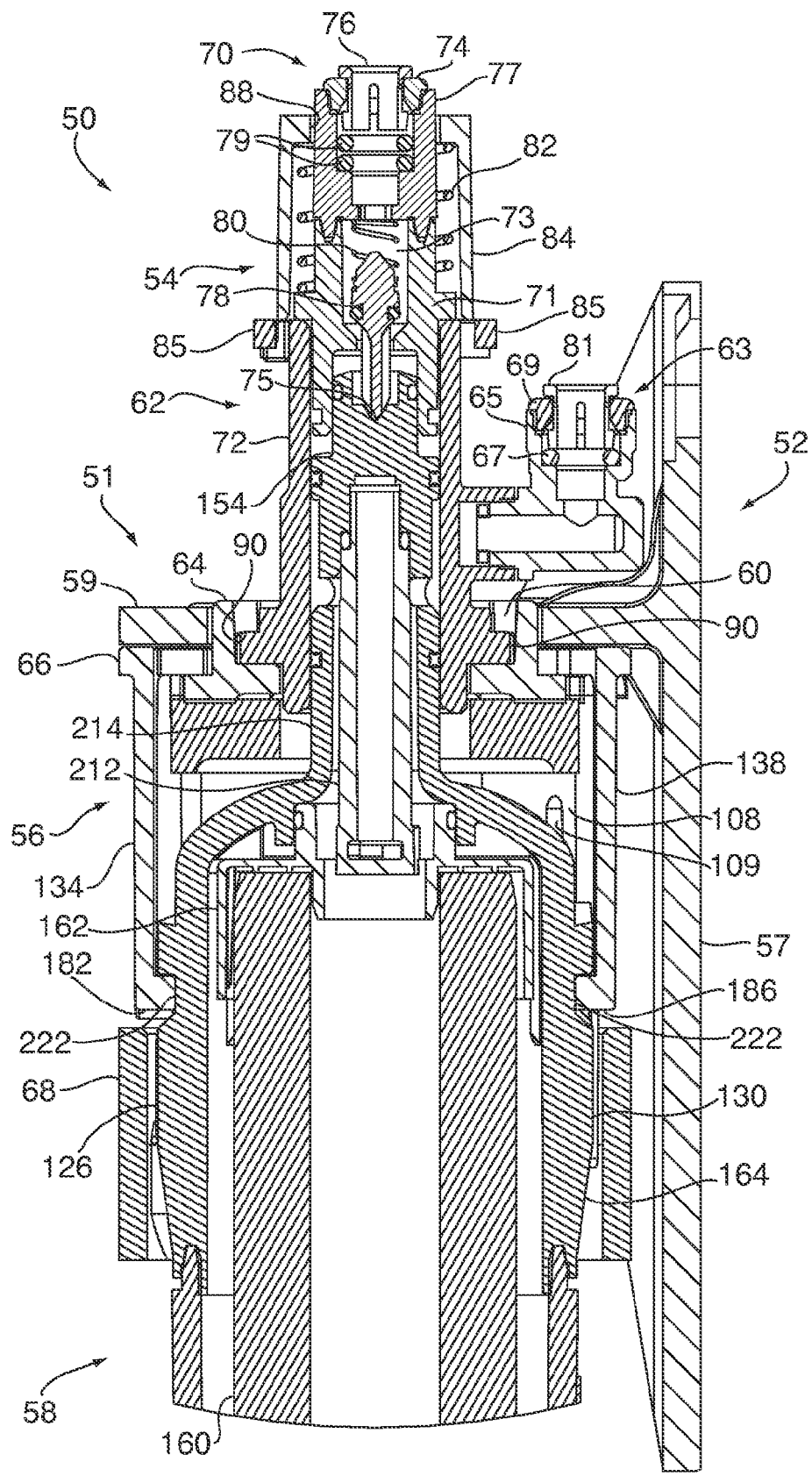
Figure 47:
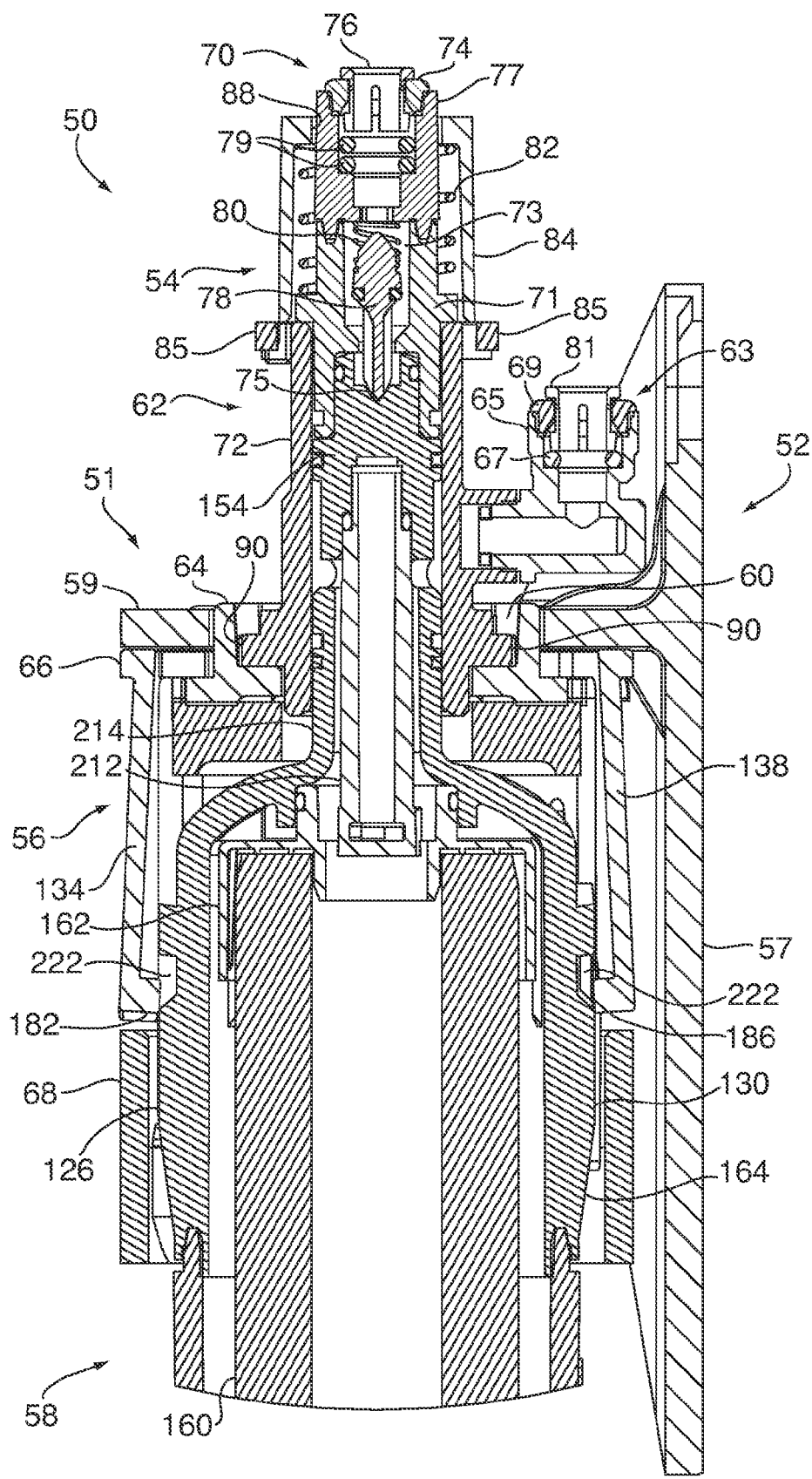
Figure 48:
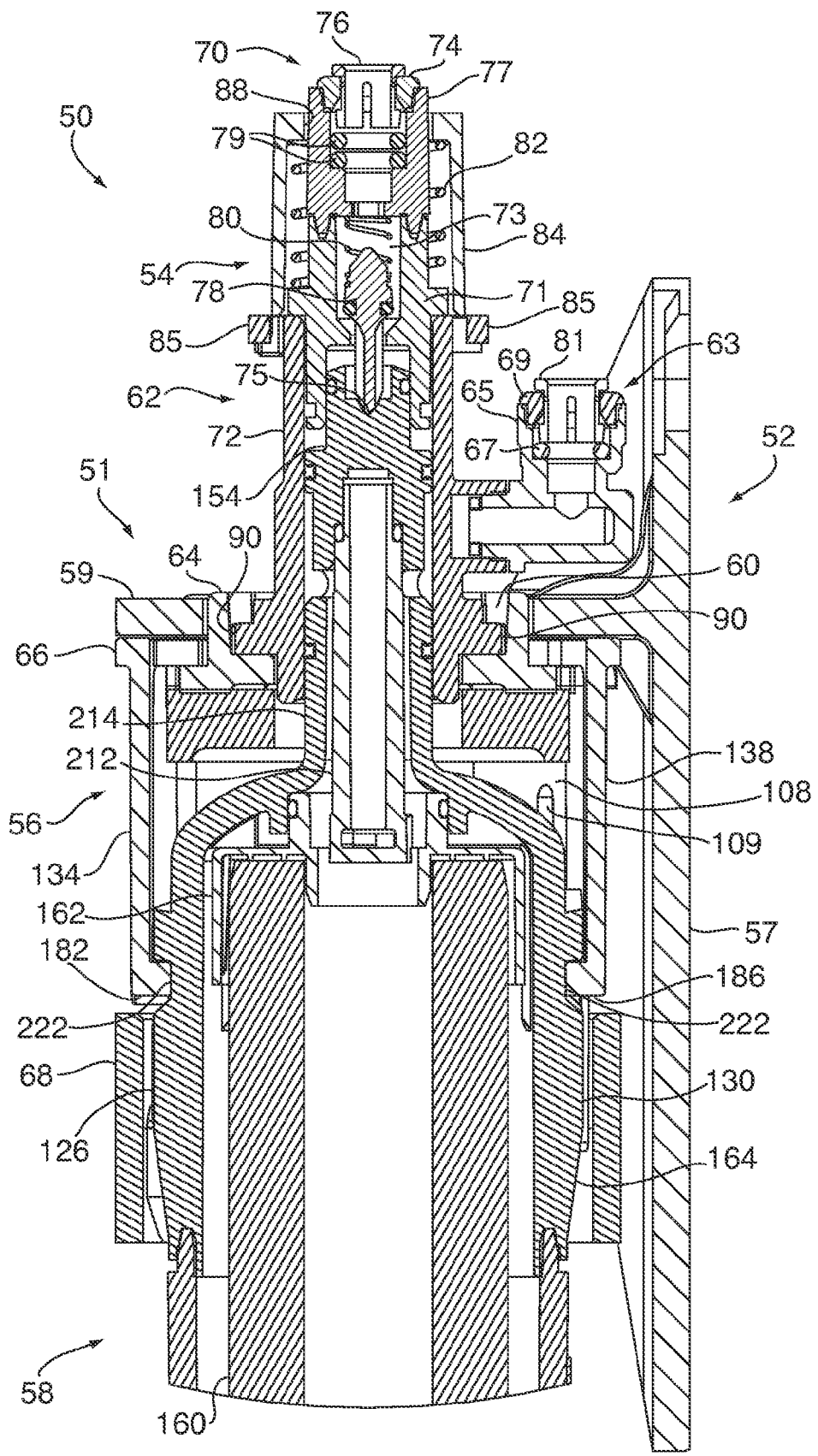

As illustrated in FIG. 44, as the filter cartridge is partially pushed toward the inlet assembly, the cartridge O-rings begin to engage in seal against the manifold. FIGS. 45-47 illustrate the engagement of all O-rings to the manifold and to the inlet after the cartridge has been pushed further in toward the inlet assembly and then at a certain point the poppet valve is opened. As illustrated in FIG. 48, the cartridge moves away from or outwardly from the inlet assembly as a result of the inlet return spring and water pressure. At this point, the cartridge is secured/latched in place, all O-rings are engaged to the manifold and to the inlet and the poppet valve 78 is open with full water flow.

Figure 51:
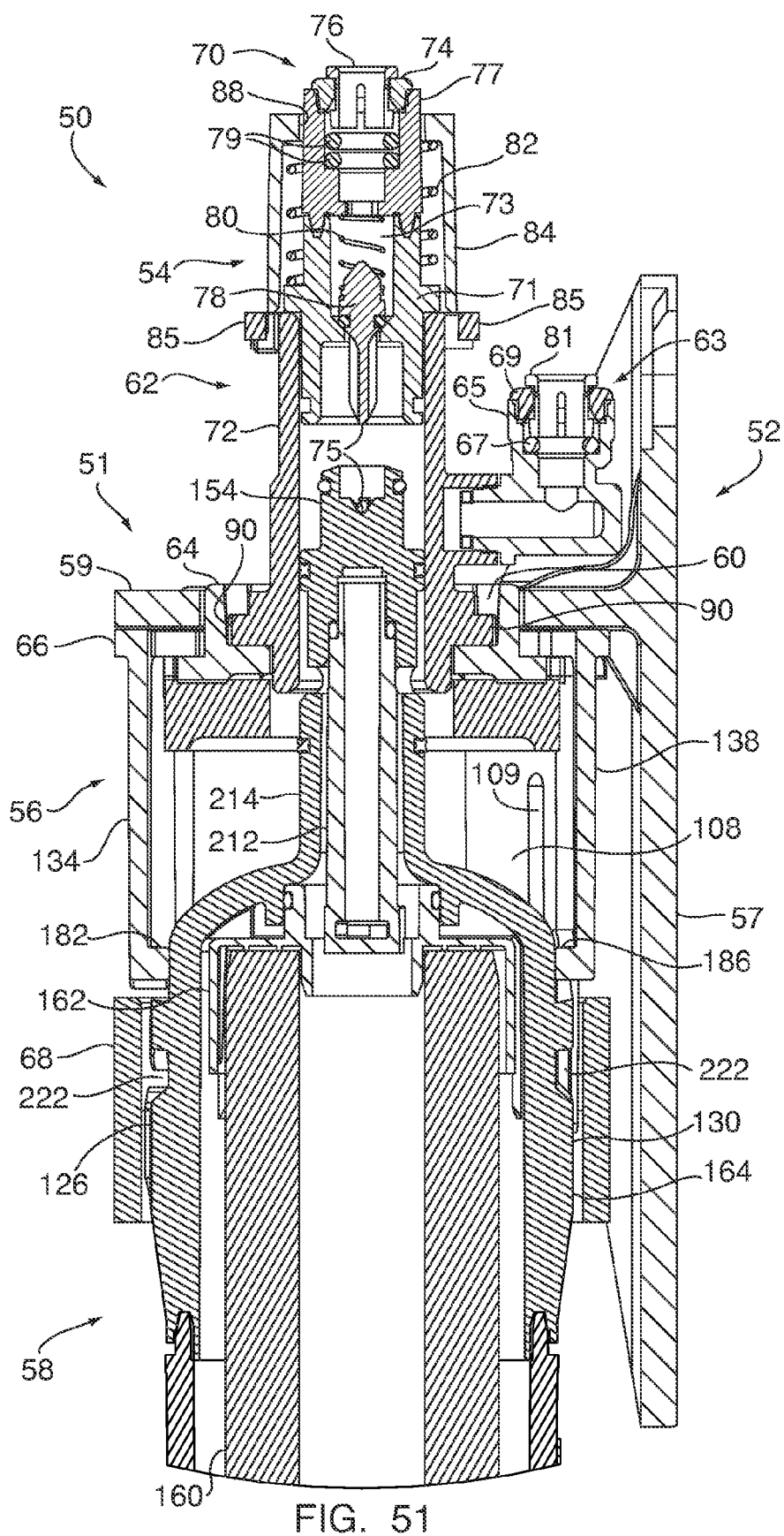

FIG. 51 illustrates the end result of the cartridge installation, that being the securing/latching of the cartridge in the operating position with all O-rings engaged to the manifold and to the inlet assembly, with the poppet valve 78 open and full water flow.

Filter Cartridge Removal

Figure 49:
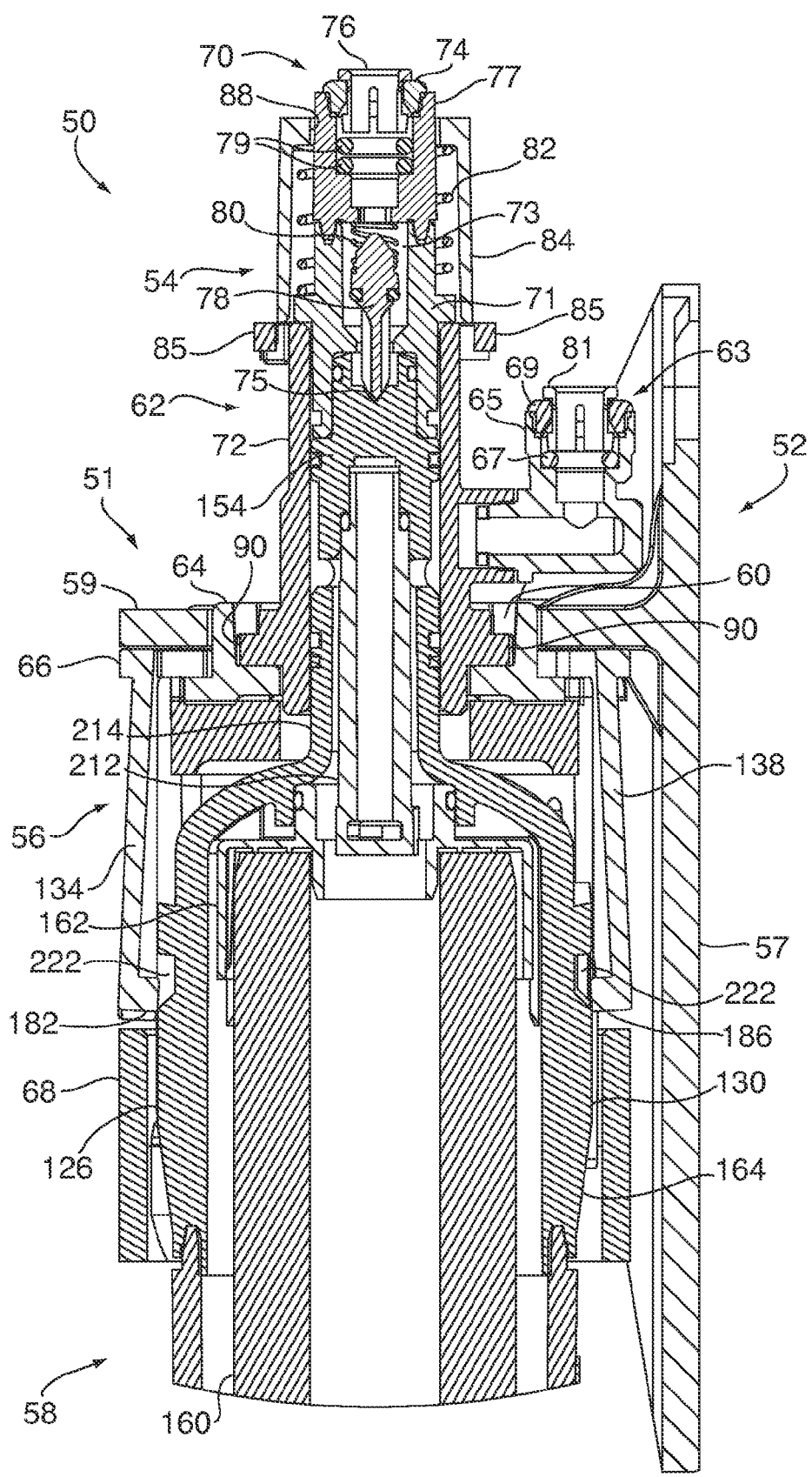
FIGS. 49-51 are cross sectional views of the filter cartridge/manifold illustrating the removal of the filter cartridge assembly subcomponent of FIG. 23 from the manifold assembly of FIG. 3.

Filter cartridge removal from the installed operating position connected to the manifold assembly is initiated by pushing the cartridge end toward the inlet assembly, which moves the inlet assembly in the same direction, as the inlet assembly is being pushed by the cartridge stem. At this point, the poppet valve 78 is open, all O-rings remain engaged and the connecting structures described above flex outwardly and rotate to release from engagement with the corresponding connecting structure on the filter cartridge, as illustrated in FIG. 49.

As illustrated in originally provided color FIG. 53, after the cartridge is pushed toward the inlet assembly, the cartridge is released and pushed outwardly by the inlet return spring and water pressure. As shown, the inlet assembly returned to the seat on the manifold with the poppet valve 78 remaining open.

Figure 50:
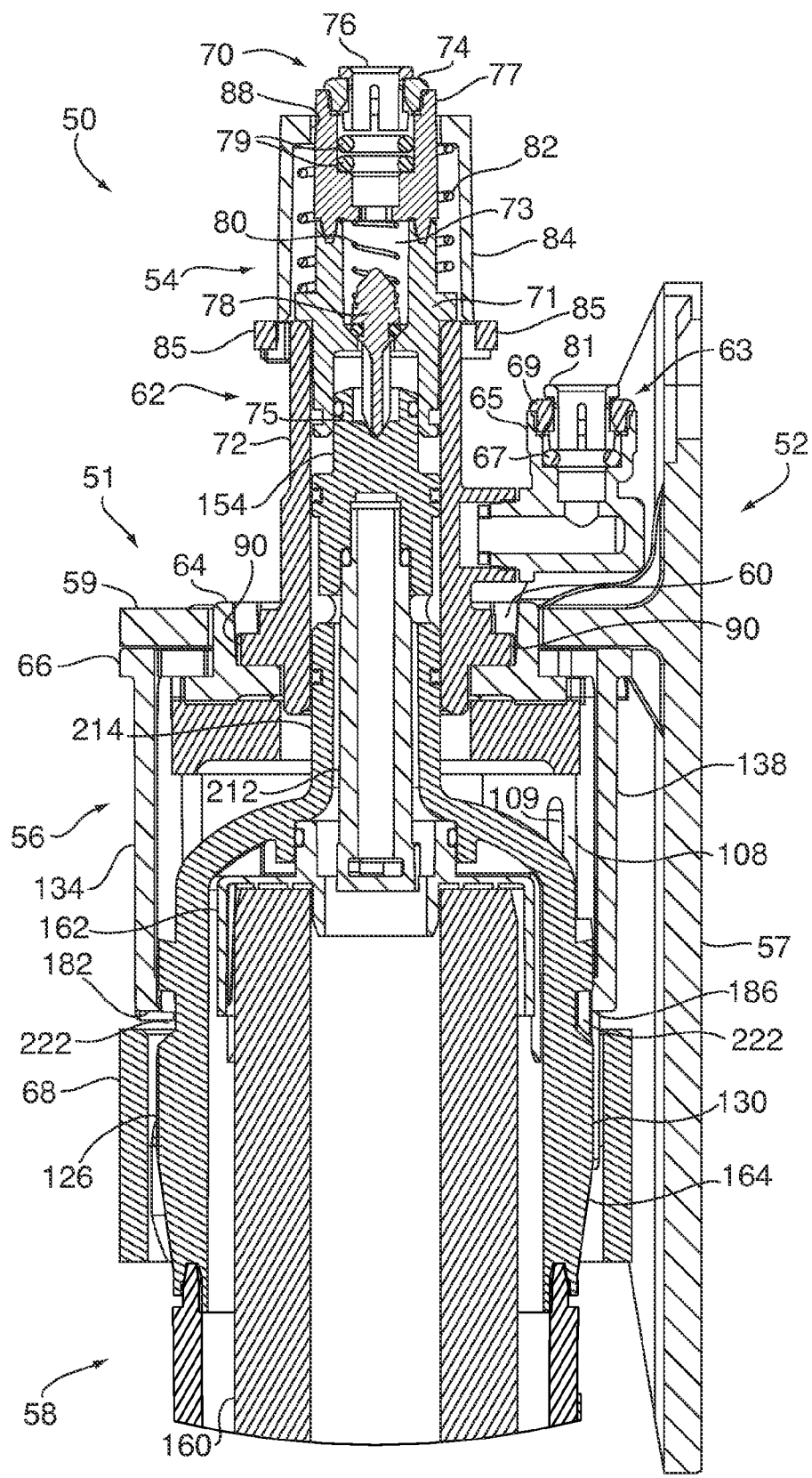

As illustrated in FIG. 50, at this point during cartridge removal, the cartridge is being removed by the user, the poppet valve 78 is closed, all the O-rings remain engaged but there is no water flow.

As illustrated in FIG. 51, as the cartridge is pulled further out by the user removing the cartridge, the cartridge seal to the inlet O-ring disengages, the lower cartridge O-rings disengage from the manifold and the cartridge vents. At this point, the user has successfully removed the cartridge from the upper of engagement with the inlet assembly.

Figure 55:
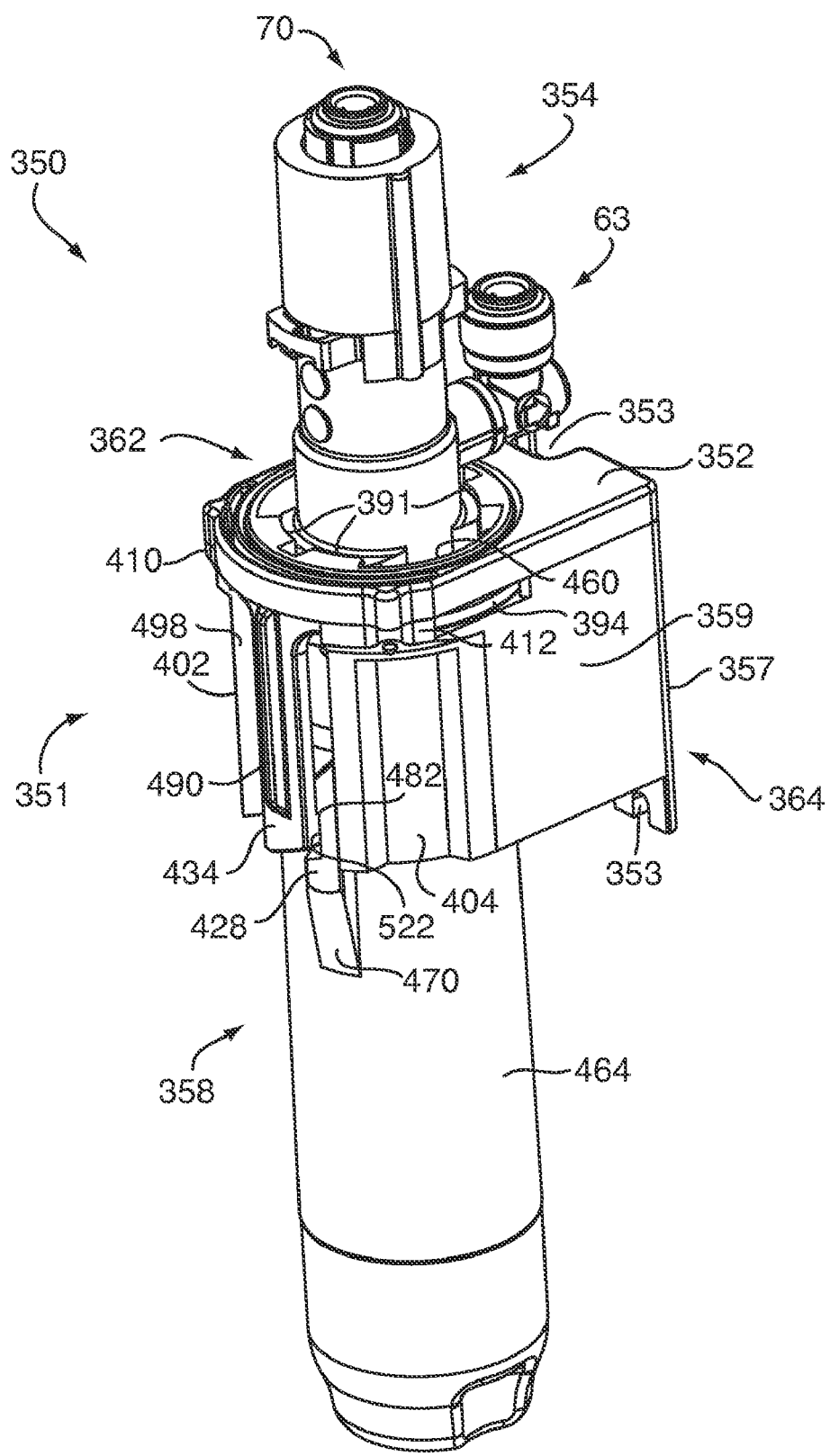
FIG. 55 is a representative perspective view of an alternative embodiment of the fluid filtration system of the present disclosure.

After the development of the specific embodiment described in detail above, another embodiment was developed which built upon the preceding disclosure and improves upon the above concepts (see FIG. 55). As can be seen upon a review of the drawings, the following new embodiment shares the manifold assembly 54 with the embodiment described above, reduces some components and strengthens several main components, as will be described herein below.

The present disclosure also relates to liquid, such as, for example, water, filtration systems that may be employed, in one representative application, but not limited to, appliances such as, for example, a refrigerator or similar device capable of utilizing a water filtration functionality during the normal operation thereof. The liquid filtration systems of the present disclosure include several new and unique features.

In another representative embodiment, illustrated in FIG. 55, a perspective view, and FIG. 56, an exploded view, a liquid filtration system 350, according to the present disclosure, comprises a filter cartridge latching system assembly 351, a manifold assembly 354, as disclosed above, for operatively connecting and disconnecting a representative filter cartridge 358 to the manifold assembly 354, as will be explained in greater detail below.

In this representative assembled liquid filtration system 350 illustrated in detail, the filter cartridge latching system 351 comprises structure 353 to operatively attach and detach the filter cartridge latching system 351 to another structure (not shown), such as, including, but not limited to, a refrigerator or similar device capable of utilizing a water filtration functionality during the normal operation thereof. The filter cartridge latching system 351 component of the liquid filtration system 350 comprises a bracket cover 352, a combination mounting bracket/main bracket/cartridge alignment collar 364 and a filter cartridge latch 366. The bracket cover 352 and combination mounting bracket/main bracket/cartridge alignment collar 364 further comprises fastening structure 355 and an attachment portion 359 respectively, for operatively connecting the manifold assembly 354 and the filter cartridge latch 366, as will be explained in more detail below.

In this representative assembled liquid filtration system 350 illustrated in detail, as with the embodiment above, the manifold assembly 354 is operatively connected to the filter cartridge latching system 351. The combination mounting bracket/main bracket/cartridge alignment collar 364 has a plurality of extensions members 402, 404 projecting there from, as will be explained in more detail below. The filter cartridge latch 366 is operatively connected to both the combination mounting bracket assembly/main bracket/cartridge alignment collar 364 and the manifold assembly 354 having a plurality of extension members 434,436 (as best illustrated in FIG. 56), presently preferably, projecting there from, the details of which will also be discussed below.

At this point, it seems prudent to describe the structural makeup of the components thereof including the filter cartridge latching system assembly 351 and manifold assembly 354, that comprise the portion that is fixed in the position of use of the presently preferred liquid filtration system 350 which receives, secures and selectively releases the replaceable filter cartridge 358 from engagement therewith and the interrelationships thereof.

Figure 56:
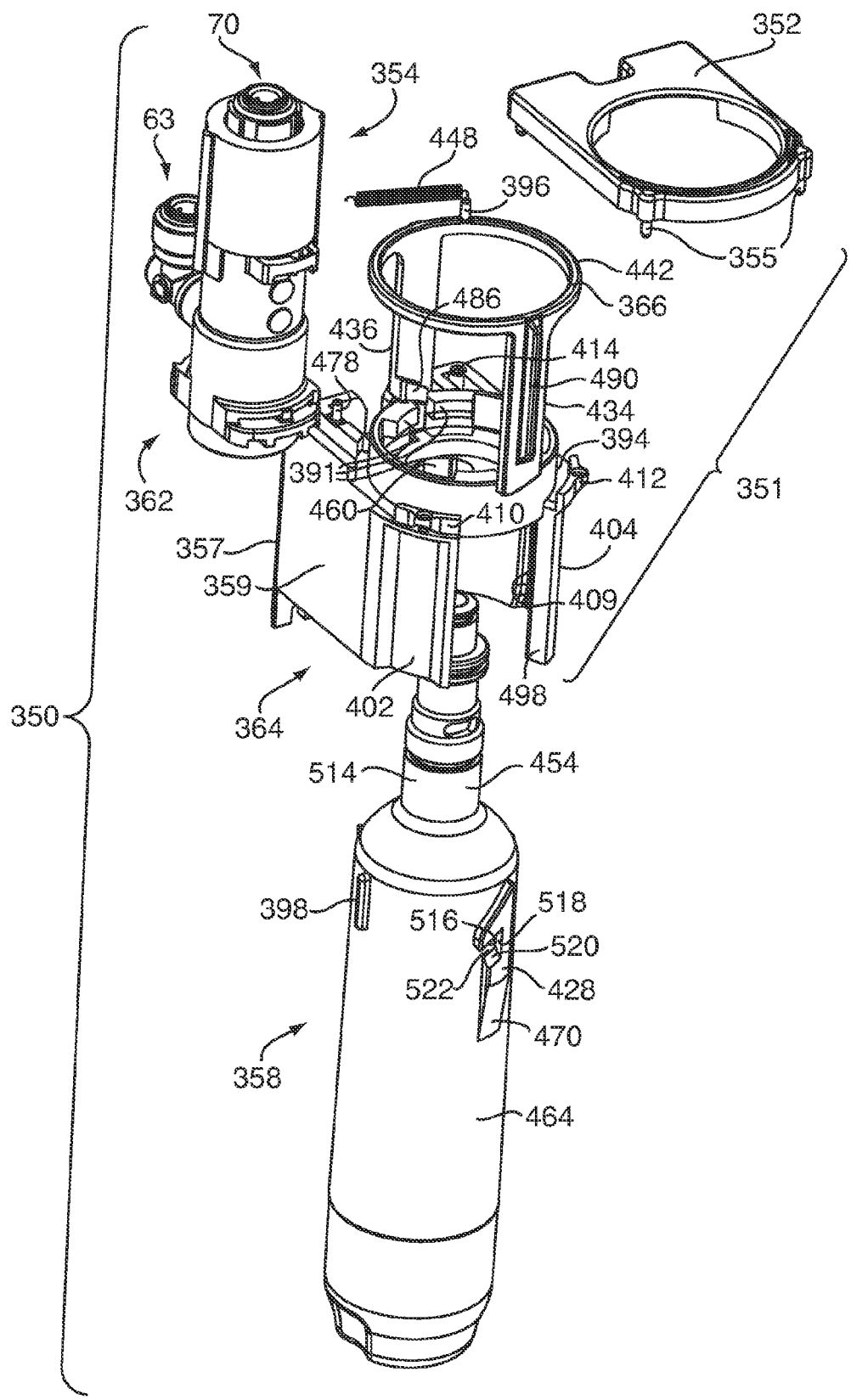
FIG. 56 is an exploded perspective view of the alternative embodiment of the fluid filtration system of FIG. 55.
Figure 59:
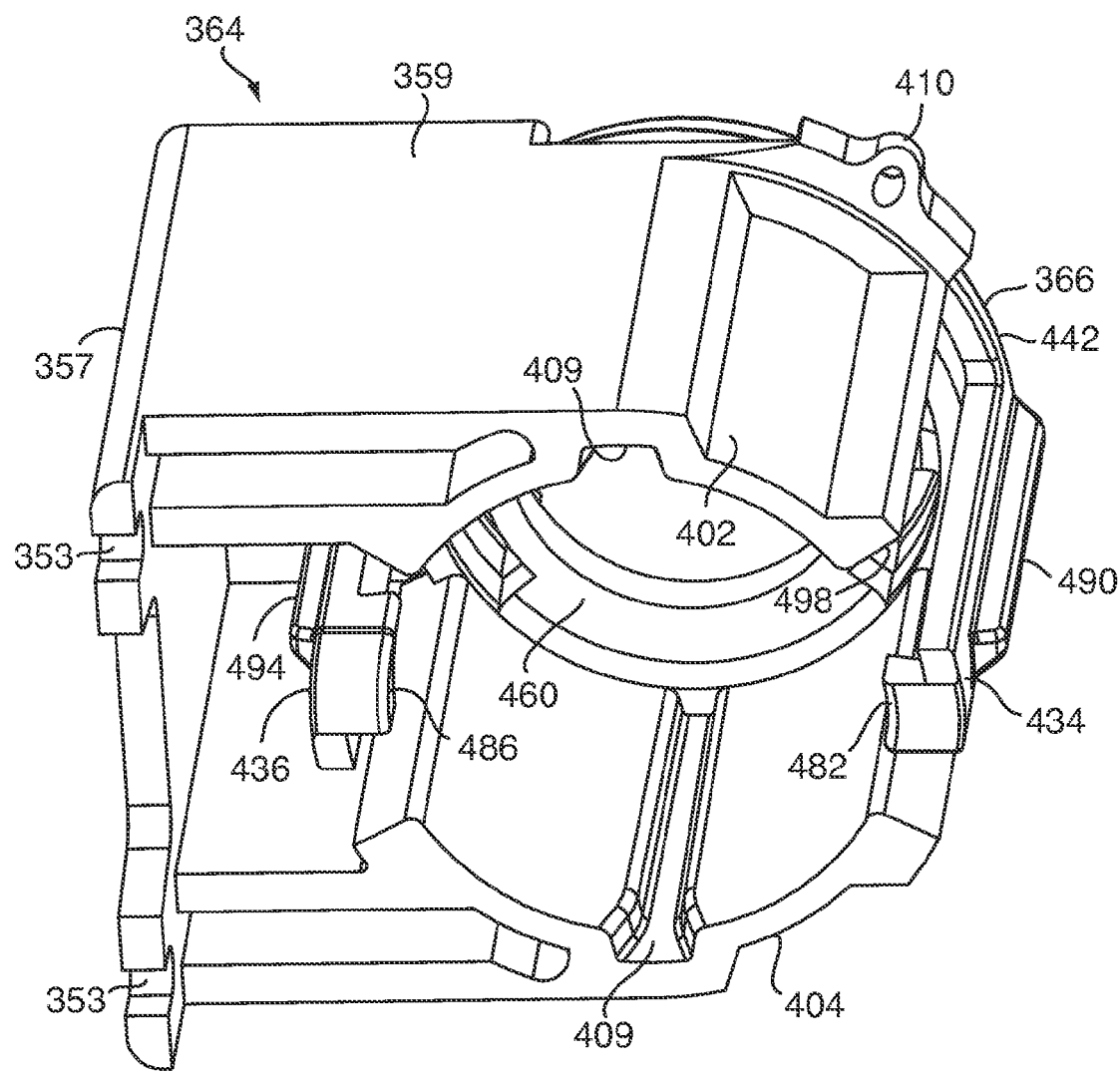
FIG. 59 is a schematic cross sectional view of the combination mounting bracket assembly/cartridge alignment collar/filter cartridge latching system assembly of the alternative embodiment of the fluid filtration system of FIG. 55.

The Combination Mounting Bracket Assembly/Cartridge Alignment Collar/Filter Cartridge Latching System Assembly As illustrated in FIGS. 56 and 59, the filter cartridge latching system assembly 351 component of the liquid filtration system 350 of the present disclosure, presently preferably, comprises the representative bracket cover 352, the combination mounting bracket/main bracket/cartridge alignment collar 364 and the filter cartridge latch 366. FIG. 59 is a perspective view of one representative filter cartridge latching system assembly 351, in accordance with the present disclosure. As specifically illustrated in the exploded view, the combination mounting bracket assembly/main bracket/cartridge alignment collar 364 comprises a one piece molded part, having a base portion 357 and the attachment portion 359, presently preferably, formed perpendicular to the base portion 357. The base portion 357 comprises representative structure 353 for securing the liquid filtration system 350 to other structure, such as, for example, a refrigerator, as is known in the art. The bracket cover 352 comprises connecting structure 355 for receiving and operatively connecting the combination mounting bracket assembly/main bracket/cartridge alignment collar 364 and the manifold assembly 354.

As illustrated, the attachment portion 359 comprises structure, for receiving fastening structure 355, such as, for example, protrusions, which interface and interconnect the combination mounting bracket assembly/main bracket/cartridge alignment collar 364 with the filter cartridge latch 366.

As illustrated in FIGS. 56 and 59, the combination mounting bracket assembly/main bracket/cartridge alignment collar 364 of the present embodiment combines the following structure of the previously disclosed embodiment above, including the filter cartridge latching system assembly 56 the main bracket 64, the latch 66, the alignment collar 68 and resilient means or latch assembly biasing structure such as, for example, a single latch return spring 448, which replaces original latch return springs, 148, 149. As will be explained in greater detail, the combination mounting bracket assembly/main bracket/cartridge alignment collar 364 comprises structure 409, operatively formed in the combination mounting bracket assembly/main bracket/cartridge alignment collar 364 extension members 402, 404, for aligning the filter cartridge 358 with the inlet assembly 70 housed in the manifold assembly 354. Further, the combination mounting bracket assembly/main bracket/cartridge alignment collar 364 comprises a bore 460 for allowing the interface of the filter cartridge stem 454 with the inlet assembly 70 along with structure 410, 412, 414, 416, operatively positioned therein, for interfacing with the connection structure 355 to operatively secure combination mounting bracket assembly/main bracket/cartridge alignment collar 364 to the bracket cover 352. Further, receiving structure 391, for operatively connecting the manifold assembly 354 to the combination mounting bracket assembly/main bracket/cartridge alignment collar 364 operatively positioned at the top thereof and proximate to the bore 460, as described above.

In one representative embodiment, the inside surface of the combination mounting bracket assembly/main bracket/cartridge alignment collar 364 is adapted to operatively interface such that cartridge latching structure 428, 432, as best illustrated in FIG. 56, presently preferably, formed as protrusions from the outer surface of the filter cartridge 358 must be aligned before the filter cartridge 358 can be properly inserted into the inlet assembly 70.

Figure 57:
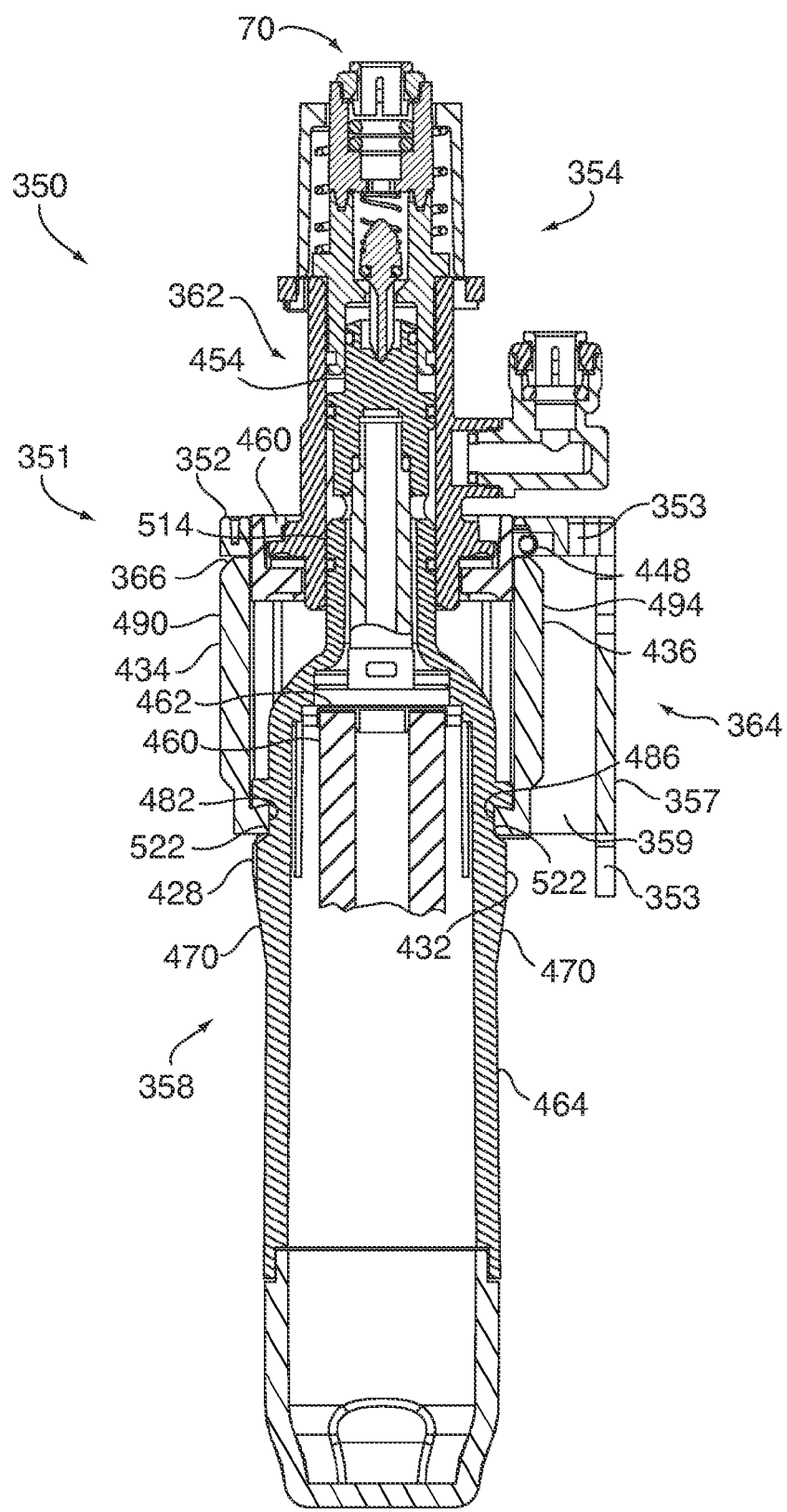
FIG. 57 is a cross sectional view of the alternative embodiment of the fluid filtration system of FIG. 55.
Figure 58:
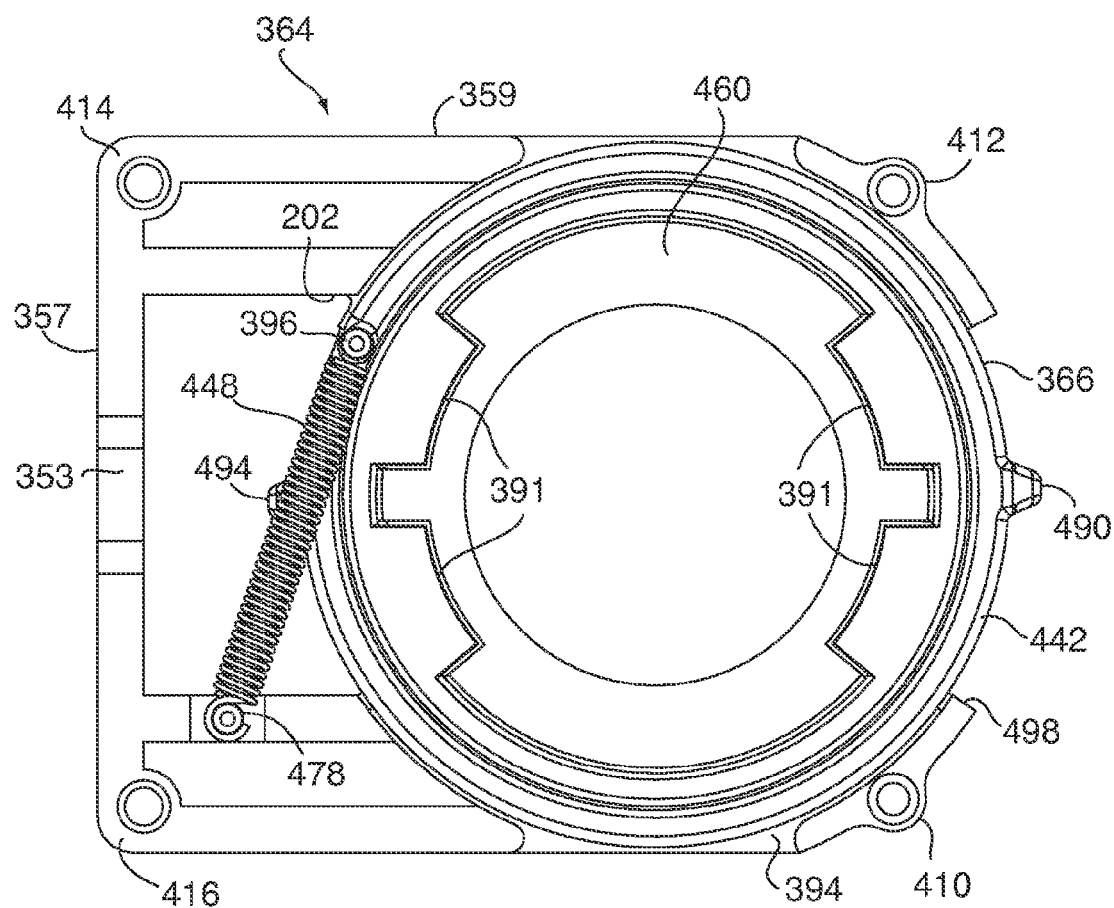
FIG. 58 is a plan view illustrating the operation of the latching mechanism of the alternative embodiment of the fluid filtration system of FIG. 55.

As illustrated in FIGS. 55-57, one representative embodiment that has proven effective in the utilization of the present disclosure in the intended environment comprises one set of opposing extension members 402, 404, having slots 409 formed therein for receiving corresponding alignment members 398, 400 formed on the face of the outer surface of filter cartridge 358 proximate the cartridge latching structure 428, 432. While it is presently preferred that the corresponding cartridge alignment members 398, 400 formed on the face of the outer surface of filter cartridge 358 and protrude from the surface thereof in order to operatively interface with the corresponding alignment members in the form of slots 409 on the combination mounting bracket assembly/main bracket/cartridge alignment collar 364 extension members 402, 404 it should be understood that, and as with the above described embodiment, any corresponding structure that is effective to accomplish the desired interface of the filter cartridge and the latching mechanism presently know to those skilled in the art and those presently unknown but that subsequently become know to those skilled in the art is intended to be encompassed by the present disclosure and claims. Specifically, such modifications as positioning slots on the surface of the filter cartridge and corresponding protrusions on the combination mounting bracket assembly/main bracket/cartridge alignment collar would be representative examples of one type of an infinite number of modification envisioned above.

As best illustrated in FIG. 56 the latch 366 comprises a rim 442 having two, presently preferably, opposed extension members 434, 436, projecting perpendicular thereto. As illustrated, the latch 366 is operatively positioned over the combination mounting bracket assembly/main bracket/cartridge alignment collar 364 such that the top surface of the combination mounting bracket assembly/main bracket/cartridge alignment collar 364 rim 394 and lower surface of the latch rim 442 are in sliding/bearing like contact. Projecting from the upper surface of the latch assembly rim 442 is a protrusion 396 for securing the latch assembly biasing structure 448 presently preferably, a latch return spring to corresponding protrusion 478 extending vertically from the top surface of the rim 394.

As best illustrated in FIG. 56, the set of, presently preferably, opposed extension members 434, 436 have projection members 482, 486, extending, presently preferably, perpendicularly from the inner surface thereof toward the center of the bore 360 formed in the latch rim 442. The latch extension members 434, 436, presently preferably, comprises corresponding structure 490, 494, for interfacing with corresponding structure 498, 202 of the combination mounting bracket assembly/main bracket/cartridge alignment collar 364 rim 394. The interface between the upper surface of the combination mounting bracket assembly/main bracket/cartridge alignment collar 364 rim 394 and the lower surface of the latch rim 442 provides a bearing like surface for the limited rotation of the latch 366 relative to the combination mounting bracket assembly/main bracket/cartridge alignment collar 364, thereby facilitating the engagement and disengagement of the filter cartridge 358 from the system of the present disclosure, as will be discussed in detail below.

The projection members 482, 486 of the, presently preferably, opposed extension members 434, 436, of the latch 366 are adapted to interface with corresponding cartridge latching structure 428, 432, presently preferably, in the form of notches 522 (see FIGS. 23-25 of the first embodiment) in order to secure the filter cartridge 358 in proper, nonreleasable, position in the manifold assembly 354.

As stated above with respect to the first embodiment, the inventors of the present embodiment have reaffirmed that the discovery that having the thickness of the innermost surface of the ends of at least two of the latch member projection members 482, 486 greater than the thickness of the latch member projection members 434, 436 at the interface between the two latch member projection members 482, 486 with corresponding structure on the cartridge latching structure 428, 432 on filter cartridge 358 outer surface provides a more than adequate means for preventing the inadvertent disengagement of the filter cartridge stem 454 from the inlet assembly 70.

In fact, during testing of representative embodiments of the present embodiment, the interlocking components of the two latch member projection members 482, 486 with the corresponding cartridge latching structure 428, 432 on the outer surface of the filter cartridge 358, inadvertent disengagement of the filter cartridge 358 from the system manifold assembly 354 did not occur, even during extreme conditions because the mating surfaces of the latch member projection members 482,486 and the filter cartridge latching structure 428, 432 have matching reverse angles that interlock/move together when a force, such as pressure, is applied to the filter cartridge from the stem or neck 454 toward the bottom thereof in the direction of disengagement of the filter cartridge from the manifold.

Filter Cartridge Latching System Assembly

The representative filter cartridge latch 366 of the present disclosure is unique and innovative to the application of fluid manifold/filter cartridge interface connections.

As illustrated in FIG. 56, the relationship between the combination mounting bracket assembly/main bracket/cartridge alignment collar 364 and the filter cartridge latch 366 is as illustrated by an exploded view thereof. FIG. 55 shows the combination mounting bracket assembly/main bracket/cartridge alignment collar 364 and the filter cartridge latch 366 as an assembled unit resulting from the operative connection thereof.

As with the first embodiment disclosed above, the operation of the representative filter cartridge latching system assembly 351 of the second embodiment can be best described as functioning some what like a retractable ball point pen. In the retractable ball point pen system, when the pen actuator is depressed, the ball point cartridge will translate out from inside the pen barrel and latch itself in an extended position so that the ball point is exposed. When the pen actuator is depressed again, the ball point will unlatch itself and be retracted back inside the barrel of the pen body.

The operation of the latching mechanism of the second embodiment operates basically the same as the first embodiment, that being opposite of the retractable ball point pen description above. Specifically, as the filter cartridge 358 is inserted into the filter cartridge latching system assembly 351 and becomes latched using a series of cam features and springs. This latching/camming motion is derived from a linear translation of the filter cartridge 358 into the manifold assembly 354 and filter cartridge latching system assembly 351 assemblies. The same linear translations/motions are used to un-install (or unlatch) the filter cartridge 358 from the filter cartridge latching system assembly 351 as were used to install (or latch) the filter cartridge 358 into the operating position.

The clear advantage that results from utilization of the presently preferred representative filter cartridge latching system assembly 351 of the second embodiment is the same as experienced with the first embodiment, in that the user only has to impose one direction of motion onto the filter cartridge 358 to have the filter cartridge 358 operatively lock into the manifold assembly 354 such that liquid flows into the filter cartridge 358.

The presently preferred, representative fluid filter system 350 of the second embodiment also eliminates the high breakout torque phenomenon associated with the prior ¼ turn devices. In the second embodiment representative system of the present disclosure, as with the first embodiment, no rotation of the highly compressed O-rings is required. The system of the present disclosure is effective to prevent rotational movement of the highly compressed O-rings and allows only translation movement of the highly compressed O-rings which also dramatically reduces the seal breaking force needed to unlatch and remove the filter cartridge 358 from an operative connection with the manifold assembly 354.

The unique and innovative filter cartridge latching system assembly 351 of the second embodiment of the present disclosure will now be described in detail. As stated above, the filter cartridge latching system assembly 351 is the mechanism that is operatively connected to the manifold assembly 354.

As illustrated in FIGS. 55-57, the filter cartridge latching system assembly 351 comprises, the inlet cover 352, the combination mounting bracket assembly/main bracket/cartridge alignment collar 364, the latch 366 and at least one resilience structure, such as, for example, a spring structure 448, as will be described below. In general, the main combination mounting bracket assembly/main bracket/cartridge alignment collar 364 is, presently preferably, an injected molded piece having at one end connecting structure 391 for interfacing with the manifold assembly 354 and two main bracket extension members 402, 406, projecting in the opposite direction from the other side of the combination mounting bracket assembly/main bracket/cartridge alignment collar 364 rim 394.

Structure 410, 412, 414, 416 is formed at operative locations on the combination mounting bracket assembly/main bracket/cartridge alignment collar 354 rim 394 for connecting the combination mounting bracket assembly/main bracket/cartridge alignment collar 354 to the bracket cover 352 through the use of connection structure 355, such as projections or any other known fastener that is capable of performing the function required in an acceptable manner or any yet to be discovered fastener capable of performing the required function. Further, two projection members 482, 486 extend from the inner surface of the two opposed extension members 434, 436 for operatively cooperating with the corresponding cartridge latching structure 428, 432 for latching and unlatching on the filter cartridge 358 such that the stem or neck 454 of the filter cartridge 358 is readily installed and subsequently readily removed from engagement with the manifold assembly 354.

The combination mounting bracket assembly/main bracket/cartridge alignment collar 364 rim 394 and the two opposed extension members 434, 438 of the latch rim 442 are adapted such that the latch rim 442 and the combination mounting bracket assembly/main bracket/cartridge alignment collar 364 rim 394 interface with each other in a manner that enables rotational movement of the two latch member projection members 444, 446 from the latch rim 442 of the latch 366 to rotate back and forth within a defined space in a similar manner as the first embodiment, as illustrated in FIGS. 41-42. In order to control the rotation of the two opposed extension members 434, 436, one representative resilience structure 448, such as, for example, a coil spring, a leaf spring, an extension spring, or any other presently known or unknown resilient structure capable of operatively performing the required function, is operatively connected thereto.

As mentioned above, structure similar to the first embodiment, for interacting with the two opposed extension members 434, 436 is illustrated in FIGS. 55 and 56. As illustrated, the representative structure, presently preferably, comprises projections above the surface of the filter cartridge external surface or cartridge latching structure 428, 432. While specific shaped structures are illustrated, it should be understood that any other shape that is capable of achieving the results of the specific structure show are intended to be within the scope of the claims of the present application. It is believed that there are numerous combinations of material and structures that could be used to accomplish the same results as that accomplished by the specific representative embodiments illustrated and such are considered to be within the scope of the innovation of the present disclosure.

As was explained in more detail during the operation of the systems of the first embodiment of the present disclosure, it remains important that whatever structure and/or material is selected for the two opposed extension members 434, 436 and the corresponding cartridge latching structure 428, 432, formed on the filter cartridge 358 be capable of certain actions that allow the filter cartridge to be engaged with and disengaged from the manifold assembly 354 without imparting rotational forces to the filter cartridge. In the specific representative second embodiment illustrated, the two opposed extension members 434, 436, presently preferably are capable of movement away from and toward the surface of the filter cartridge 358 during installation and removal of the filter cartridge 358 from the manifold assembly 354. Further, the two opposed extension members 434, 436, are presently preferably capable of rotating between the openings in combination mounting bracket assembly/main bracket/cartridge alignment collar 364 to facilitate the engagement of the projection members 482, 486 formed on the inner surface of the two opposed extension members 434, 436, with cartridge latching structure 428, 432 formed on the outer surface of the filter cartridge 358. Even further, the two opposed extension members 434, 436 must be operatively connected to structure 490, 494 for interfacing with corresponding structure 498, 202 of the rim 394 that enables the opposed extension members 434, 436 to rotate away from a protrusion 478 of the combination mounting bracket assembly/main bracket/cartridge alignment collar 364 and then be forced back away from the protrusion 478 into engagement with the cartridge latching structure 428, 432 on the outer surface of the filter cartridge 358.

By the same token, upon the straight line push/pull motion of the filter cartridge 358 into the manifold assembly 354, the complementary structure of the projection members 482, 486 of the two opposed extension members 434, 436 and the cartridge latching structure 428, 432, on the outer surface of the filter cartridge 358 must be capable of disengaging so that the filter cartridge 358 can be removed from engagement with the manifold assembly 354 by simply moving the filter cartridge 358 into the manifold assembly 354 without any rotational movement thereof. Once this has occurred, the filter cartridge 358 is readily removed from engagement with the manifold assembly 354 and a new cartridge 358 can then be moved into engagement with the manifold assembly 354.

Specifically, among the innovative features of the present disclosure, it has been determined desirable to load the latch 366 spring 448 to give positive engagement. Further, it has also been determined desirable to enable the system to allow for latch over-ride and forced engagement during installation of the filter cartridge 358. In the specific second representative embodiment illustrated, it has been determined desirable to spring the latch using a single latch return spring 448 although it is recognized that more springs could be effectively utilized. Finally, it has also been determined desirable to use two opposed extension members 434, 436 to engage with filter cartridge 358, although it is recognized that the utilization of more extension members may be sufficient to accomplish effectively the interconnection function, as would be understood by those skilled in the art.

At this point, we will now describe a representative filter cartridge assembly 358 component of the liquid filtration system 350, as contemplated in the second embodiment of the present disclosure.

The Filter Cartridge Assembly

As illustrated in FIG. 22, an exploded view of the filter cartridge assembly 58, a representative embodiment of the filter cartridge assembly component of the first embodiment of the present disclosure, which is similar to the second embodiment, comprises a closure member 158, filtration media 160, a top end cap 162, a shell 164 including a stem 154 member. FIG. 56 includes a perspective view of a representative embodiment of an assembled filter cartridge assembly 358 according to the second embodiment of the present disclosure.

As illustrated in FIG. 56, the upper portion or shell portion 464 of the filter cartridge 358 comprises representative cartridge latching structure 428, 432 projecting outwardly from the outer surface of the shell 464. As described above, these representative cartridge latching structure 428, 432 and alignment members 398 400 are adapted to interface with the corresponding two main bracket extension members 402, 404 on the combination mounting bracket assembly/main bracket cartridge alignment collar 364, and have structure or slots 409 for interacting with the alignment members 398, 400 on the filter cartridge surface. It should be understood that while the structure illustrated for the representative cartridge latching structure 428, 432 and alignment members 398, 400 are protrusions, depressions or more or less thick protrusions capable of performing the intended function while interacting with the corresponding components is to be considered a part of the present disclosure.

Figure 60:
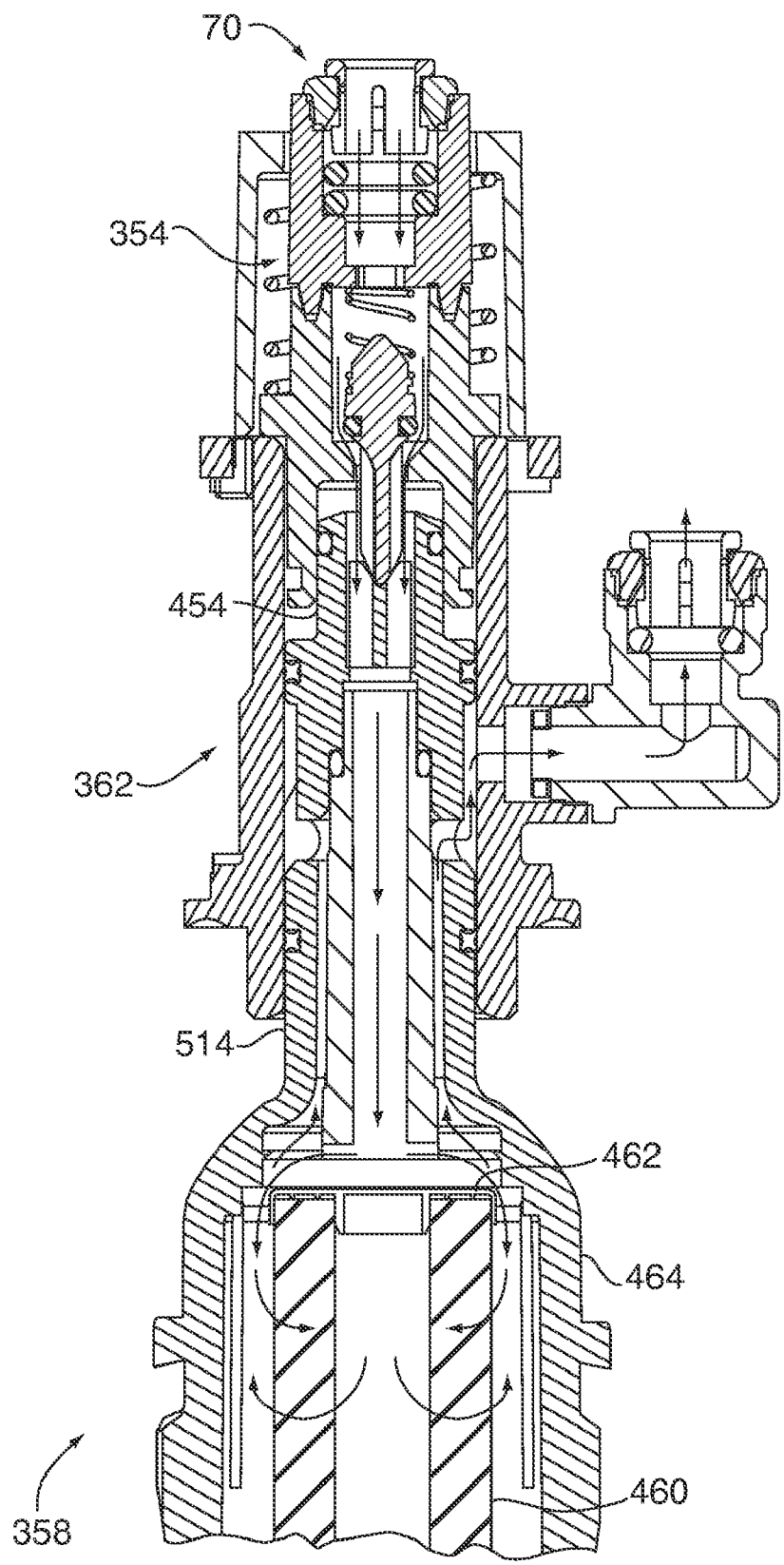
FIG. 60 is a schematic cross sectional of the fluid flow path through the two representative fluid filtration systems of the present disclosure.

As with the first embodiment and as shown in FIG. 60, the representative top end cap 462 is operatively connected to the representative filtration media 460 in any conventional manner known to those skilled in the art. As specifically illustrated, the top end cap has a representative inner stem portion having various representative sealing structures, such as O-rings, operatively positioned thereon. The representative shell 464 comprises in addition to the above mentioned representative cartridge latching structure 428, 432 and alignment members 398, 400, an outer stem portion 514 having a plurality of representative sealing means, such as, for example, O-rings operatively positioned thereon for facilitating the movement of liquid from the inlet assembly 70 through the filtration media 460 and out through the outlet assembly 362, as is known to those skilled in the art. It should be understood that while a specific representative embodiment of the system of the present disclosure is illustrated many other workable embodiments are possible and such is intended to be included within the scope of the present disclosure and claims. Since so many filtration cartridge assembly variations are possible, we believe it unnecessary to give a complete description of each and every possible filtration cartridge assembly embodiment.

However, as mentioned in the description of the first embodiment, one feature of the second filter cartridge assembly 358 embodiment illustrated resides in the representative cartridge latching structure 428, 432 and alignment members 398, 400 illustrated as protrusions from the outer surface of the filter cartridge assembly, and, in particular, as illustrated, the shell 464, it being understood that corresponding structure could be positioned on the outer surface of the filter cartridge assembly 358 or at any other location thereon so long as the corresponding structure positioned on the main bracket and the latch assembly are capable of successfully interfacing therewith.

As best illustrated in FIGS. 23-25 of the first embodiment, the filter cartridge corresponding cartridge latching structure 428, 432 of the second embodiment is illustrated in detail in FIG. 56. Features of the first latching structure 428 include three diagonal surfaces 516, 518, 520, with a notch 522 formed between two 516, 520 of the diagonal surfaces. The reduced width of the corresponding cartridge latching structure 428, 432 performs an important function that will be described below. As illustrated, the portion of the first latching structure most distal from the stem includes a tapered portion 470. The alignment members 398, 400 comprises a complementary shaped element for interacting with the structure or slots 409 formed in the main bracket extension members 402, 404.

As with the first embodiment, the corresponding filter cartridge latching structure 432 comprises a notch 522 formed from three relatively straight surfaces 526, 528, 530. As with the corresponding portion two extension members projecting from the latch 366, the outer surface of the upper portion 526 is thicker than the point at which the cartridge latching structure 428, 432 interfaces with the filter cartridge surface. This cartridge latching structure 428, 432 in combination with the corresponding projection members 482, 486, as illustrated in FIGS. 56-59, on the extension members provides for a positive engagement of the filter cartridge latching system assembly 351 thereby securely positioning and retaining the filter cartridge in the correct operative position.

As with the first embodiment, the fluid filtration system 350 of the second embodiment of the present discourse currently contemplates and features a similar proprietary key configuration in that the specific configuration of the filter cartridge entrance points into the alignment collar are shaped as illustrated in the various Figures but can be configured in an infinite number of different shapes to provide a filtration system unique to each customer/manufacturer to ensure that only matching propriety shaped corresponding portions are allowed to be installed, thereby providing for quality control of replacement cartridges.

As with the first embodiment, each unique filter cartridge corresponding latching structure 428, 432 and corresponding alignment members 398, 400 or key configurations allow only the contracted user (or owner—if the customer has purchased the right to use a specific key configuration) the ability to replace the customer authorized filter cartridge into the main bracket assembly and no one else's, because any other shaped configuration will not fit, due to the unique key configuration. One representative and illustrated key configuration is defined by an alignment member (i.e. key) positioned on the outer surface of the filter cartridge and a corresponding slot (i.e. keyway) formed in the main bracket. If the alignment member and the slot do not line up during installation of the filter cartridge, the latching system assembly 351 will not actuate and will not lock the filter cartridge into operative position within the latching system assembly 351 and the filter cartridge having a non conforming key configuration will be prevented from being operatively connected to the manifold 354.

As with the first embodiment, while not all possible key configurations have been disclosed herein, it is believed that the same conceptual theory holds true for infinite variations of key and corresponding keyway configurations formed on the filter cartridge and the latching system assembly and the alignment collar. The present disclosure contemplates that an infinite number of different keys and corresponding keyway configurations can be developed by changing any one or any combination of the size, shape and/or location of these keys and keyways and the present disclosure is intended to encompass all such possible different configurations.

Cartridge Poppet Interface

The second embodiment includes the cartridge poppet interface illustrated in FIGS. 26-27. Thus, it is believed that a detailed description of such is not required at this time, as such was disclosed in great detail with respect to the first embodiment above.

Cartridge Outlet Port Hole

It has also been determined that fluid drip that occurs during cartridge change out is reduced when only one outlet port is present in the filter cartridge stem. However, it should be understood that while fluid drip is reduced by using only one outlet port, the cartridge component of the preset liquid filtration system 350 would function acceptably with respect to fluid drip when the stem 454 has been manufactured with two outlet port holes.

Now that we have described the various components of the liquid filtration system 350 of the present disclosure and how an end user would place the liquid filtration system 350 in operation in the environment of use, we will know describe the operation of the liquid filtration system 350 of the present disclosure.

Water Flow Direction through the Cartridge

As shown in FIG. 60, due to the configuration required for refrigeration applications, the water flow direction through the manifold and into and out of the cartridge required modified entry and exit points as well as a flow path direction through the cartridge. Because the typical liquid flow path through a filter cartridge of this type required the fluid to enter from the side and exit from the central filter stem, due to the manifold design, the incoming fluid was required to align with the center stem and thus a top end cap was added to direct the incoming fluid from a path in line with the center of the filter media to a path parallel with the outer wall of the shell, between the shell and the filter media, so that the fluid flow would be from the outside into the center cavity of the filter media and then out of the cartridge through an outlet assembly formed perpendicular to the inlet flow.

As can be seen, it would have been difficult, if not impossible, to design a filtration system having the outlet aligned with the center stem, especially in view of the cost and space required for such a configuration.

Placing the Second Embodiment of the System in Operation

In an effort to clearly show the cooperative components of the first embodiment system of the present disclosure, applicants provided color figures depicting the installation and removal of the filter cartridge from the latching system assembly 56 and from the manifold 54 in the provisional application.

We turn now to a description of the interaction of the external components of the fluid filtration system of the second embodiment of the present disclosure as a filter cartridge is first installed and then disengaged from the manifold and removed in order to be replaced.

Filter Cartridge Installation

Figure 28:
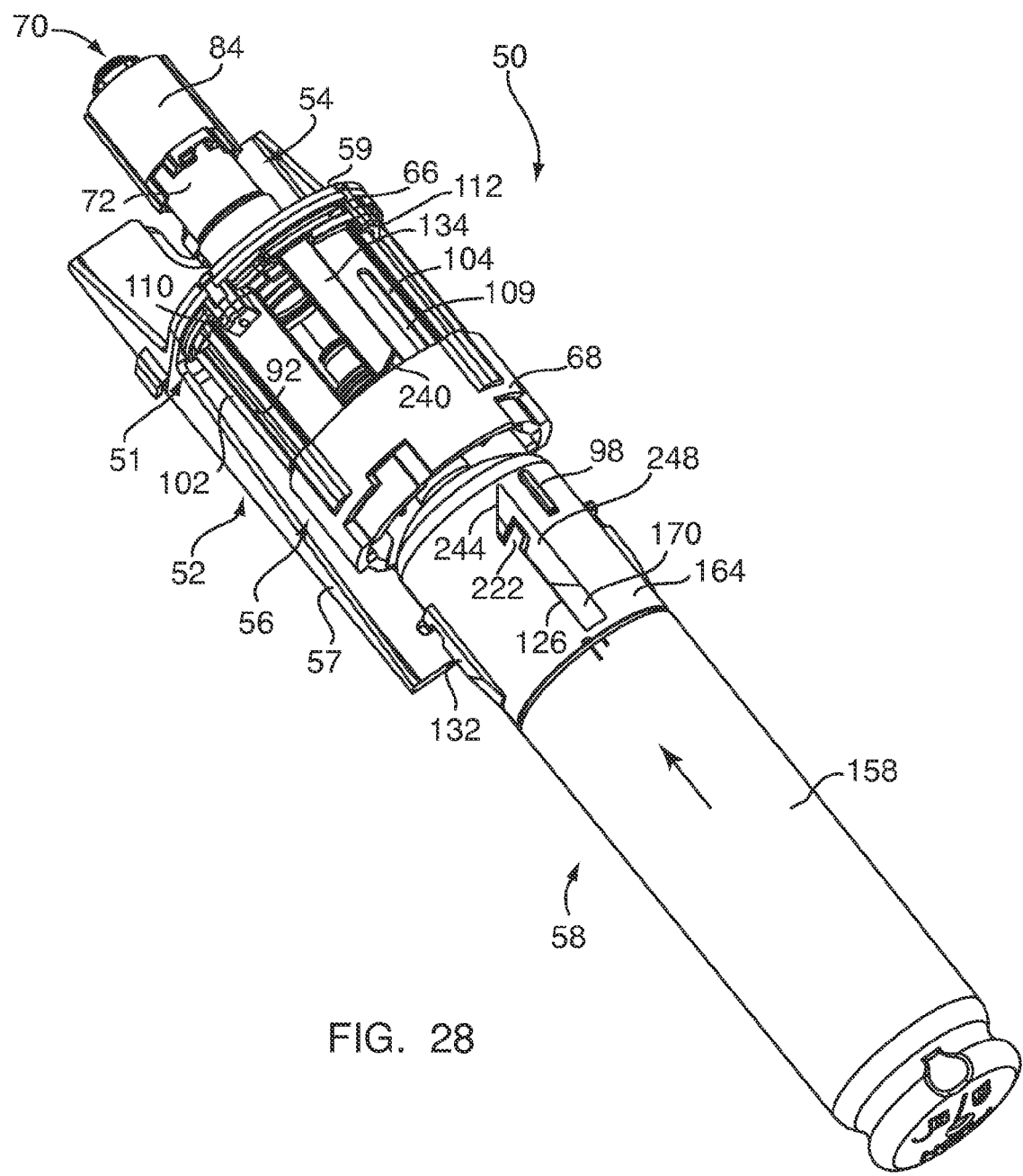
FIGS. 28-35 illustrate the installation of the filter cartridge assembly sub component of FIG. 20 into the manifold sub assembly of FIG. 17.

The installation of the second embodiment is quite similar to the installation of the first embodiment as illustrated in FIG. 28. However, the number of individual components is reduced in the combination mounting bracket assembly/main bracket/cartridge alignment collar 364 and has corresponding structure 409 which when aligned with the proper cartridge latching structure and alignment members on the filter cartridge outer surface, allows the second embodiment of the filter cartridge to align the proper opposed extension members of the latch 366.

Figure 29:
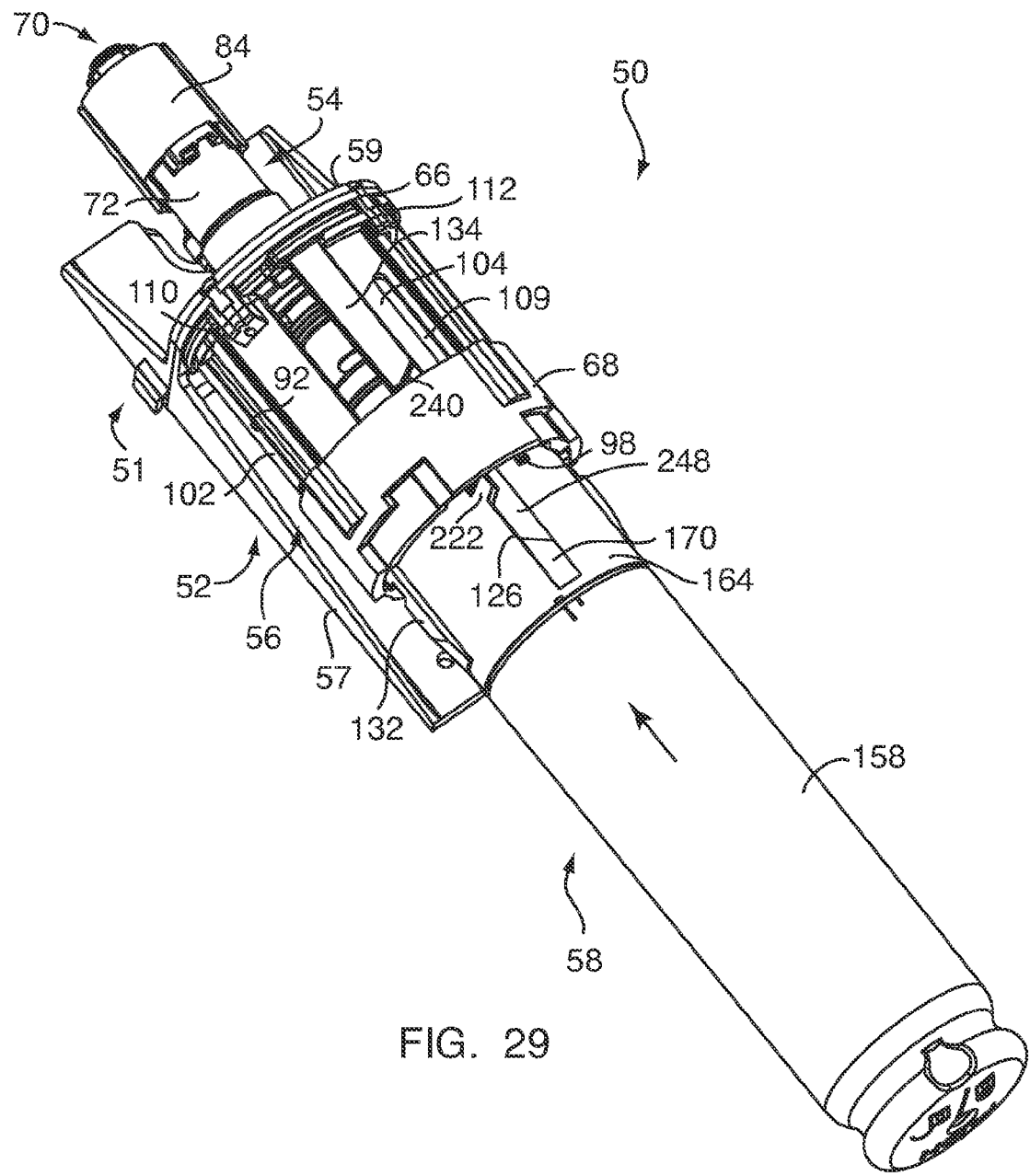

As with the first embodiment, once properly aligned by an operator, the filter cartridge is moved in the direction of the arrow as previously shown in FIGS. 28 and 29 for the first embodiment so that the stem 454 of the filter cartridge moves toward the manifold. FIG. 29 of the first embodiment illustrates the cartridge latching structure and alignment members on the filter cartridge outer surface of the first embodiment being aligned with the corresponding structure in the cartridge alignment collar 68, as would occur with the second embodiment. The corresponding parts of the second embodiment would interact in the same manner and as the second embodiment filter cartridge is moved further toward the manifold, a cam surface on the opposed extension members of the latch 366 comes into contact with a cam surface of the cartridge latching structure as illustrated in FIG. 30 with respect to the first embodiment. In the second embodiment, it is presently preferred that there be only one set of two corresponding structure positioned on the filter cartridge latching system assembly 351 and the filter cartridge 358. The one set is presently preferred located at about 180 degrees relative to the other member of the set, it being understood that the number and the relative positions thereof can vary, as long as the function of operatively connecting the filter system and the manifold together is accomplished.

While in the following description we will refer to some Figures related to the first embodiment, we will use the corresponding parts for the second embodiment in the descriptions.

As the cam surface of the latch 366 contacts the angled cam surface on the corresponding member of the filter cartridge, the latch 366 begins to rotate away from the corresponding member of the mounting bracket/main bracket/cartridge alignment collar 364, the tension therefore being provided by latch return spring 448 operatively connected to both the latch 366 and the combination mounting bracket assembly/main bracket/cartridge alignment collar 364. FIGS. 30-33 illustrate the continued movement of the first embodiment filter cartridge toward the manifold and the continued separation of the opposed latch 366 extension members from the corresponding main bracket extension members.

As illustrated in FIG. 34 with respect to the first embodiment, the cam surface of the latch 366 that is closest to the corresponding main bracket extension members, from which the latching member has rotated away from, rotates back slightly in order to catch in the notch of cartridge latching structure. As the filter cartridge continues to be moved toward the manifold, as illustrated in FIGS. 34-36 with respect to the first embodiment, bias provided by the latch return spring 448 and the inlet return spring 82 forces the projection member into the notch of cartridge latching structure until the filter cartridge is locked into position.

Filter Cartridge Removal

As with installation, removal of the second embodiment is quite similar to the removal with respect as illustrated in FIGS. 37-40 of the first embodiment. As illustrated in FIG. 37 with respect to the first embodiment, with a cartridge installed, the second embodiment cartridge would be pushed forward, at which point, the projection members of the one set of, presently preferably, opposed extension members of the latch 366 ride up on the cam surfaces a portion that was not cut out by the notches 522, on each of the corresponding cartridge latching structure on the surface of the filter cartridge, and due to their resilience, the opposed extension members move away from the filter cartridge or bend outwardly away from the corresponding notches 522 of the cartridge latching structure to positively disengage. The opposed extension members then rotates back toward the main bracket extension members, due to the spring bias, over top of the cartridge locking cams to unlock the cartridge from the filter cartridge latching system assembly 351 as illustrated in FIGS. 38-39 with respect to the first embodiment.

Once this is accomplished, the filter cartridge is now unlocked and can be pulled out of the manifold, as illustrated in FIGS. 40-41. The inlet return spring provides an ejection assist to help push the filter cartridge out of the manifold. To replace the removed filter cartridge with a new filter cartridge or to reinstall the original filter cartridge, the filter cartridge installation procedure described above is followed, as with the first embodiment.

At this point, it is believed that a detailed description of the operation of the latch spring rotational movement of the latch rim on the combination mounting bracket assembly/main bracket/cartridge alignment collar rim is unnecessary as the principles of the operation of the latch spring is disclosed above.

It is also believed that any repeat description of the description of the cartridge stem with the inlet assembly during filter insulation is unnecessary, as a detailed description has been given with respect to FIGS. 44-58 in the detailed description of the first embodiment.

Thus, it should be clear that the two embodiments of the present application have met the objectives of the design criteria in that the need in the art for a fluid filter system including, but not limited to, a unique combination of sub-components that enable a filter cartridge to be installed and removed from a manifold with a straight line push/pull motion, an innovative latching mechanism that is reliable and provides for a relatively drip free connection with the manifold, a unique interface and mechanism between an innovative manifold and a filter cartridge, a compact and simple mechanism positioned between the manifold and the filter cartridge that significantly reduces the installation and removal force previously found with fluid filtration cartridges, a low force filter cartridge installation and removal mechanism for utilization by the end consumer and/or an automatic shut-off system, wherein, as the inlet water pressure increases past a predetermined desired maximum system operating pressure, the inlet water will automatically be shut-off, i.e., will not flow into (or out of) the filter cartridge has been achieved.

While the articles, apparatus and methods for using and making the articles contained herein constitute preferred embodiments of the invention, it is to be understood that the invention is not limited to these precise articles, apparatus and methods, and that changes may be made therein without departing from the scope of the inventions which are defined in the appended claims.

What is claimed is:

1. A fluid filtration system for enabling a filter cartridge to be installed and removed from a manifold by linear translation of the filter cartridge, the fluid filtration system comprising:
- a manifold assembly having an inlet port and an outlet port, wherein at least one of the inlet port or the outlet port has the capability to translate relative to the manifold assembly; and
- a filter installation and removal mechanism including a latching mechanism, the mechanism being located on the manifold assembly to:
   - (i) latch the filter cartridge into engagement with the manifold assembly by linear translation of the filter cartridge toward the manifold assembly; and
   - (ii) unlatch the filter cartridge from engagement with the manifold assembly by linear translation of the filter cartridge toward the manifold assembly.

2. The fluid filtration system of claim 1, wherein the relative translation between the at least one of the inlet port or the outlet port and the manifold assembly is such that a fluid trapped in the inlet port or the outlet port can translate and prevent compression of the fluid during:
   - (i) installation of the filter cartridge into the manifold assembly;
   - (ii) operation of the fluid filtration system after the filter cartridge is installed; and
   - (iii) removal of the filter cartridge from the manifold assembly.

3. The fluid filtration system of claim 2, wherein the inlet port translates relative to the manifold assembly, the fluid filtration system further comprising:
   - an automatic shut-off system, operatively connected to the manifold assembly, wherein as an inlet fluid pressure increases past a predetermined desired maximum system operating pressure, the inlet port translates in the manifold assembly away from the filter cartridge such that inlet fluid is automatically shut-off and fluid will not flow into the filter cartridge.

4. The fluid filtration system of claim 1 comprising a filter cartridge, wherein the manifold assembly further comprises a mounting bracket and an alignment collar connected to the mounting bracket;
   - wherein the filter cartridge further comprises one or more alignment members that interface with the alignment collar to align the filter cartridge with the manifold assembly.

5. The fluid filtration system of claim 4 wherein the one or more alignment members comprises a protrusion on the outer surface of the filter cartridge.

6. The fluid filtration system of claim 4 wherein the alignment collar comprises one or more slots to assist in aligning the filter cartridge with the alignment collar.

7. The fluid filtration system of claim 6 wherein the filter cartridge further comprises a cartridge latching structure formed on the filter cartridge outer surface to interact with the latching mechanism, wherein the cartridge latching structure passes through the one or more slots to insert the filter cartridge into the manifold assembly.

8. The fluid filtration system of claim 7 wherein the cartridge latching structure comprises one or more projections that pass through the one or more slots to insert the filter cartridge into the manifold assembly.

9. The fluid filtration system of claim 6 wherein the one or more alignment members comprises a protrusion on the outer surface of the filter cartridge that interfaces with the one or more slots on the alignment collar.

10. The fluid filtration system of claim 9 wherein the filter cartridge further comprises a cartridge latching structure formed on the filter cartridge outer surface to interact with the latching mechanism, wherein the cartridge latching structure passes through the one or more slots to insert the filter cartridge into the manifold assembly.

11. The fluid filtration system of claim 10 wherein the cartridge latching structure comprises one or more projections that pass through the one or more slots to insert the filter cartridge into the manifold assembly.

12. The fluid filtration system of claim 1 wherein the manifold assembly comprises a compression spring that is biased against translation of the filter cartridge into the manifold assembly.

13. The fluid filtration system of claim 1 wherein the manifold assembly comprises a shut-off valve that is opened by translation of the filter cartridge into the manifold assembly, and closed by translation of the filter cartridge out of the manifold assembly.

14. The fluid filtration system of claim 13 wherein the shut-off valve comprises a spring that biases the shut-off valve toward the filter cartridge.

* * * * *

UNITED STATES PATENT AND TRADEMARK OFFICE
CERTIFICATE OF CORRECTION

PATENT NO. : 8,097,156 B2  
APPLICATION NO. : 11/458936  
DATED : January 17, 2012  
INVENTOR(S) : Tubby et al.

Page 1 of 2

It is certified that error appears in the above-identified patent and that said Letters Patent is hereby corrected as shown below:

In the Drawings

FIG. 6 should be replaced with corrected FIG. 6 as shown below.

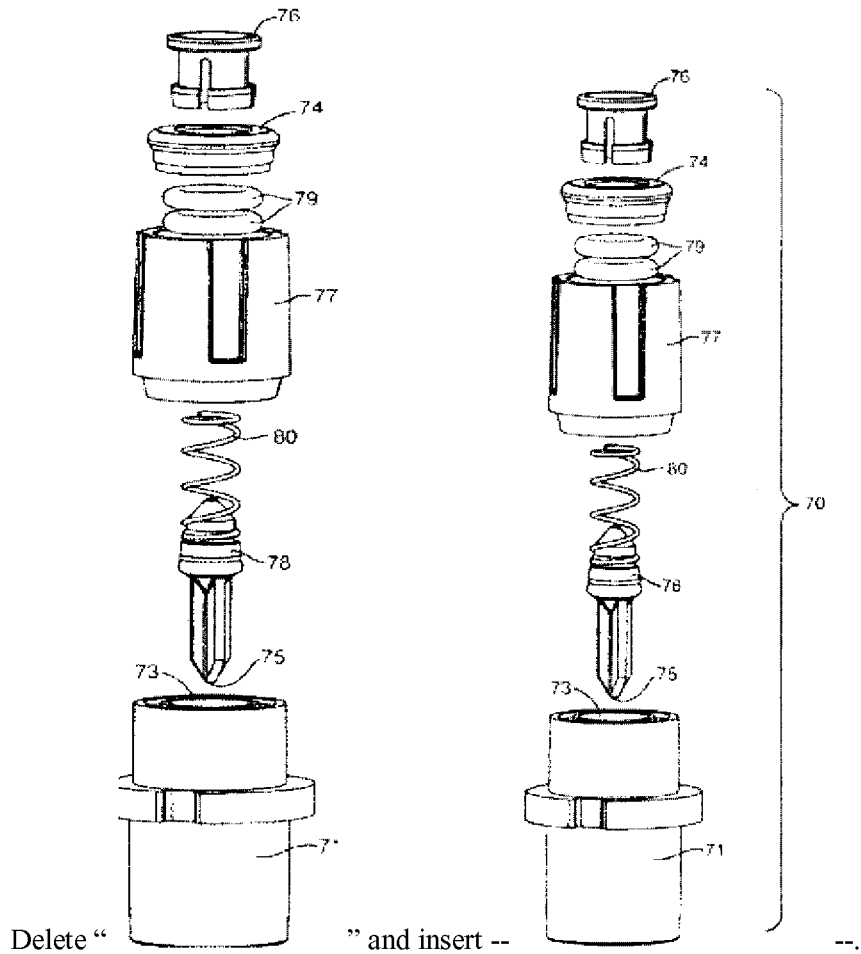

Delete " " and insert -- --.

Signed and Sealed this
Twenty-second Day of April, 2014

Michelle K. Lee
*Deputy Director of the United States Patent and Trademark Office*

CERTIFICATE OF CORRECTION (continued)
U.S. Pat. No. 8,097,156 B2

FIG. 19 should be replaced with the corrected FIG. 19 as shown below.

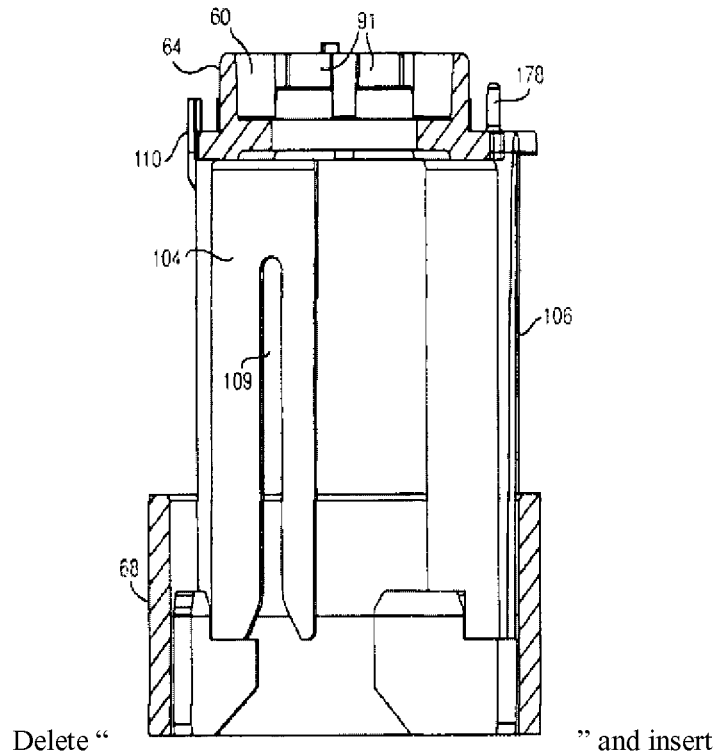

Delete " 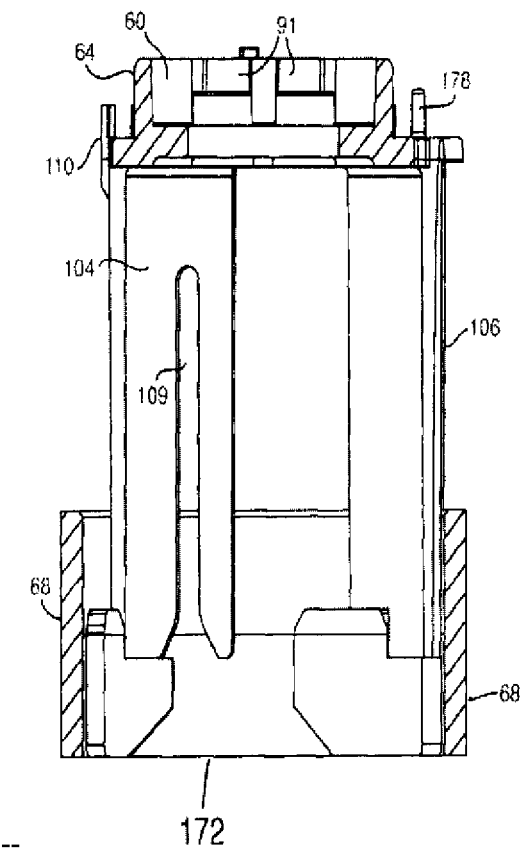 " and insert -- --.